United States Patent
Bianco et al.

(10) Patent No.: US 6,256,737 B1
(45) Date of Patent: Jul. 3, 2001

(54) SYSTEM, METHOD AND COMPUTER PROGRAM PRODUCT FOR ALLOWING ACCESS TO ENTERPRISE RESOURCES USING BIOMETRIC DEVICES

(75) Inventors: Peter Garrett Bianco, Potomac, MD (US); William Taylor Boon, Bristow, VA (US); Robert Brewster Sterling, Kensington, MD (US); Karl Roger Ware, Washington, DC (US)

(73) Assignee: BioNetrix Systems Corporation, Vienna, VA (US)

( * ) Notice: Subject to any disclaimer, the term of this patent is extended or adjusted under 35 U.S.C. 154(b) by 0 days.

(21) Appl. No.: 09/264,726

(22) Filed: Mar. 9, 1999

(51) Int. Cl.[7] .................................................. G06F 12/14
(52) U.S. Cl. ........................................... 713/186; 713/200
(58) Field of Search ............................. 713/200, 201, 713/161, 186, 202; 380/3, 4, 25; 709/229; 340/825.31, 825.34

(56) References Cited

U.S. PATENT DOCUMENTS

| 3,639,905 | 2/1972 | Yaida et al. ........................ 340/149 |
| 4,449,189 | 5/1984 | Feix et al. ......................... 364/513.5 |
| 4,685,055 | 8/1987 | Thomas ............................. 364/200 |
| 4,975,969 | 12/1990 | Tal ................................... 382/2 |
| 4,993,068 | 2/1991 | Piosenka et al. ................... 380/23 |

(List continued on next page.)

FOREIGN PATENT DOCUMENTS

| WO 97/04394 | 2/1997 | (WO) ..................... G06F/12/14 |
| WO 98/04996 | 2/1998 | (WO) ..................... G06K/9/00 |
| WO 98/15924 | 4/1998 | (WO). |
| WO 98/48538 | 10/1998 | (WO) ..................... H04L/9/00 |
| WO 98/50875 | 11/1998 | (WO). |
| WO 98/52317 | 11/1998 | (WO). |
| WO 98/57247 | 12/1998 | (WO) ..................... G06F/1/00 |

OTHER PUBLICATIONS

International Search Report for PCT Appl. No. PCT/US00/05722.
Avolio, F.M., "Identity confirmed," *Network World*, Aug. 24, 1998, vol. 18, No. 34.
"Beyond Speech Recognition," *Fortune*, Nov. 23, 1998, p264(1). (Computer Select printout, 2 pages).

(List continued on next page.)

*Primary Examiner*—James P. Trammell
*Assistant Examiner*—Pierre E. Elisca
(74) *Attorney, Agent, or Firm*—Sterne, Kessler, Goldstein & Fox P.L.L.C.

(57) ABSTRACT

A system, method and computer program product that utilizes biometric measurements for the authentication of users to enterprise resources. The system includes a biometric server that stores the engine and collections of data required by the system to authenticate users. In the present invention, it is the biometric policies that determine the way or method in which a user is to be authenticated by the system. The execution of the biometric policies involves the use of one or more biometric templates. Biometric devices utilize a scientific technique to identify a user based on compared measurements of unique personal characteristics. These measurements, called biometric measurements, may include, but are not limited to, measurements of finger and hand geometry, retina and facial images, weight, DNA data, breath, voice, typing stroke and signature. The biometric policies of the present invention provide flexibility to the level of protection for individual enterprise resources. In an embodiment of the present invention, a method of storing both biometric templates and digital certificates in a hierarchical structure allows for the ease of access to biometric templates and digital certificates. In another embodiment of the present invention, the system of the present invention is implemented as a roaming profile server in a certificate authority system.

105 Claims, 48 Drawing Sheets

U.S. PATENT DOCUMENTS

| | | | |
|---|---|---|---|
| 5,018,096 | 5/1991 | Aoyama | 364/900 |
| 5,055,658 | 10/1991 | Cockburn | 235/382 |
| 5,056,147 | 10/1991 | Turner et al. | 382/14 |
| 5,065,429 | 11/1991 | Lang | 380/25 |
| 5,111,512 | 5/1992 | Fan et al. | 382/3 |
| 5,131,038 | 7/1992 | Puhl et al. | 380/23 |
| 5,163,094 | 11/1992 | Prokoski et al. | 382/2 |
| 5,165,032 | 11/1992 | Herbault | 395/725 |
| 5,181,786 | 1/1993 | Hujink | 400/61 |
| 5,191,611 | 3/1993 | Lang | 380/25 |
| 5,195,133 | 3/1993 | Kapp et al. | 380/9 |
| 5,228,094 | 7/1993 | Villa | 382/4 |
| 5,229,764 | 7/1993 | Matchett et al. | 340/825.34 |
| 5,245,329 | 9/1993 | Gokcebay | 340/825.31 |
| 5,259,025 | 11/1993 | Monroe et al. | 380/23 |
| 5,268,963 | 12/1993 | Monroe et al. | 380/23 |
| 5,280,527 | 1/1994 | Gullman et al. | 380/23 |
| 5,291,560 | 3/1994 | Daugman | 382/2 |
| 5,321,765 | 6/1994 | Costello | 382/4 |
| 5,337,043 | 8/1994 | Gokcebay | 340/825.31 |
| 5,339,361 | 8/1994 | Schwalm et al. | 380/23 |
| 5,386,104 | 1/1995 | Sime | 235/379 |
| 5,412,727 | 5/1995 | Drexler et al. | 380/24 |
| 5,412,738 | 5/1995 | Brunelli et al. | 382/115 |
| 5,414,755 | 5/1995 | Bahler et al. | 379/67 |
| 5,432,864 | 7/1995 | Lu et al. | 382/118 |
| 5,436,970 | 7/1995 | Ray et al. | 380/23 |
| 5,442,645 | 8/1995 | Ugon et al. | 371/25.1 |
| 5,455,407 | 10/1995 | Rosen | 235/380 |
| 5,456,256 | 10/1995 | Schneider et al. | 128/660.09 |
| 5,457,747 | 10/1995 | Drexler et al. | 380/24 |
| 5,465,290 | 11/1995 | Hampton et al. | 379/67 |
| 5,469,506 | 11/1995 | Berson et al. | 380/23 |
| 5,473,144 | 12/1995 | Mathurin, Jr. | 235/380 |
| 5,481,720 | 1/1996 | Loucks et al. | 395/700 |
| 5,502,759 | 3/1996 | Cheng et al. | 379/88 |
| 5,509,083 | 4/1996 | Abtahi et al. | 382/124 |
| 5,513,250 | 4/1996 | McAllister | 379/91 |
| 5,513,272 | 4/1996 | Bogosian, Jr. | 382/116 |
| 5,534,855 | 7/1996 | Shockley et al. | 340/825.3 |
| 5,566,327 | 10/1996 | Sehr | 395/600 |
| 5,577,120 | 11/1996 | Penzias | 380/23 |
| 5,578,808 | 11/1996 | Taylor | 235/380 |
| 5,581,630 | 12/1996 | Bonneau, Jr. | 382/116 |
| 5,586,171 | 12/1996 | McAllister et al. | 379/67 |
| 5,594,806 | 1/1997 | Colbert | 382/115 |
| 5,608,387 | 3/1997 | Davies | 340/825.34 |
| 5,613,012 | 3/1997 | Hoffman et al. | 382/115 |
| 5,615,277 * | 3/1997 | Hoffman | 340/825.34 |
| 5,623,552 | 4/1997 | Lane | 382/124 |
| 5,635,012 | 6/1997 | Belluci et al. | 156/277 |
| 5,636,282 | 6/1997 | Holmquist et al. | 380/25 |
| 5,636,292 | 6/1997 | Rhoads | 382/232 |
| 5,642,160 | 6/1997 | Bennett | 348/156 |
| 5,646,839 | 7/1997 | Katz | 379/93.01 |
| 5,647,017 | 7/1997 | Smithies et al. | 382/119 |
| 5,655,013 | 8/1997 | Gainsboro | 379/188 |
| 5,657,389 | 8/1997 | Houvener | 380/23 |
| 5,659,616 | 8/1997 | Sudia | 380/23 |
| 5,664,170 | 9/1997 | Taylor | 395/200.5 |
| 5,668,874 | 9/1997 | Kristol et al. | 380/23 |
| 5,677,851 | 10/1997 | Kingdon et al. | 364/514 C |
| 5,686,765 | 11/1997 | Washington | 307/10.5 |
| 5,712,912 * | 1/1998 | Tomko et al. | 380/23 |
| 5,712,914 | 1/1998 | Aucsmith et al. | 380/30 |
| 5,719,950 | 2/1998 | Osten et al. | 382/115 |
| 5,751,260 | 5/1998 | Nappi et al. | 345/8 |
| 5,761,329 | 6/1998 | Chen et al. | 382/116 |
| 5,764,789 | 6/1998 | Pare, Jr. et al. | 382/115 |
| 5,781,724 | 7/1998 | Nevarez et al. | 395/186 |
| 5,790,674 | 8/1998 | Houvener et al. | 380/23 |
| 5,802,199 | 9/1998 | Pare, Jr. et al. | 382/115 |
| 5,805,719 | 9/1998 | Pare, Jr. et al. | 382/115 |
| 5,812,067 | 9/1998 | Bergholz et al. | 340/825.31 |
| 5,815,252 | 9/1998 | Price-Francis | 356/71 |
| 5,815,598 | 9/1998 | Hara et al. | 382/211 |
| 5,821,871 | 10/1998 | Benzler | 340/825.34 |
| 5,825,005 | 10/1998 | Behnke | 235/380 |
| 5,838,306 | 11/1998 | O'Connor et al. | 345/163 |
| 5,838,812 | 11/1998 | Pare, Jr. et al. | 382/115 |
| 5,844,497 | 12/1998 | Gray | 340/825.34 |
| 5,872,834 | 2/1999 | Teitelbaum | 379/93.03 |
| 5,881,226 | 3/1999 | Veneklase | 395/188.01 |
| 5,887,140 | 3/1999 | Itsumi et al. | 395/200.55 |
| 5,892,838 | 4/1999 | Brady | 382/115 |
| 5,987,232 * | 11/1999 | Tabuki | 713/201 |
| 5,995,014 * | 11/1999 | DiMaria | 340/825.31 |

OTHER PUBLICATIONS

"The Biometric Software Security Suite™," 2 pages, from www.truetouch.com.

Blake, P., "Invisible Protection," *Computerworld*, Nov. 18, 1996, vol. 30, No. 47, pT6(4). (Computer Select printout, 1 page).

"Body Language," *Computer Letter*, Nov. 30, 1998, p1(1). (Computer Select printout, 5 pages).

Carter, J. and Nixon, M., "An Integrated Biometrics Database," pp. 8/1 –8/5.

Declerq, F., "Voice security compares features," *Electronic Engineering Times*, Mar. 15, 1999, p58(1). (Computer Select printout, 2 pages).

"Diebold ATMs First to Recognize Faces and Voices," ComputerWire Printout, Section: Today's News, No. 3303, Dec. 3, 1997, 1 page.

Duksta, J.C.C., "We know who you are," *Network World*, Aug. 24, 1988, pp. 35–36 & 38–41.

"Embedded Solution," 1 page, from www.keyware.com.

"Forget passwords," 2 pages, from www.forbes.com.

Halpin, J., "Bio–identity," *Computer Shopper*, Mar. 1999, vol. 19, No. 3, p390(1). (Computer Select printout, 4 pages).

Karney, J., "Citadel Gatekeeper," *PC Magazine*, Feb. 23, 1999, p174(1). (Computer Select printout, 2 pages).

Karney, J., "Saflink SAF/nt2.0," *PC Magazine*, Feb. 23, 1999, p172(1). (Computer Select printout, 2 pages).

Karney, J., "TrueFace Network," *PC Magazine*, Feb. 23, 1999, p178(1). (Computer Select printout, 2 pages).

Phillips, K., "Moving to Biometric Standards," *PC Week*, Oct. 27, 1997, pp. 122 & 124.

Press Release, "Keyware Technologies Acquires Idtech," Mar. 24, 1999, 2 pages, from www.keyware.com.

"SAF/nt: Don't Worry, Be HA–API," *Network World*, Aug. 24, 1998, vol. 15, No. 34, p35(1). (Computer Select printout, 2 pages).

Schwartau, W., "Securing the Enterprise," *Network World*, Jan. 27, 1997, pp. 42–44 & 46.

"STMicro chips will include biometrics," *Electronic Engineering Times*, Jul. 6, 1998, No. 1015, p34(1). (Computer Select printout, 1 page).

"TrueTouch's Biometric Software Security Suite™," 1 page, from www.truetouch.com.

"VoiceGuardian®," 3 pages, from www.keyware.com.

* cited by examiner

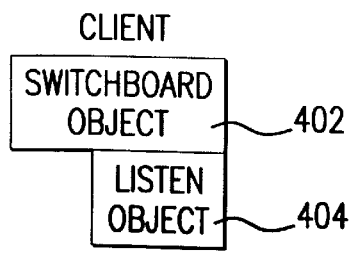
FIG. 4A
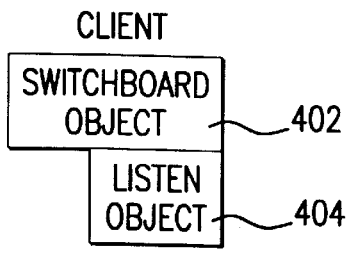
FIG. 4B
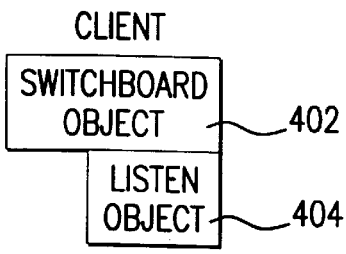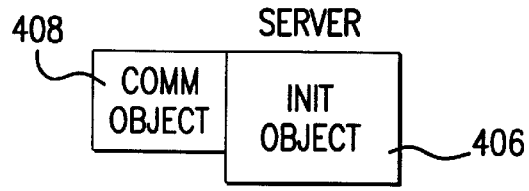
FIG. 4C
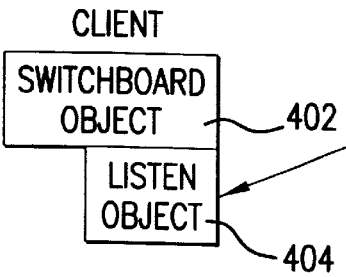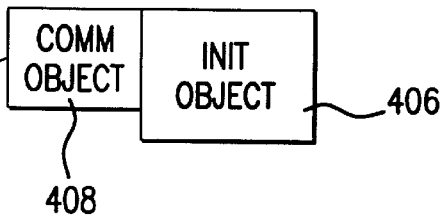
FIG. 4D
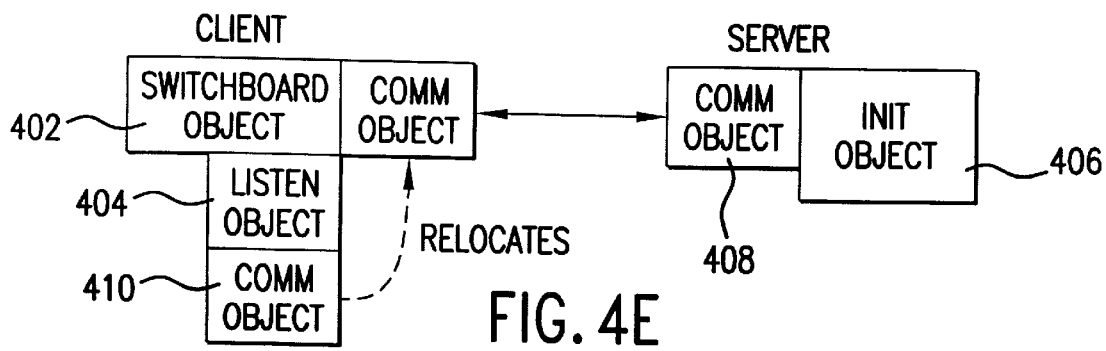
FIG. 4E

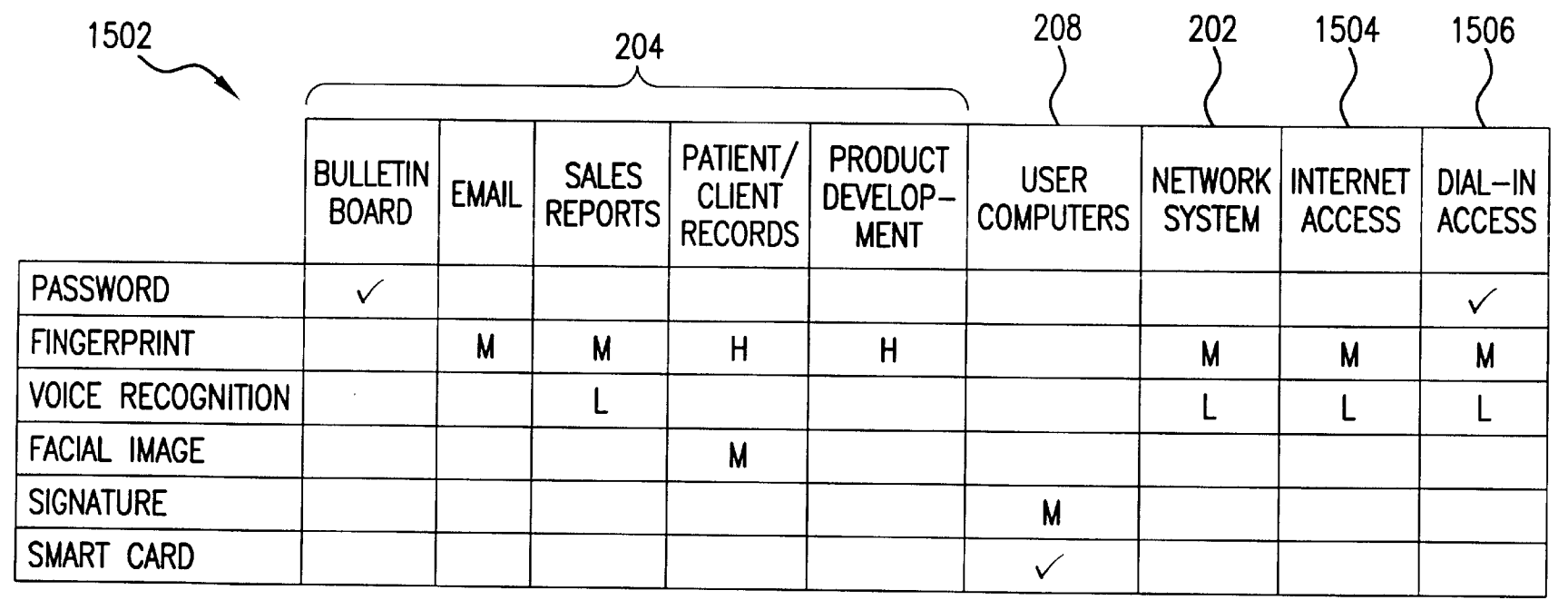

| | BULLETIN BOARD | EMAIL | SALES REPORTS | PATIENT/ CLIENT RECORDS | PRODUCT DEVELOP- MENT | USER COMPUTERS | NETWORK SYSTEM | INTERNET ACCESS | DIAL-IN ACCESS |
|---|---|---|---|---|---|---|---|---|---|
| PASSWORD | ✓ | | | | | | | | ✓ |
| FINGERPRINT | | M | M | H | H | | M | M | M |
| VOICE RECOGNITION | | | L | | | | L | L | L |
| FACIAL IMAGE | | | | M | | M | | | |
| SIGNATURE | | | | | | ✓ | | | |
| SMART CARD | | | | | | | | | |

FIG. 15

SYSTEM, METHOD AND COMPUTER PROGRAM PRODUCT FOR ALLOWING ACCESS TO ENTERPRISE RESOURCES USING BIOMETRIC DEVICES

BACKGROUND OF THE INVENTION

1. Field of the Invention

The present invention relates generally to a system, method and computer program product for allowing access to enterprise resources, and more particularly to the utilization of biometric measurements for the authentication of users, and thus access, to enterprise resources.

2. Related Art

Enterprise resources include computers, applications and data. Computers are often connected using one or more networks. There are many types of computer networks. Various types of networks include, but are not limited to, local-area networks (LAN), wide-area networks (WAN), the Internet and intranets. In general, a computer network may or may not be private. A typical private network is centrally controlled.

The resulting connectivity provided by a network enables several features such as sharing of data and other resources on the network. For example, networks enable applications such as electronic mail, network file systems (sharing of data using disks accessed over networks), distributed processing (different computers executing different parts of a program, generally in parallel) and sharing of printers and servers. These applications usually result in enhanced communication capabilities, efficient use of resources, and/or faster processing of data, thereby leading to productivity gains within an enterprise.

Provision of network connectivity and applications generally entails the operation of several network elements implemented according to predefined interfaces. Network elements include, but are not limited to, hardware circuits/devices and software entities (e.g., a software object, a process or a thread) which may operate according to interface specifications to provide the network connectivity or applications. The interfaces may be based on open protocols or proprietary protocols.

An open interface is public. Examples of open interfaces are Transmission Control Protocol/Internet Protocol (TCP/IP) and IEEE 802 family of protocols, both of which are commonly used in the networking community. Alternately, a proprietary interface is privately owned and controlled. An example of a proprietary interface is System Network Architecture (SNA) implemented mostly at IBM. Following is a brief description of the various types of networks.

A LAN connects computers that are geographically close together (e.g., in the same building). LANS are typically private networks being owned and controlled by an enterprise.

A WAN connects computers that are farther apart geographically and are connected by telephone lines or radio waves (e.g., in multiple offices and distant geographies). WANS are also typically private networks owned and controlled by an enterprise. Multiple LANs can be connected by a WAN.

The Internet is a global network connecting millions of computers. As of 1998, the Internet has more than 100 million users worldwide, and that number is growing rapidly. More than 100 countries are linked into exchanges of data, news and opinions. Unlike private networks which are centrally controlled, the Internet is decentralized by design.

Each Internet computer, called a host, is independent. Users can choose which Internet services to use and which local services to make available to the global Internet community. There are a variety of ways to access the Internet. Most online services, such as America Online, offer access to some Internet services. It is also possible to gain access through a commercial Internet Service Provider (ISP).

An ISP is a company that provides access to the Internet. For a monthly fee, the ISP gives you a software package, username, password and access phone number. Equipped with a modem, a user can then log on to the Internet and browse the World Wide Web and USENET, and send and receive e-mail. In addition to serving individuals, ISPs also serve large individual enterprises, providing a direct connection from the enterprise's networks to the Internet. ISPs themselves are connected to one another through Network Access Points (NAPs).

An intranet is a privately owned and controlled network. An intranet's host sites may look and act just like any other host site, but a firewall surrounding an intranet fends off unauthorized access. Like the Internet itself, intranets are used to share information (i.e. data). Secure intranets are now the fastest-growing segment of the Internet because they are much less expensive to build and manage than private networks based on proprietary protocols.

As enterprise resources grow so does the complexity and importance of protecting them. In general, the administration of resource protection involves determining the type of identification mechanism to protect enterprise resources, maintaining the integrity of the chosen identification mechanism, managing users, determining which enterprise resources to protect and determining alternative ways of allowing a user access to enterprise resources when the normal way of authentication is faulty. The administration of resource protection in a network is not only a complex and expensive task, but it may conflict with the desired productivity the networking of resources provides.

As discussed above, one of the results of networking together enterprise resources is the increase in productivity through enhanced communication and more efficient use of the resources. While this increase in productivity is important to any enterprise, so is the protection of its resources. While a network works to provide easier access to enterprise resources, an authentication mechanism for protecting the same resources works to restrict access to them. Therefore, so as to not offset the increase in productivity a network provides to an enterprise, an enterprise needs to balance adequate resource protection with an efficient means of administering such protection.

SUMMARY OF THE INVENTION

The present invention is directed to a system, method and computer program product that utilizes biometric measurements for the authentication of users to enterprise resources. The system includes a biometric server that stores the engine and collections of data required by the system to authenticate users. The collections of data include biometric templates, biometric policies, biometric groups, biometric device IDs, user IDs, computer IDs and application IDs. In the present invention, the biometric policies determine the way or method in which a user is to be authenticated by the system. The execution of the biometric policies involves the use of one or more biometric templates. One unique biometric template is created and stored in the biometric server each time a user enrolls in a different biometric device. Biometric devices utilize a scientific technique to identify a user based on compared measurements of unique personal characteristics. These measurements, called biometric measurements, may include, but are not limited to, measurements of finger and hand geometry, retina and facial images, weight, DNA data, breath, voice, typing stroke and signature.

The types of data stored in the biometric server are partially determined through the operations of an enrollment station and an administration station. The enrollment station is used to enroll users into biometric system. The administration station is used to perform overall management duties and to initially setup the data in biometric server. A satellite enrollment station can be used to enroll users into biometric system at remote locations. Finally, an alternate biometric server is a backup or standby server to biometric server. The alternate biometric server ensures that the system is always available to authenticate users.

The biometric policies of the present invention provide flexibility to the level of protection for individual enterprise resources. The pre-defined biometric polices include an OR policy, an AND policy, a CONTINGENT policy, a RANDOM policy and a THRESHOLD policy. This is done through the layering of both biometric devices and non-biometric devices. The layering of devices allows for the combination of one or more devices in a logical way (via biometric policies) to protect each enterprise resource. The present invention also allows different threshold values to be set for each biometric device. In other words, the present invention can tailor the authentication level based on probability that each user must pass before the user gains access to enterprise resources (e.g., $\frac{1}{1000}$, $\frac{1}{10,000}$, or $\frac{1}{1000,0000}$ that the user is who claims to be).

Another feature of the present invention is directed to a method of storing both biometric templates and digital certificates in a hierarchical structure for ease of access to the biometric templates and the digital certificates. Another feature of the present invention is directed to utilizing the system of the present invention as a roaming profile server in a certificate authority system.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein:

FIG. 4 is broken into nine(9) figures including FIG. 4A, FIG. 4B, FIG. 4C, FIG. 4D, FIG. 4E, FIG. 4F, FIG. 4G, FIG. 4H and FIG. 4I;

FIGS. 8A, 8A-1 and 8B are a flowchart depicting the high-level operation of authenticating a user by the present invention;

FIG. 15 is a chart illustrating the layering process of the present invention;

DETAILED DESCRIPTION OF THE PREFERRED EMBODIMENTS

Table of Contents

A. Overview of the Invention

Figure 1:
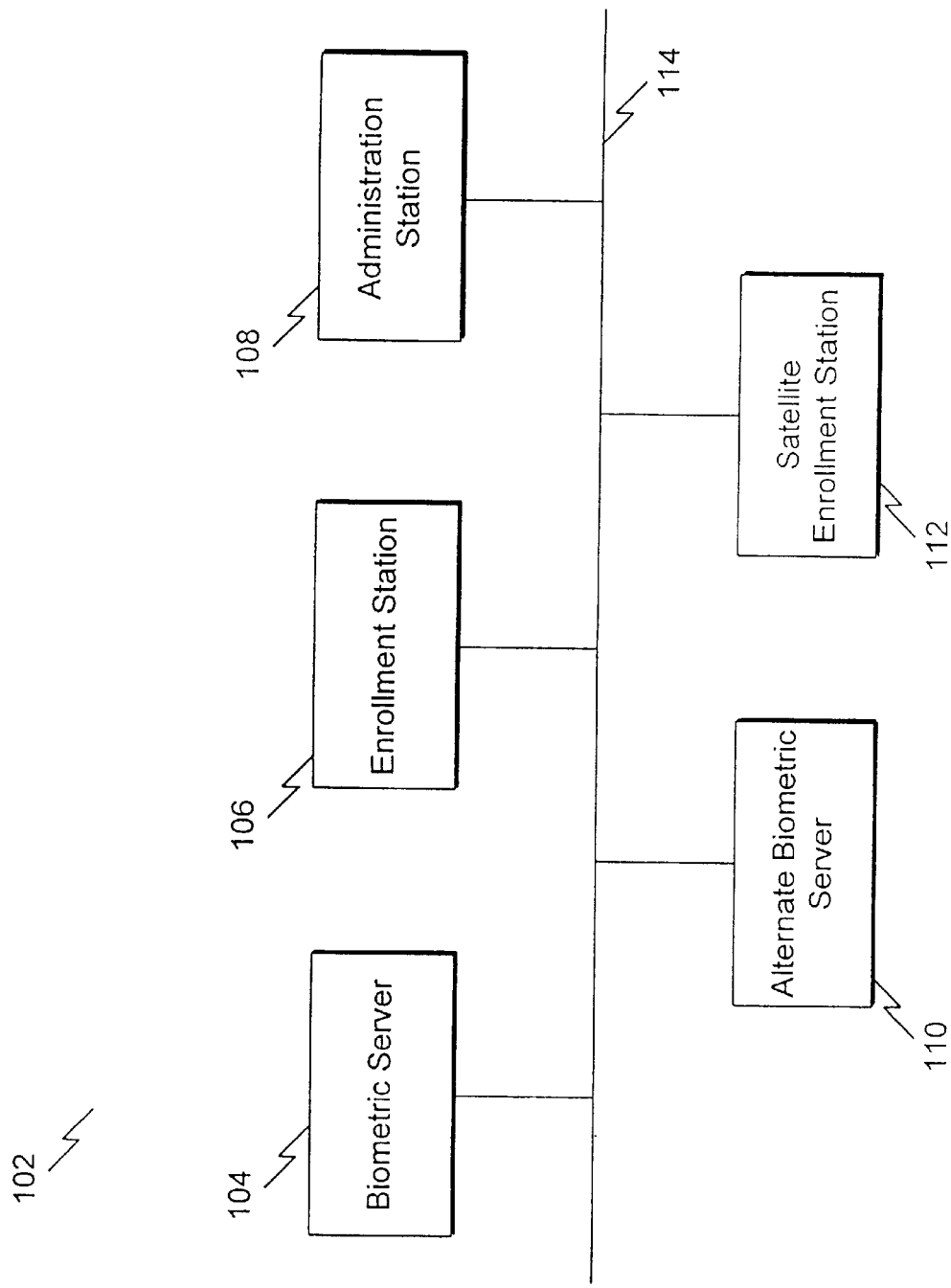
FIG. 1 is a block diagram of the physical components of a biometric authentication system connected by a network according to a preferred embodiment of the present invention.

1. Determining an Adequate Identification Mechanism
2. Biometric Identification Mechanism: an Adequate Authentication Mechanism
3. Biometric Authentication System
4. Network System
5. The Need for the Appropriate Biometric Measurement for an Environment
6. Open Interface B. Preferred Implementation of the Present Invention 1. A Preferred Environment
2. A Preferred Software Programming Language and Network Architecture C. Biometric Server Data of the Present Invention 1. Data Stored in Biometric Server
2. Setup of Biometric Server Data D. Biometric Server Functions of the Present Invention 1. Authenticating a User
2. Enrolling a User E. Biometric Policies 1. OR Policy
2. AND Policy
3. CONTINGENT Policy
4. RANDOM Policy
5. THRESHOLD Policy
6. Biometric Policies Having a List of Biometric Policies
    a. OR Policy Having a List of biometric Policies
    b. AND Policy Having a List of Biometric Policies
    c. RANDOM Policy Having a List of Biometric Policies
    d. CONTINGENT Policy Having a List of biometric Policies
    e. THRESHOLD Policy Having a List of biometric Policies
7. Biometric Policies Having a List of Policies or Devices
    a. OR Policy Having a Policy List of policies or Devices
    b. AND Policy Having a Policy List of policies or Devices
    c. RANDOM Policy Having a Policy List of Policies or Devices
    d. CONTINGENT Policy Having a Policy List of Policies or Devices
    e. THRESHOLD Policy Having a Policy List of policies or Devices
8. Multi-Person Biometric Policy F. Biometric System Security Infrastructure 1. Persistent Data Stored in Biometric Server
2. Data Transported Across the Network System
3. Biometric System Software G. Biometric Devices and Mobility within a Networked Environment 1. Hierarchical Storage of Biometric Templates
2. Hierarchical Directory for Locating Biometric Templates H. Other applications 1. Digital Certificates
2. Roaming Profile Server
3. Phone Authentication and Clearance Verification
4. Access/Facility Control
5. Banking and Financial
6. Silent Signal I Conclusion A. Overview of the Invention The inventors of the present invention recognized that a solution did not exist that effectively balances the protection of resources with ease of access to the same resources in a networked environment. The general solution of the present invention is twofold. First, use as adequate an identification mechanism as possible to protect enterprise resources. And second, provide a method and system that utilizes the adequate identification mechanism to provide effective authentication to resources in a networked environment. This method and system for authentication must not decrease the productivity that a network provides an enterprise.

1. Determining an Adequate Identification Mechanism

Billions of dollars have been lost by thousands of enterprises due to inadequate authentication to enterprise resources. For years enterprises have protected valuable resources through various types of identification mechanisms that do not conclusively authenticate a user. These inadequate identification mechanisms include, but are not limited to, passwords, smart cards and tokens. The reason why passwords, smart cards and tokens do not conclusively authentic a user is due to a human factor involved with using these identification mechanisms. In fact, the weakest link in authentication is the human factor.

The human factor creates problems that can lead to unauthorized access since these mechanisms require a user to either know something and/or keep something in his or her possession. For example, password identification requires a user to remember a password. Whereas, tokens and smart cards require a user to have the token or smart card in his or her possession to gain access to enterprise resources. Anything a user knows or has in possession can be compromised.

When inadequate authentication exists people gain unauthorized access to enterprise resources. While a user who gains unauthorized access can be a "cracker" or "hacker"

(e.g., a person outside the enterprise), more often the user is from within the enterprise itself (e.g., an employee of the enterprise). An example of this is as follows. As discussed above, password identification requires User A to remember a password. If User A's password is written down, or User B sees User A typing a password at a keyboard, then User B can use User A's password to effectively be User A as far as the enterprise is concerned. The result is that User B now has access to all the resources User A has access to. As with passwords, a similar scenario can happen with tokens or smart cards when User A misplaces a token or smart card and User B finds it. The damage that can be done to resources in a networked environment far exceeds the damage that can be done to resources contained within a single computer (e.g., not networked).

Many enterprises reduce the cost and complexity of administering its resource protection by incorporating a process called "single sign-on." Single sign-on provides each user with one password, token or smart card to access all enterprise resources. Most people can remember one password without writing it down and/or keep track of one token or smart card. While this reduces the complexity and cost of administering resource protection, it reduces the probability that the user gaining access is authentic. Now, one password may compromise all enterprise resources.

The probability that the user gaining access is authentic can be increased by forcing each user to use multiple passwords, tokens or smart cards for different resources. Many people have difficulty in managing multiple passwords, tokens or smart cards. This increases the likelihood that a user will write down passwords or misplace tokens and smart cards. When this happens, once again all enterprise resources may be compromised.

Another aspect of why password, tokens or smart cards are inadequate identification mechanisms involves the sharing of these between users. An example that can cost an enterprise millions of dollars a year is a practice called "buddy punching." Buddy punching typically involves two users or employees within an enterprise that requires its employees to use a password to "punch in and out" of work each day. Password, or even tokens and smart cards, make is easy for one employee to "punch in" another employee at the beginning of the day and then "punch out" that same employee at the end of the day. The practice of "buddy punching" allows an employee who stays home a particular day to still have the benefit of receiving a paycheck for that day.

Therefore, the inventors of the present invention recognized that an identification mechanism is needed that avoids the weakest link in authentication that is a result of the human factor discussed above.

2. Biometric Identification Mechanism: An Adequate Authentication Mechanism

A biometric identification mechanism eliminates the weakest link caused by the human factor. Biometric identification mechanisms, or biometric devices, utilize a scientific technique to identify a user based on compared measurements of unique personal characteristics. Biometric identification mechanisms include two basic categories of biometric measurements. The first category involves measuring a unique characteristic found on a user's body. This may include, but is not limited to, finger and hand geometry, retina and facial images, weight, DNA data and breath. The second category involves measuring a user's behavioral characteristics. This may include, but is not limited to, voice, typing stroke and signature. In general, anything that can be measured on a user that is unique can be used as a biometric measurement.

While anything that can be measured on a user that is unique can be used as a biometric measurement, the best biometric measurements to use for authentication purposes depend on the consistency over time of the biometric measured. For example, user weight is a biometric measurement. Because weight is a biometric measurement that fluctuates frequently for many people, it is not a desirable biometric measurement to use for authentication purposes.

The general process of using biometric identification mechanisms as an authentication mechanism is as follows. The user is prompted for a particular biometric measurement that is used by a biometric device to generate a value. The value gets stored in a template as stored biometric data. When the user wants to gain access to a resource that is protected by the biometric device, the user is prompted for live biometric data. The live biometric data is matched with the stored biometric data. In reality, the live biometric data and the stored biometric data will never be exactly the same. Therefore, a user must come within some tolerance to pass the biometric device and gain access to the protected resources. As mentioned above, the biometric device utilizes a scientific technique to identify a user based on biometric measurements. The tolerance is typically predetermined by the vendor for the particular biometric device used.

A specific example of how biometric identification works can be illustrated by a typical fingerprint device. A fingerprint device measures the geometry of a fingerprint. First, a user is prompted for multiple samples of a fingerprint. For each sample, a number of characteristics or measurements are identified. Then, for all of the multiple samples, a number of common characteristics or measurements are identified. The common characteristics or measurements are processed through a unique algorithm which generates a unique template to store the biometric data. When a "live" fingerprint is presented for identification, it is processed through the same algorithm. If the output from the "live" process matches the stored biometric data within a certain tolerance, the user is considered to be authenticated and gains access to which ever resource the fingerprint device is protecting.

A specific example of how biometric identification works when behavioral measurements are involved can be illustrated by a typical signature device. Here, a user is prompted for multiple samples of a signature. For each sample, characteristics or measurements are identified. The characteristics or measurements include the pressure, sequence of events, direction, relative vectors and speed. One example of the sequence of events is to identify that when the user signed his or her signature, that "t" was crossed before "I" dotted. An example of direction is that the user crossed a "t" from right to left. Relative vectors may include the information that "F" is 2.1 the height of "e." Finally, speed recorded is the time it took the user to sign a signature from start to finish.

As with fingerprint devices, common characteristics or measurements are identified for the multiple samples. These common characteristics or measurements are processed through a unique algorithm which generates a unique template to store the biometric data. When a "live" signature is presented for identification, it is processed through the algorithm. If the output from the "live" process matches the stored biometric data within a certain predetermined tolerance, the user is considered to be authenticated.

The use of biometric identification mechanisms as a means for authentication eliminates the problems discussed above involving the use of passwords, tokens or smart cards. Because biometric measurements involve either a unique characteristic found on a user's body (e.g., fingerprint) or a user's behavioral characteristics (e.g., signature), it is impossible for users to forget or lose the mechanism of authenticating themselves. Now, it is impossible for User B to "steal" the mechanism of authenticating User A to the enterprise. Likewise, the practices of users sharing passwords and "buddy punching" are eliminated.

While the use of biometric devices can conclusively authenticate a user, the inventors of the present invention recognized that a method and system was needed that utilizes biometric devices to provide effective authentication to resources in a networked environment while not decreasing the productivity a network provides an enterprise.

Most enterprises contained in one office today have a LAN. But, more often enterprises today span multiple offices and distant geographies. These enterprises typically have a WAN. As discussed above, networks provide increased productivity to an enterprise by allowing users easy access to all the resources on the network. This is true independent of which office the user is at and where the resource is located within the enterprise. In contrast, resource protection limits the accessability of resources to a user without first being authenticated. Therefore, if the administration of resource protection is not efficient, then the increase in productivity gained by networking is lost. Simply put, if the right user cannot gain access to needed resources, then the enterprise suffers from a decrease in productivity. Yet, if unauthorized users gain access to enterprise resources, then the enterprise also suffers from a potential decrease in productivity. This potential decrease in productivity is due partly to resource loss.

The present invention overcomes limitations that are encountered when resource protection is used in a networked environment. The present invention has the following benefits: (1) flexibility to use the right biometric measurement for an environment; (2) allows user mobility within the enterprise; (3) flexibility in the degree of authentication required to protect each resource; (4) allows remote enrollment of users into a resource protection system; (5) allows remote refreshing of biometric templates; and (6) ensures the integrity of software loaded on remote computers in the network. The present invention also allows different threshold values to be set for each biometric device. In other words, the present invention can tailor the authentication level based on probability that each user must pass before gains access to enterprise resources (e.g., $1/1000$, $1/10,000$, or $1/1000,0000$ that the user is who claims to be).

3. Biometric Authenfication System

FIG. 1 is a block diagram of the functional components of biometric authentication system 102 (also called "biometric system" herein) connected by network 114 according to a preferred embodiment of the present invention. Biometric system 102 includes biometric server 104, enrollment station 106, administration station 108, alternate biometric server 110 and satellite enrollment station 112. Network 114 connects the functional components of biometric system 102. The connectivity provided by network 114 enables such features as the sharing of data and other resources on biometric system 102.

The topology of network 14 as shown in FIG. 1 is called a bus topology. In general, the topology of a network is the geometric arrangement of functions (i.e., computers) within the system. Other common types of network topologies include star and ring topologies. Although the present invention is illustrated in FIG. 1 as incorporating a bus topology, the present invention can equally be applied to other topologies.

Biometric server 104 stores the engine for biometric system 102. Biometric server 104 also stores collections of data required by biometric system 102. Both the functions of the engine and the data stored in biometric server 104 will be discussed in further detail below. The types of data stored in biometric server 104 are partially determined through the operations of enrollment station 106 and administration station 108. Enrollment station 106 is used to enroll users into biometric system 102. Enrollment station 106 has attached to it every type of biometric device used by biometric system 102 to enroll and ultimately authenticate users. When a user is enrolled into biometric system 102, the user may be enrolled with as many biometric devices as the administrator deems necessary.

Administration station 108 is used by the administrator of biometric system 102 to do perform overall management duties. The administrator can also use administration station 108 to generate various reports. The reports may include a list of different types of data stored in biometric server 104 (e.g., a list of the currently enrolled users in biometric system 102). In addition, administration station 108 is typically used to setup the initial data in biometric server 104. Another component is satellite enrollment station 112. Enrollment station 112 is used to enroll users into biometric system 102 at remote locations. Satellite enrollment station 112 may have as many biometric devices attached to it as administration station 108, but alternatively may also be a scaled down version of administration station 108.

One or more alternate biometric servers 110 are backup or standby servers to biometric server 104. Alternate biometric server 110 stores the exact same data as biometric server 104. Only in the event that biometric server 104 fails does alternate biometric server 110 become active and take over the responsibility of authenticating users. The purpose of alternate biometric server 110 is to ensure that biometric system 102 is always available to authenticate users.

There are other ways to ensure the availability of biometric system 102, however, including: biometric server 104 and alternate biometric server 110 having equal responsibility to authenticate users; administration station 108 backup and tape and/or CD-ROM backup. The biometric server 104 and alternate biometric server 110 having equal responsibility to authenticate users means that they are both active at all times. There is a constant synchronization between biometric server 104 and alternate biometric server 110. In the event that one or the other server fails, the other server takes over the responsibility of authenticating users. When the failed server becomes active again, it initiates synchronization with the other server.

Another way to ensure the availability of biometric system 102 is through administration station 108 backup. Here, administration station 108 acts like a master biometric repository. Administration station 108 updates all active biometric servers 104 simultaneously. The final way to ensure the availability of biometric server 102 is through a tape and/or CD-ROM backup.

Although a preferred embodiment of the present invention includes all of the functional components of biometric system 102 discussed above, several (or all) components may be combined as long as the functionality of each component still exists within biometric system 102 as described above. For example, enrollment station 106 and administration station 108 can be combined into one functional component. In addition, several components of biometric system 102 are optional. For example, an enterprise may not have the need to remotely enroll users or may just desire not to. Therefore, satellite enrollment station 112 would not be needed.

4. Network System

Figure 30:
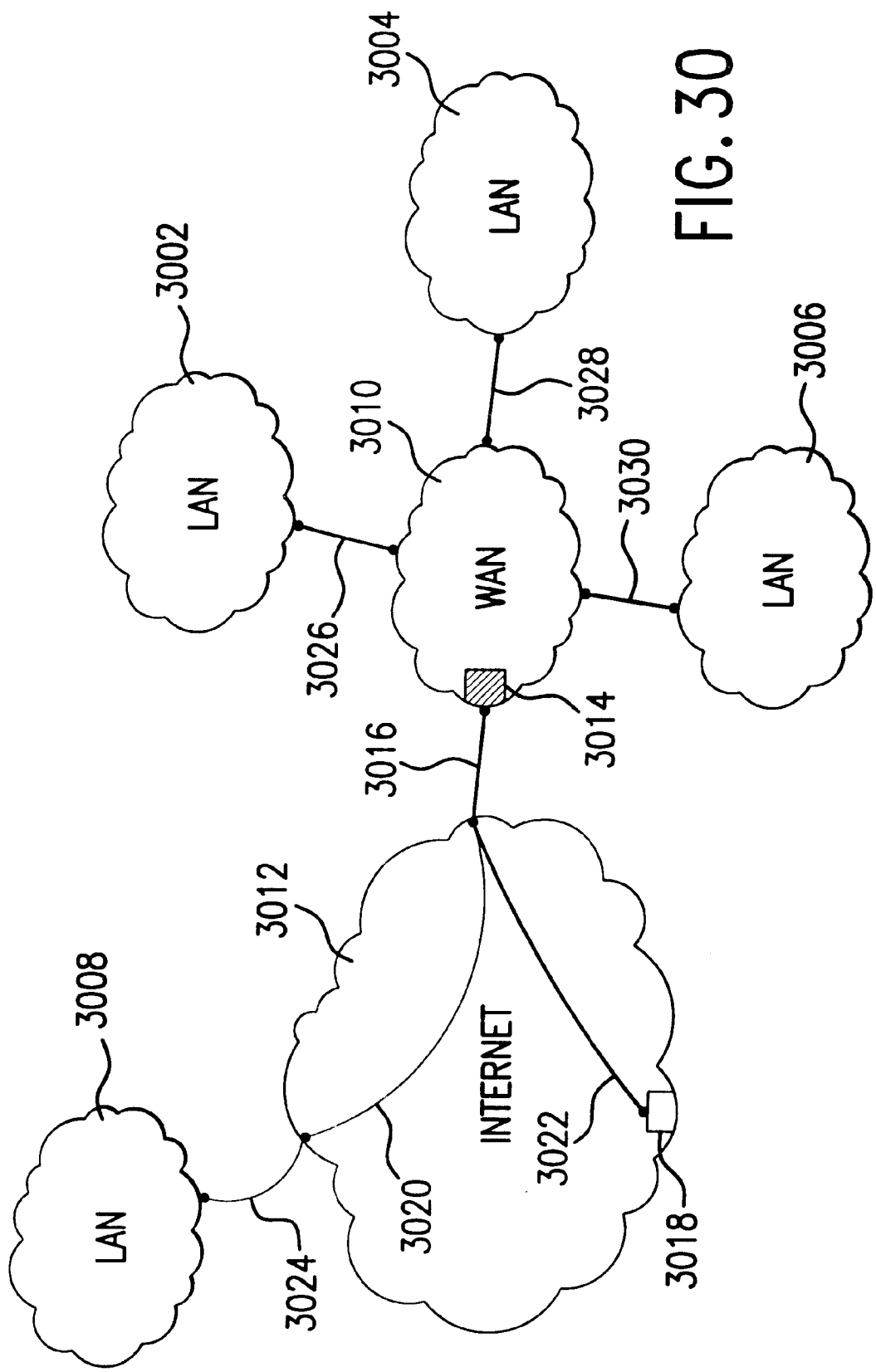
FIG. 30 is a diagram illustrating various types of networks and how each type of network can be connected to other networks.

As mentioned above, various types of networks include, but are not limited to, LANs, WANs, the Internet and intranets. An enterprise may utilize one type of network or any combination of the different types of networks. FIG. 30 is a diagram illustrating the various types of networks and how each type of network can be connected to other networks.

FIG. 30 includes LAN 3002, LAN 3004, LAN 3006, LAN 3008, WAN 3010, Internet 3012, firewall 3014, connection 3016, host 3018, connection 3020, connection 3022, connection 3024, connection 3026, connection 3028 and connection 3030. Connections 3016, 3024, and 3026 through 3030 are typically provided by an ISP.

As shown in FIG. 30, LAN 3002, LAN 3004 and LAN 3006 are connected to WAN 3010. LAN 3008 and host 3018 are also connected to WAN 3010 via the Internet 3012. Connections 3020 and 3022 are typically virtual private networks (VPN). A VPN is a network that is constructed by using public wires to provide connectivity. For example, there are a number of systems that enable you to create networks using the Internet as the medium for transporting data. These systems use encryption and other security mechanisms to ensure that only authorized users can access the network and that the data cannot be intercepted.

Host 3018 may have a type of access to WAN 3010 called dial-up access. Dial-up access refers to connecting a host (i.e., device) to a network via a modem and a public telephone network. Dial-up access is really just like a phone connection, except that the parties at the two ends are computer devices rather than people. Because dial-up access uses normal telephone lines, the quality of the connection is not always good and data rates are limited. An alternative way to connect two computers is through a leased line, which is a permanent connection between two devices. Leased lines provide faster throughput and better quality connections, but they are also more expensive.

WAN 3010 can also be implemented as an intranet as described above. Thus, firewall 3014 can be used to protect WAN 3010 by fending off unauthorized access. Many network systems today incorporate a firewall. A firewall is a system designed to prevent unauthorized access to or from a network. Firewalls are frequently used to prevent unauthorized Internet users from accessing private networks connected to the Internet, especially intranets. Once a user is authorized to access the network, firewalls are further designed to prevent unauthorized transfer of data to and from the network. All data entering or leaving the intranet pass through the firewall, which examines each transmission and blocks those that do not meet the specified security criteria. Firewalls can be implemented in both hardware and software, or a combination of both. A firewall is considered a first line of defense in protecting private information (i.e., data).

Figure 2:
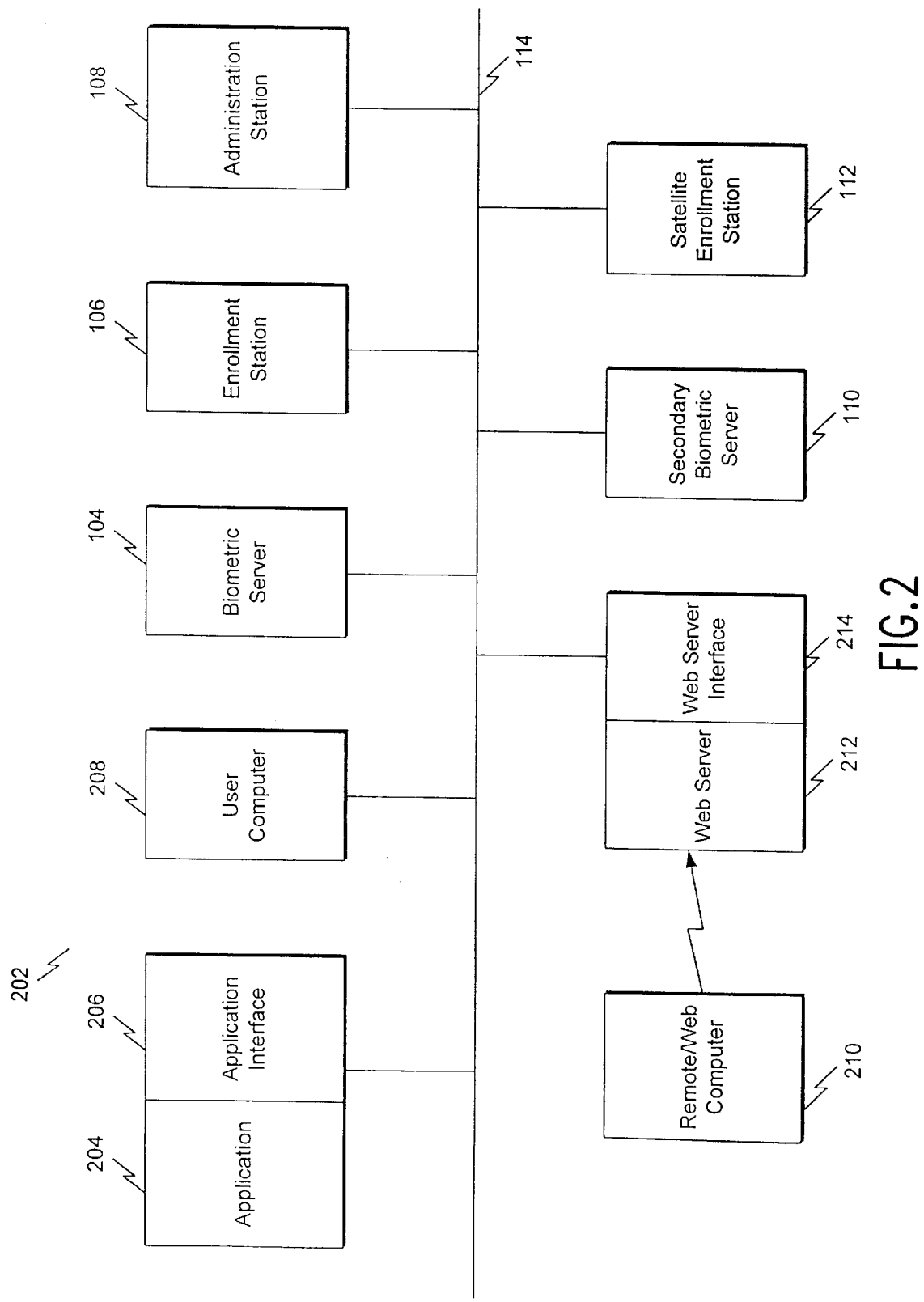
FIG. 2 is a block diagram of a typical enterprise network system incorporating the biometric authentication system according to a preferred embodiment of the present invention.

FIG. 2 is a block diagram of an enterprise network system 202 incorporating biometric system 102 according to a preferred embodiment of the present invention. It is important to note that network system 202 may be one type of network or any combination of the different types of networks described in reference to FIG. 30 above. Referring again to FIG. 30, various functional components of biometric system 102 can be physically located at one or more locations in FIG. 30. For example, biometric system 102 may be located at LAN 3002, LAN 3004, LAN 3006, LAN 3008, WAN 3010 and/or host 3018.

In addition to the components of biometric system 102, network system 202 includes one or more applications, such as application 204, one or more application interfaces, such as application interface 206, one or more user computers, such as user computer 208, one or more remote/web computers, such as remote/web computer 210, web server 212 and web server interface 214. All of the components in network system 202 are considered resources of the enterprise. Network 114 connects both the functional components of biometric system 102 and the additional functional components of network system 202. This connectivity enables such features as the sharing of data and other resources on network system 202.

Examples of application 204 may include, but are not limited to, electronic mail and word processing. Each application 204 has an application interface 206 that allows it to communicate over network 114 to other resources or components in network system 202. In addition, network system 202 includes one or more of user computer 208. Each user computer 208 is located within the enterprise and typically has one or more biometric devices attached to it. User computer 208 is one location where users can gain access to network system 202. To facilitate user access, each computer 208 provides an interface for users to be authenticated by biometric system 102.

Remote/web computer 210 provides the same functions as user computer 208, but remote/web computer 210 accesses network 114 via the Internet. In order for remote/web computer 210 to connect to network 114, it must go through web server 212. Web server interface 214 allows web server 212 to communicate over network 114 to other resources or components in network system 202, including biometric system 102.

In a preferred embodiment of the present invention, users can be required to be authenticated by biometric system 102 when they try to access various points in network system 202. These various access points include network system 202 itself, one or more of application 204 and/or one or more of user computer 208.

Because enterprise networks today typically span multiple offices and distant geographies, the different access points in network system 202 may potentially have very different environments. The inventors of the present invention recognized that there is a need for flexibility to use the appropriate biometric device or measurement for the environment. To achieve this flexibility there is a need for many different types of biometric devices to be utilized in network system 202.

5. The Need for the Appropriate Biometric Measurement for an Environment

The appropriate biometric measurement must be used for an environment. The type of environment depends on the location in the network of the biometric device that will be reading the biometric measurement. As mentioned above, biometric devices utilize a scientific technique to identify a user based on compared measurements of unique personal characteristics. Biometric measurements, may include, but are not limited to, measurements of finger and hand geometry, retina and facial images, weight, DNA data, breath, voice, typing stroke and signature. There are two aspects of the environment that must be addressed in order to determine the appropriate biometric measurement for that particular environment: a physical aspect and a psychological aspect.

The physical aspect of the environment involves, but is not limited to, lighting and noise. For example, in an environment with poor lighting, a user's iris or facial image may be difficult for the biometric device to measure. Likewise, in a noisy environment a user's voice may be hard to measure.

The psychological aspect of the environment involves the comfort level of users. An example of exceeding a user's comfort level is requiring a user to give a DNA sample to gain access to enterprise resources he or she must access every day. There are certain comfort levels that users of a network have come accustomed to and may refuse to exceed that level.

The result of not using the appropriate biometric measurement for the environment increases the likelihood that the user will not gain access to required resources when needed, thus decreasing enterprise productivity. This happens when the biometric device cannot read a biometric measurement or when users refuse to give the required "live" biometric data for authentication. Therefore, what is needed is the flexibility to use the appropriate biometric measurement for the environment.

The flexibility to use the appropriate biometric measurement for the environment results in the need for many different types of off-the-shelf biometric devices in a single network. Therefore, the authentication task is often complicated by the fact that each of the biometric devices may be provided by several vendors. Currently, biometric devices must conform to a pre-defined interface (or standard) to operate as a part of an integrated network. While the availability of each biometric device from multiple vendors may lead to reduction in prices, the management of networks having biometric devices from different vendors poses additional limitations.

For example, some vendors may allow their biometric devices to be managed from proprietary platforms only. Some vendors may support standards based network management applications (e.g., Simple Network Management Protocol), but the integration of the management of their devices into a network often requires extensive training. For example, the installation of the software to work (i.e., interface) with a network may require training from the vendor. Administrators may need more training for providing on-going support. Such training may need to be provided each time a new biometric device is added to the network. In addition, substantial effort may be required on the part of the vendors to develop software which interfaces with an enterprise's existing network. The resulting overhead due to development and training is unacceptable in most enterprises. This problem of conformity to a pre-defined interface to operate as a part of an integrated network applies equally as well to non-biometric devices.

6. Open Interface

The open interface of the present invention includes a device open interface to allow for the integration of biometric system 102 with biometric devices. The device open interface of the present invention provides an interface that all incompatible biometric and non-biometric devices can communicate with. This provides flexibility to an enterprise in several ways. One way it provides flexibility is that an enterprise can now use the appropriate biometric measurement for the environment.

Another way the present invention's device open interface provides flexibility is by allowing an enterprise to integrate existing non-biometric devices into biometric system 102 (FIG. 1). This flexibility is important because all users within an enterprise do not have to be enrolled into biometric system 102 at the same time. Also, some users may never have to be enrolled into biometric system 102 and still be able to gain access to network system 202 (FIG. 2).

Another flexibility provided by the device open interface is by allowing an enterprise to supplement biometric system 102 with non-biometric devices or new biometric devices as they are developed. As mentioned above, biometric devices utilize a scientific technique to identify a user based on biometric measurements. The device open interface provided by the present invention allows an enterprise the flexibility to use any off-the-shelf biometric or non-biometric device to protect a resource. As will be shown later, the flexibility of the open interface enables administrators to combine biometric devices via biometric policies for the authentication of users.

The device open interface is propriety software that is used to communicate to biometric devices in order to retrieve live sample data, match live sample data against stored data (i.e., biometric templates), enroll an individual on each biometric device, and allow administrators to set threshold values. A threshold value indicates the level of identification the biometric device must determine for the user to pass the device. Furthermore, the device open interface has the ability to detect that the biometric device is present, signs of life readings (e.g., that a human is actually present and not a mannequin), etc.

Other open interfaces can be added as needed, including an application open interface, a database open interface and a directory open interface.

B. Preferred Implementation of the Present Invention

1. A Preferred Environment

Figure 3:
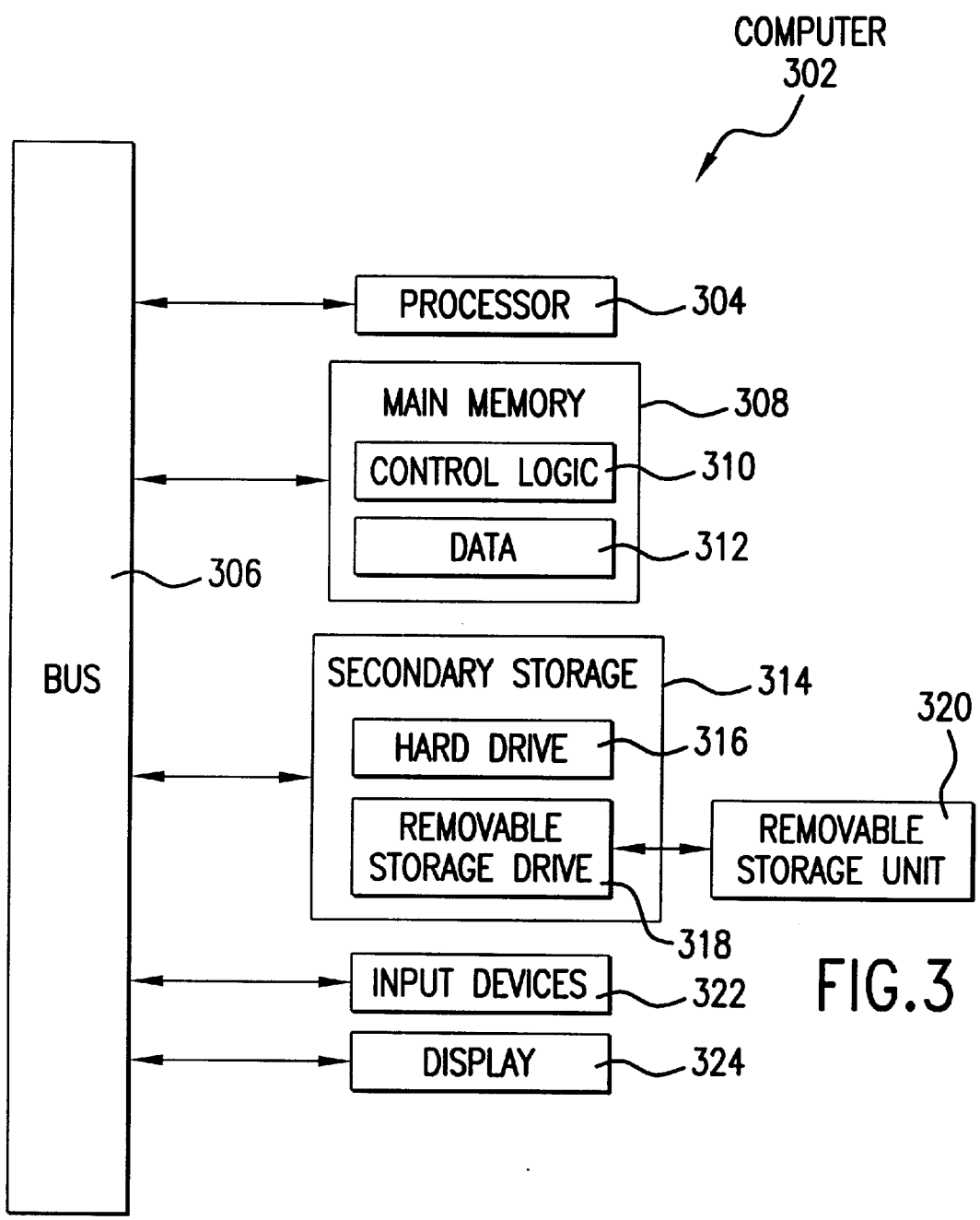
FIG. 3 is a block diagram of a computer system preferably used to implement the present invention.

Biometric server 104, enrollment station 106, administration station 108, alternate biometric server 110 and satellite enrollment station 112 could be implemented using computer 302 as shown in FIG. 3. Obviously, more than one of these functional components could be implemented on a single computer 302.

Computer 302 includes one or more processors, such as processor 304. Processor 304 is connected to communication bus 306. Computer 302 also includes main memory 308, preferably random access memory (RAM). Control logic 310 (i.e., software) and data 312 (such as the data stored in biometric server 104) are stored in the main memory 308, and may also be stored in secondary storage 314.

Computer 302 also includes secondary storage 314. Secondary storage 314 includes, for example, hard disk drive 316 and/or removable storage drive 318, representing a floppy disk drive, a magnetic tape drive, a compact disk drive, etc. Removable storage drive 318 reads from and/or writes to removable storage unit 320 in a well known manner.

Removable storage unit 320, also called a program storage device or a computer program product, represents a floppy disk, magnetic tape, compact disk, etc. As will be appreciated, removable storage unit 320 includes a computer usable storage medium having stored therein computer software and/or data.

Computer programs (also called computer control logic) are stored in main memory 308, secondary storage 314 and/or removable storage unit 320. Such computer programs, when executed, enable computer 302 to perform the functions of the present invention as discussed herein. In particular, the computer programs, when executed, enable processor 304 to perform the functions of the present invention. Accordingly, such computer programs represent controllers of computer 302.

In another embodiment, the invention is directed to a computer program product comprising a computer readable medium having control logic (computer software) stored therein. The control logic, when executed by processor 304, causes processor 304 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant art(s).

Computer 302 also includes input devices 322 and display devices 324. Input devices 322 include a keyboard, a mouse, a microphone, a camera, etc. Display devices 324 include a computer monitor, a printer, a speaker, a projector, etc.

2. A Preferred Software Programming Language and Network Architecture

As discussed above, computer programs when executed, enable computer 302 to perform the functions of the present invention as discussed herein. In a preferred embodiment, the present invention is implemented using computer programs written in an object-oriented programming language. Object-oriented programming is a type of programming in which programmers define not only the data type of a data structure, but also the types of operations (functions) that can be applied to the data structure. In this way, the data structure becomes an object that includes both data and functions. In addition, programmers can create relationships between one object and another. For example, objects can inherit characteristics from other objects.

One of the principal advantages of object-oriented programming techniques over procedural programming techniques is that they enable programmers to create modules that do not need to be changed when a new type of object is added. A programmer can simply create a new object that inherits many of its features from existing objects. This makes object-oriented programs easier to modify. To perform object-oriented programming, one needs an object-oriented programming language (OOPL). C++ and Smalltalk are two of the more popular languages, and there are also object-oriented versions of Pascal.

While a preferred embodiment of the present invention is implemented using computer programs written in an object-oriented programming language, the present invention can also be implemented using procedural programming languages, etc.

As discussed above, one or more of computers 302 is connected by a network. A preferred embodiment of the present invention uses a type of network architecture called a peer-to-peer object architecture. Before peer-to-peer object architecture can be understood, a type of network architecture called client/server architecture must be described. Client/server architecture is a network architecture in which each computer or process on the network is either a client or a server. Servers are computers or processes dedicated to managing disk drives (file servers), printers print servers), applications/functions or network traffic (network servers). In fact, a server is any computer or device that allocates resources for an application. Clients are personal computers or workstations on which users run applications. Clients rely on servers for resources, such as files, devices, execution of functions and even processing power.

FIG. 4 illustrates the dynamic steps to establish communication that occur between a client and a server executing an object-oriented program. In FIG. 4A, the client has switchboard object 402 and listen object 404 waiting for a request from the server. In FIG. 4B, init object 406 determines that it needs to perform a specific task. In FIG. 4C, init object 406 creates comm object 408. Comm object 408 is used to communicate with the client. Then, comm object 408 makes a connection to listen object 404 in FIG. 4D. Once comm object 408 makes the connection, listen object 410 creates comm object 410 and relocates comm object 410 to switchboard object 402. Comm object 410 is used to communicate back to the server (i.e., between the two piers), via comm object 408.

Figure 4F:
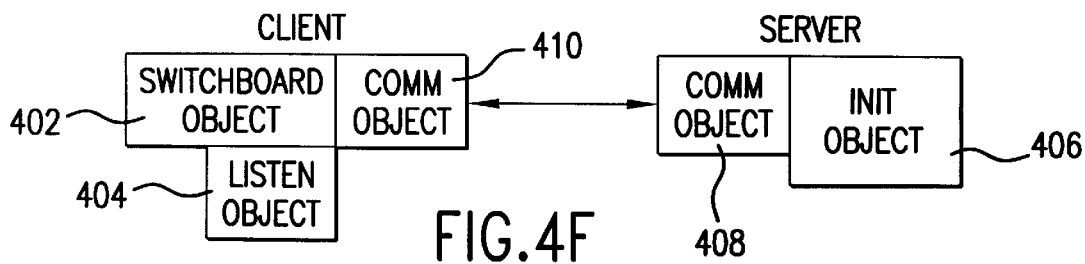
FIG. 4 illustrates the dynamic steps to establish communication between a client and a server executing an object-oriented program. For illustration purposes.
Figure 4G:
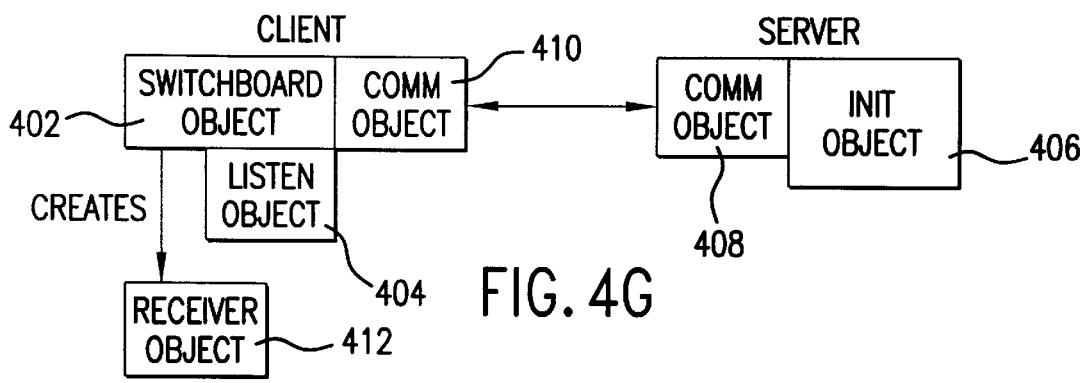
Figure 4H:
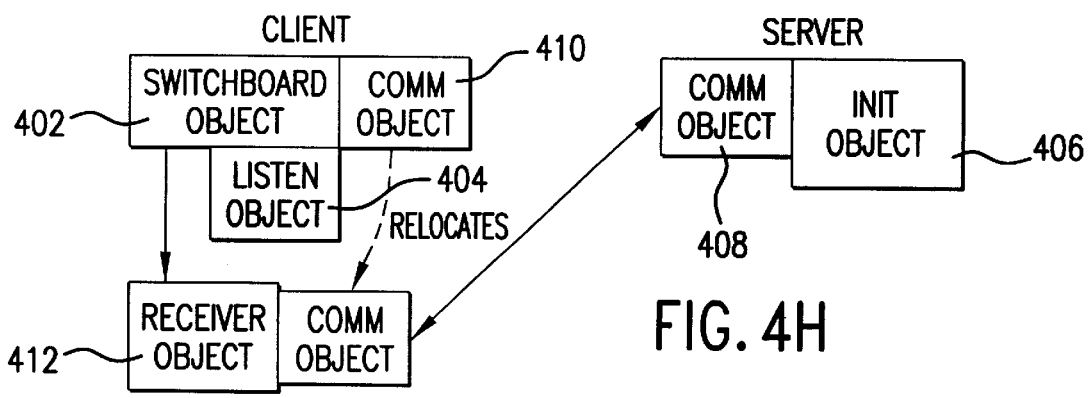
Figure 4I:
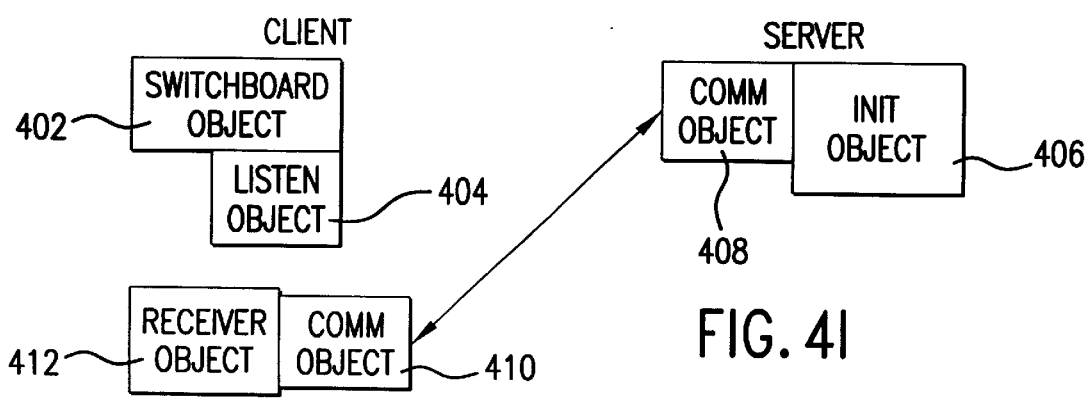

At this point, as shown in FIG. 4F, there is two-way communication between the client and the server (i.e., between the two piers) through comm object 408 and comm object 410. Init object 406 knows which receiver object needs to be created by the client (i.e., receiving pier) to preform the specific task required. Therefore, once this communication is established, init object 406 sends a request to the client (i.e., receiving pier) to create the specific receiver object. In FIG. 4G, switchboard object 402 receives the request, via comm object 410, and creates receiver object 412. Once receiver object 412 is created, comm object 410 is relocated to receiver object 412 in FIG. 4H. Now, as shown in FIG. 4I, init object 406 and receiver object 412, via comm object 408 and comm object 410, can communicate back and forth until receiver object 412 completes the task requested by init object 406.

As stated above, a preferred embodiment of the present invention uses a type of network architecture called a peer-to-peer object architecture. A peer-to-peer object architecture is when each computer in the network has equivalent capabilities and responsibilities. This differs from client/server architectures, in which some computers are dedicated to serving the others. Therefore, in a preferred embodiment of the present invention, all computers 302 can operate as either a server or a client.

As discussed above, one advantage of using an object-oriented programming language is that it allows programmers to create modules that do not need to be changed when a new type of object is added. This advantage will be further illustrated as the present invention is described in detail.

C. Biometric Server Data of the Present Invention

As stated above, biometric server 104 of FIG. 1 is the engine of biometric system 102. In fact, it is this engine that ultimately determines whether or not a user is authenticated by biometric system 102. In addition, biometric server 104 stores data accessed by biometric system 102. The data stored in biometric server 104 can be configured in one of two ways. One way is through the use of a database. The other way is through the use of a directory.

The first way that data in biometric server 104 can be configured involves the use of a database to facilitate access to the data. In general, a database is a collection of information organized in such a way that a computer program can quickly select desired pieces of data. A database is similar to an electronic filing system. To access information from a database, you need a database management system (DBMS). This is a collection of programs that enables you to enter, modify organize, and select data in a database.

Traditional databases are organized by tables, fields, records, and files. A field is a single piece of information; a record is one complete set of fields; and a file is a collection of records. For example, a telephone book is analogous to a file. It contains a list of records, each of which consists of three fields: name, address, and telephone number.

An alternative concept in database design is known as Hypertext. In a Hypertext database, any object, whether it be a piece of text, a picture, or a film, can be linked to any other object. Hypertext databases are particularly useful for organizing large amounts of disparate information, but they are not designed for numerical analysis.

The present invention may also be implemented using a standard database access method called Open DataBase Connectivity (ODBC). The goal of ODBC is to make it possible to access any data from any application, regardless of which DBMS is handling the data. ODBC manages this by inserting a middle layer, called a database driver, between an application and the DBMS. The purpose of this layer is to translate the application's data queries into commands that the DBMS understands. For this to work, both the application and the DBMS must be ODBC-compliant—that is, the application must be capable of issuing ODBC commands and the DBMS must be capable of responding to them.

The second way that data in biometric server 104 can be configured involves the use of a directory to facilitate access to the data. A preferred embodiment of the present invention utilizes a hierarchical directory called a X.500 directory. X.500 directories are hierarchical with different levels for each category of information, such as country, state, and city. In addition to utilizing a X.500 directory, a Lightweight Directory Access Protocol (LDAP) may also be utilized.

LDAP is a set of protocols for accessing directories. LDAP is based on the standards contained within the X.500 standard, but is significantly simpler. And unlike X.500, LDAP supports TCP/IP, which is necessary for any type of Internet access. Although not yet widely implemented, LDAP should eventually make it possible for almost any application running on virtually any computer platform to obtain directory information, such as email addresses and public keys. Because LDAP is an open protocol, applications need not worry about the type of server hosting the directory.

In the following sections, the various collections of data stored in biometric server 104 are first discussed with reference to FIG. 5. Next, with reference to FIG. 6, a typical sequence of steps an administrator may take to initially setup biometric server 104 is discussed. Engine functions of biometric server 104 is discussed in Section D with reference to FIGS. 7–13.

1. Data Stored in Biometric Server

Figure 5:
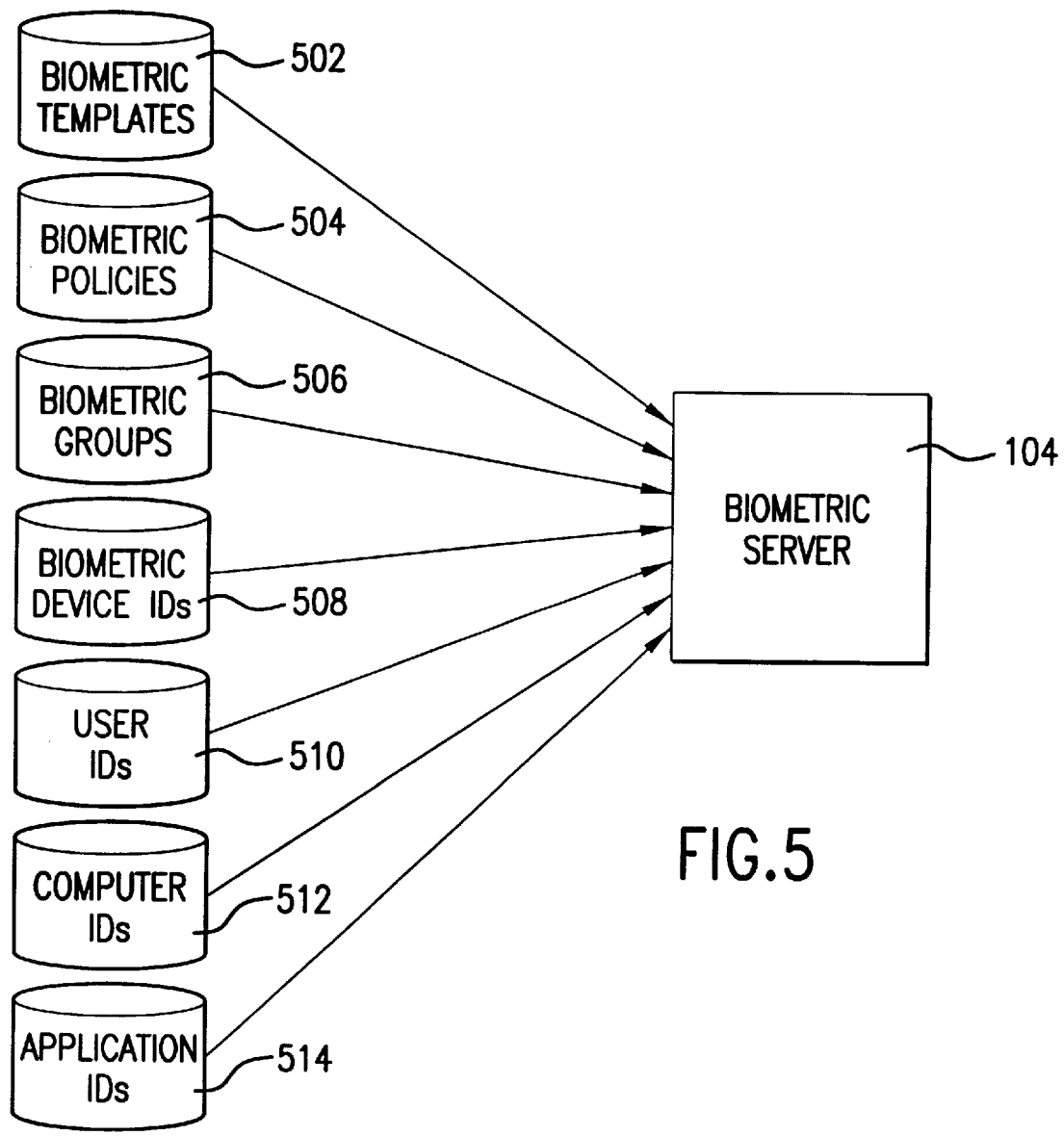
FIG. 5 illustrates various collections of data stored in the biometric server of the present invention.

In FIG. 5, biometric server 104 (FIG. 1) stores collections of biometric templates 502, biometric policies 504, biometric groups 506, biometric device IDs 508, user IDs 510, computer IDs 512 and application IDs 514. One or more unique biometric template 502 is created and stored in biometric server 104 each time a user enrolls on a different biometric device. Biometric template 502 stores the user's unique biometric measurement for a particular biometric device, which is then used to match against the user's "live" biometric measurement when the biometric device is attempting to identify the user.

Biometric policies 504 determine the method or way in which a user is to be authenticated by biometric server 104. Specific pre-defined policies provided by the present invention include an OR policy, an AND policy, a CONTINGENT policy, a RANDOM policy and a THRESHOLD policy. The present invention also allows the administrator to define other biometric policies 504. The specific way in which each policy is executed is described later in detail.

Each pre-defined biometric policy 504 has a list of devices associated with it. The list of devices identifies the biometric devices that are used to execute the particular biometric policy 504. Each biometric device in the list of devices has a threshold value and a timeout value associated with it. The threshold value (e.g., false acceptance rate) indicates the level of identification the biometric device must determine for the user to pass the device. The timeout value indicates the time in which the biometric device has to identify the user to the level of identification indicated by the threshold value.

Each administrator defined biometric policy 504 can either have a list of biometric policies or a list of policies or devices. The list of biometric policies identifies the biometric policies that are used to execute the particular biometric policy 504. The list of policies or devices identifies the biometric policies and/or devices that are used to execute the particular biometric policy 504.

FIG. 5 illustrates that biometric groups 506 are also stored in biometric server 104. Biometric groups 506 are a logical way of combining one or more users that need access to the same set of resources. For example, all users in the accounting department of an enterprise need specific resources to perform accounting tasks. Therefore, one of biometric group 506 can be defined as "accounting group." Here, when a user is put into "accounting group," that user (once authenticated by biometric system 102) has access to the same resources as all the other users in "accounting group."

Each user can be put into one or more biometric groups 506. When the user attempts to gain access to a resource in a particular group, the user must be authenticated by whichever biometric policy 504 is associated with that particular group. When a user first attempts to log into network system 202, biometric system 102 may be implemented so that the user has a default biometric group 506 and is therefore first authenticated by the biometric policy 504 associated with the user's default biometric group 506. An example of default biometric groups 506 may be dependent on the location from which the user is attempting to gain access to network system 202. Possible different locations include from a location within network system 202 itself and from a remote location outside of network system 202.

Another way in which multiple biometric groups 506 for a single user may be implemented in biometric system 102 is to query the user for the biometric group 506 in which the user wishes to be authenticated into. An additional way is for biometric system 102 to prioritize each user's biometric groups 506. Here, if the user is authenticated by biometric system 102 into a biometric group 506 with a higher priority, then the user is automatically authentication into the user's biometric groups 506 that have a lower priority. One possible way in which the priority scheme may be implemented is to give a higher priority to biometric groups 506 that the most difficult biometric policies 504 associated with them.

A biometric device ID 508 identifies a biometric device. Each biometric device has a unique ID. Thus, the collection of biometric device IDs 508 of FIG. 5 allows the present invention to uniquely identify each biometric device in network system 102 (FIG. 2). Similarly, a user ID 510 uniquely identifies a user in network system 102.

As discussed above, various points a user may be required to be authenticated at by biometric system 102 include network system 202, one or more host computers, application 204 and/or user computer 208 of FIG. 2. Each computer 208 and application 204 within network system 202 must be registered. This registration is done by assigning unique IDs to each computer 208 and application 204, as will be discussed below. A computer ID 512 uniquely identifies each computer 208 in network system 202. Similarly, an application ID 514 uniquely identifies each application 204 in network system 202. Thus, collections of computer IDs 512 and application IDs 514 allow the present invention to uniquely identify each location in network system 120 that a user may be required to be authenticated at by biometric system 102.

2. Setup of Biometric Server Data

Figure 6:
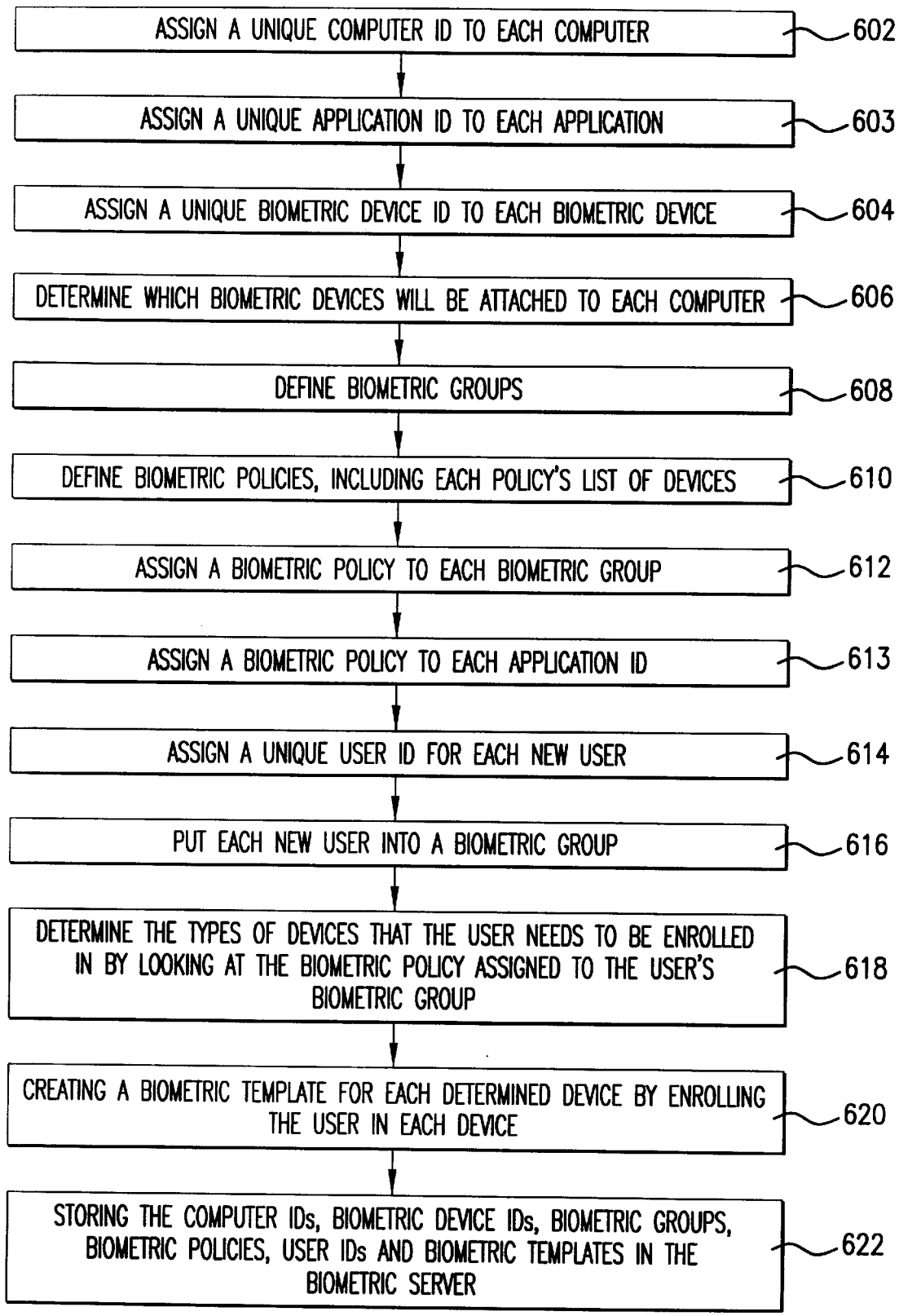
FIG. 6 is a flowchart illustrating a typical sequence of steps an administrator may take to initially setup a biometric server.

In the present invention, preferably the administrator of biometric system 102 determines the data that is stored in biometric server 104. FIG. 6 is a flowchart illustrating a typical sequence of steps an administrator may take to initially setup biometric server 104. In step 602, a unique computer ID 512 is assigned to each computer in network system 202. In step 603, a unique application ID 514 is assigned to each application in network system 202. Similarly, in step 604, a unique biometric device ID 508 is assigned to each biometric device in network system 202. Next, as shown in step 606, a determination is made as to which biometric devices will be attached to each computer 208 (FIG. 2).

In step 608, biometric groups 506 to be used within biometric system 102 are defined. In particular, the administrator defines each biometric group 504 by determining a logical grouping of resources within network system 202 that each member of that biometric group 504 will need to access. Next, in step 610, biometric policies 504 are defined. Each biometric policy 504 has associated with it a list of devices. Biometric policies 504 determine the method or way in which a user is to be authenticated by biometric server 104. One biometric policy 504 is assigned to each biometric group 506 in step 612. In step 613, one biometric policy 504 is assigned to each application ID 514.

In step 614, for every user that needs to gain access to network system 202 resources, the user is assigned a unique user ID 510. Then, each new user is put into a biometric group 506 in step 616. Once the user's biometric group 506 is determined, then in step 618, the types of devices the user needs to be enrolled in are determined by looking at the biometric policy 504 assigned to the user's biometric group 506. Once it is known which biometric policy 504 will be applied, a biometric template 502 is created for each biometric device 508 associated with the biometric policy 504 by enrolling the user in each device. This is shown in step 620. Alternatively, a biometric template 502 can be created for each biometric device within network system 202. Finally, in step 622, each computer ID 512, biometric device ID 508, biometric group 506, biometric policy 504, user ID 510, biometric template 502 and application ID 514 is stored in biometric server 104.

The steps shown in FIG. 6 can be performed in a variety of orders as should be apparent to those skilled in the art. Once biometric server 104 is setup (i.e., biometric templates 502, biometric policies 504, biometric groups 506, biometric device IDs 508, user IDs 510, computer IDs 512 and application IDs 514 are all defined) the administrator interacts via a graphical user interface (GUI) to customize biometric server 104.

Figure 14:
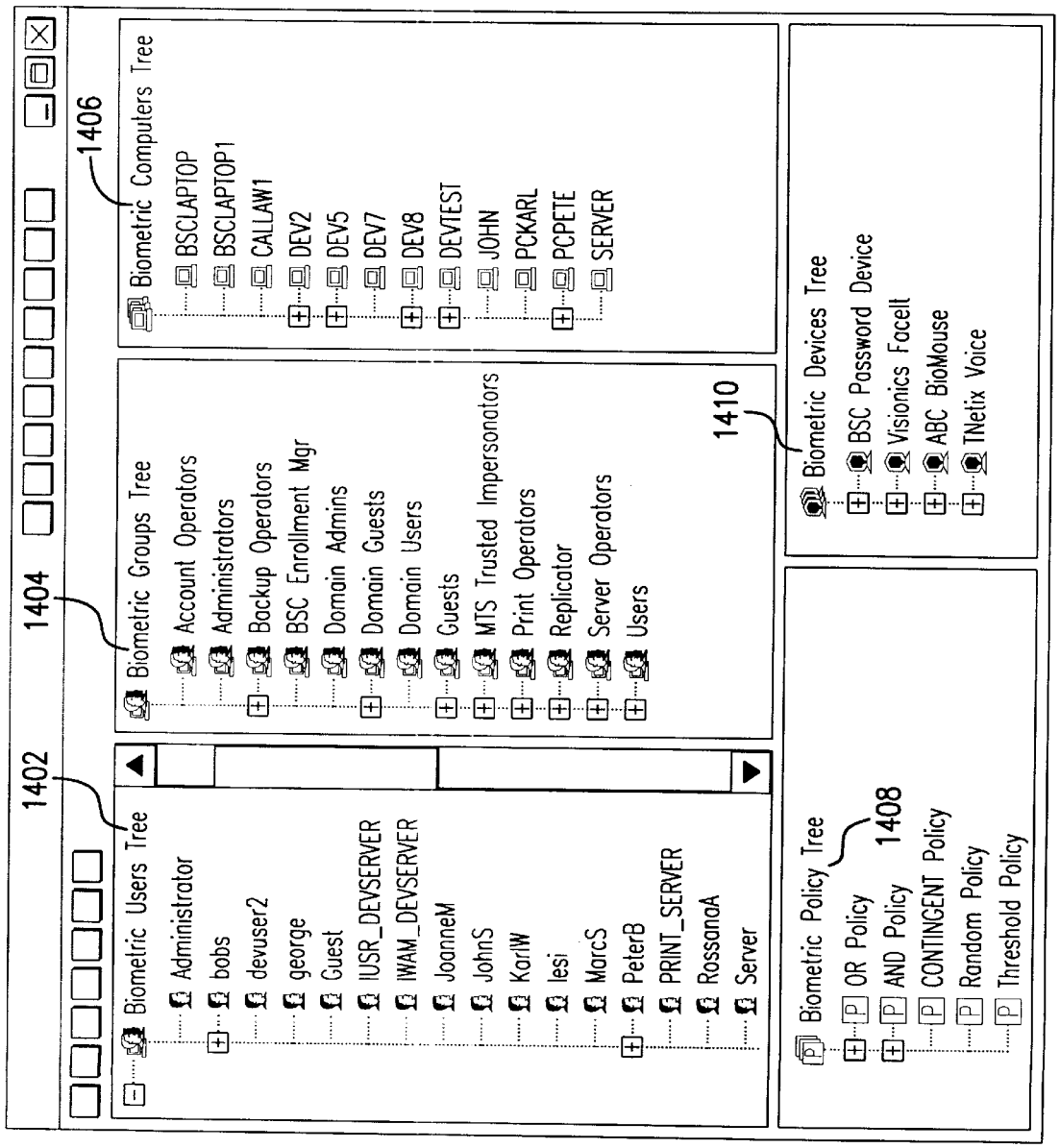
FIG. 14 is a window or screen shot generated by the graphical user interface of the present invention.

FIG. 14 is a sample window or screen shot generated by the GUI of the present invention. FIG. 14 illustrates the data stored in biometric server 104 as being logically stored in five tree structures (with the exclusion of application IDs 514). The five tree structures include biometric users tree 1402, biometric groups tree 1404, biometric computers tree 1406, biometric policy tree 1408 and biometric devices tree 1410. Biometric users tree 1402 includes a list of user IDs 510 registered by the administrator. As illustrated in FIG. 14, "Administrator" and "bobs" are two examples of user IDs 510. Biometric groups tree 1404 includes a list of biometric groups 506 as defined by the administrator. Examples of biometric groups include "Account Operators" and "Administrators."

Biometric computers tree 1406 includes a list of computer IDs 512. The list of computer IDs 512 represent the computers registered by the administrator. Examples of computer IDs 512 includes "BSCLAPTOP" and "BSCLAPTOP 1." The fourth tree illustrated in FIG. 14 is biometric policy tree 1408. Biometric policy tree 1408 includes the list of both pre-defined and administrator-defined biometric policies 504. Pre-defined biometric policies 504 include "OR policy," "AND policy," "CONTINGENT policy," "RANDOM policy" and "THRESHOLD policy." Finally, biometric devices tree 1410 includes a list of biometric device IDs 508 registered by the administrator. Examples of biometric device IDs include "BSC Password Device" and "Visionics FaceIt."

An additional tree structure not shown in FIG. 14 is an application tree. As discussed above, a user may be required to be authenticated if the user attempts to access a particular application associated with a biometric policy 504. Although an application tree is not shown in the sample window of FIG. 14, the GUI of the present invention may be modified to include not only an application tree, but any other type of tree the administrator may deem to be desirable.

The present invention also allows for an administrator to define information groups. Information groups are a logical way of combining users that need access to the same types of information within each application in network system 202. For example, one possible type of application within network system 202 is a database containing information about each user. The administrator of biometric system 102 may determine that only the human resource department should have access to user medical information. Here, one information group can be defined as "medical information." The users put into "medical information" are only those users in the human resource department. Therefore, a biometric policy 504 can be associated either directly with an application ID or with an information group to authenticate users prior to allowing them access to information in applications.

The present invention, through the use of the GUI, is preferably implemented as a "drag and drop" application. "Drag and drop" applications allow an administrator to drag objects to specific locations on the screen to perform actions on them. For example, in the Macintosh environment, you can drag a document to the trashcan icon to delete it. This is a classic case of "drag and drop" functionality. When implemented well, drag-and-drop functionality is both faster and more intuitive than alternatives, such as selecting options from a menu or typing in commands. Nevertheless, the present invention is not limited to being implemented as a "drag and drop" application.

Referring back again to FIG. 14, an example of "drag and drop" functionality is the ability of the administrator to drag the "OR Policy" to the "Administrators" biometric group to either define or redefine the policy for that group. Another example includes dragging user ID "Administrator" to the "Administrators" biometric group. Now, the user who has user ID "Administrator" must pass the "OR Policy" to be authenticated by biometric system 102 (FIG. 1).

The administrator may also drag a biometric policy 504 to an application ID 514 (not shown in FIG. 14). For example, if the administrator drags the "AND Policy" to a particular application ID, then every user who attempts to access the application that the application ID is assigned to must pass the "AND Policy." Thus, the present invention provides different levels of authentication granularity. For example, a particular user may be assigned to a biometric group 506 that allows access to a spreadsheet if the user passes two biometric devices. However, to gain access to a payroll application, the user must also pass a third biometric device. Users that are not members of the biometric group 506 do not even have the opportunity to access the payroll application. The present invention provides complete flexibility to protect network resources.

As mentioned above in reference to FIG. 6, in step 620, a biometric template 502 is created for the user for each biometric device that is determined to be in the list of devices associated with a biometric policy 504 that is further associated with the user's biometric group 506. Therefore, there is a possibility that a user may not be enrolled in a particular biometric device that the user is required to pass in order to gain access to a particular application. This situation occurs when the biometric policy 504 that is assigned to the user's biometric group 506 and the biometric policy 504 that is assigned to the application ID 514 have different biometric devices in their list of devices. One way to avoid such a situation is to enroll the user with every biometric device in biometric system 102 and not just with the biometric devices that are determined to be in the biometric policy's 504 list of devices that is associated with the user's biometric group 506.

As illustrated above, various duties exist within biometric system 102. The discussion above infers that it is the administrator who performs all of these duties. In actuality, these duties can be delegated to multiple people having different positions within biometric system 102 (FIG. 1). These positions can include an administrator (with limited duties from the ones described above), a biometric policy manager, a device hardware and software manager and an enrollment manager. The administrator has actual administrative privileges within biometric system 102. The actual duties of the administrator could be limited to the adding and deleting of users, biometric groups 506 (FIG. 5), computers 208 (FIG. 2) and applications 204 (FIG. 2) with biometric system 102. Another position within biometric system 102 is the biometric policy manager. This position is akin to a security officer. The biometric policy manager is responsible for defining biometric policies 504 and attaching them to both biometric groups 506 and application IDs 514. The biometric policy manager would also be responsible for the combinations of biometric devices and for the strength of the threshold value associated with each biometric device.

Another position within biometric system 102 is a device hardware and software manager. This person is responsible for managing the software and hardware for biometric devices within biometric system 102. The device hardware and software manager will install the biometric devices, keep the versions up to date and maintain the devices. The final position is an enrollment manager. This person is given the ability to enroll users onto biometric system 102. Responsibility includes taking the new users through the process of enrolling for the different devices. The enrollment manager is generally a nontechnical person working in the human resource department of an enterprise. For simplicity, the following discussion will refer only to an administrator. It should be understood that the administrator may be one person performing one, all, or any number of the positions described above.

D. Biometric Server Functions of the Present Invention

In one embodiment of the present invention, biometric server 104 is implemented as computer 302 operating as described in reference to FIG. 3 above. Computer 302 executes computer programs to enable it to perform the functions of the present invention. Thus, biometric server 104 executes computer programs to perform its functions. As discussed above, the computer programs executed by biometric server 104 are preferably written in an object-oriented programming language and executed in a peer-to-peer object architecture.

An advantage of any object-oriented program, and thus also with computer programs executed by biometric server 104, is that they enable programmers to create modules that do not have to be changed when a new type of object is added. An object includes both the data and functions required to perform a task. Thus, by implementing the functions to be performed by biometric server 104 as objects, created modules do not need to be changed when a new type of object (or function) is added. This implementation of the present invention reduces complexity and thus increases efficiency. This interchangeability of functions (implemented as objects) of the present invention is explained in more detail in reference to FIGS. 7, 8, 12 and 13 below.

Figure 12:
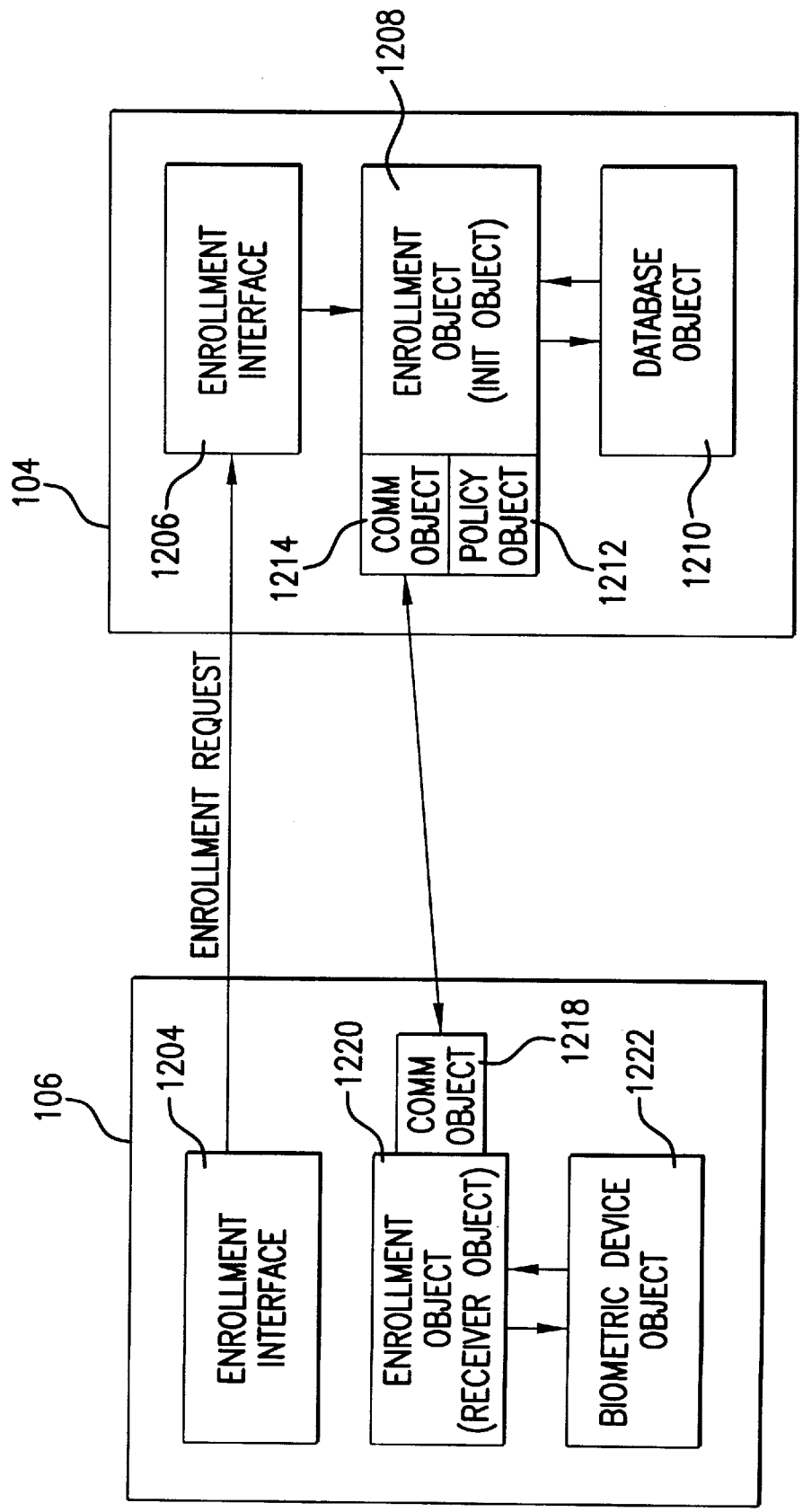
FIG. 12 is a block diagram of the objects involved in the enrollment process of the present invention.

Described above with reference to FIG. 4, is the dynamic steps involved in establishing communication between a client and a server executing an object-oriented program. As biometric server 104 of the present invention executes its various functions, the same dynamic steps involved in communication between the server and client occur for each function as shown in FIGS. 4A through 4I. FIG. 4 shows a generic init object 406 and a generic receiver object 412. As is shown in FIGS. 7 and 12, for each type of function performed by biometric server 104, init object 406 and receiver object 412 are replaced by specific init and receiver objects that perform their specific functions.

The types of functions performed by biometric server 104, through the execution of computer software, includes authenticating a user and enrolling a user. For simplicity, the figures used to illustrate the individual functions of biometric server 104 do not include switchboard object 402 and listen object 404 of FIG. 4.

1. Authenticating a User

Figure 7:
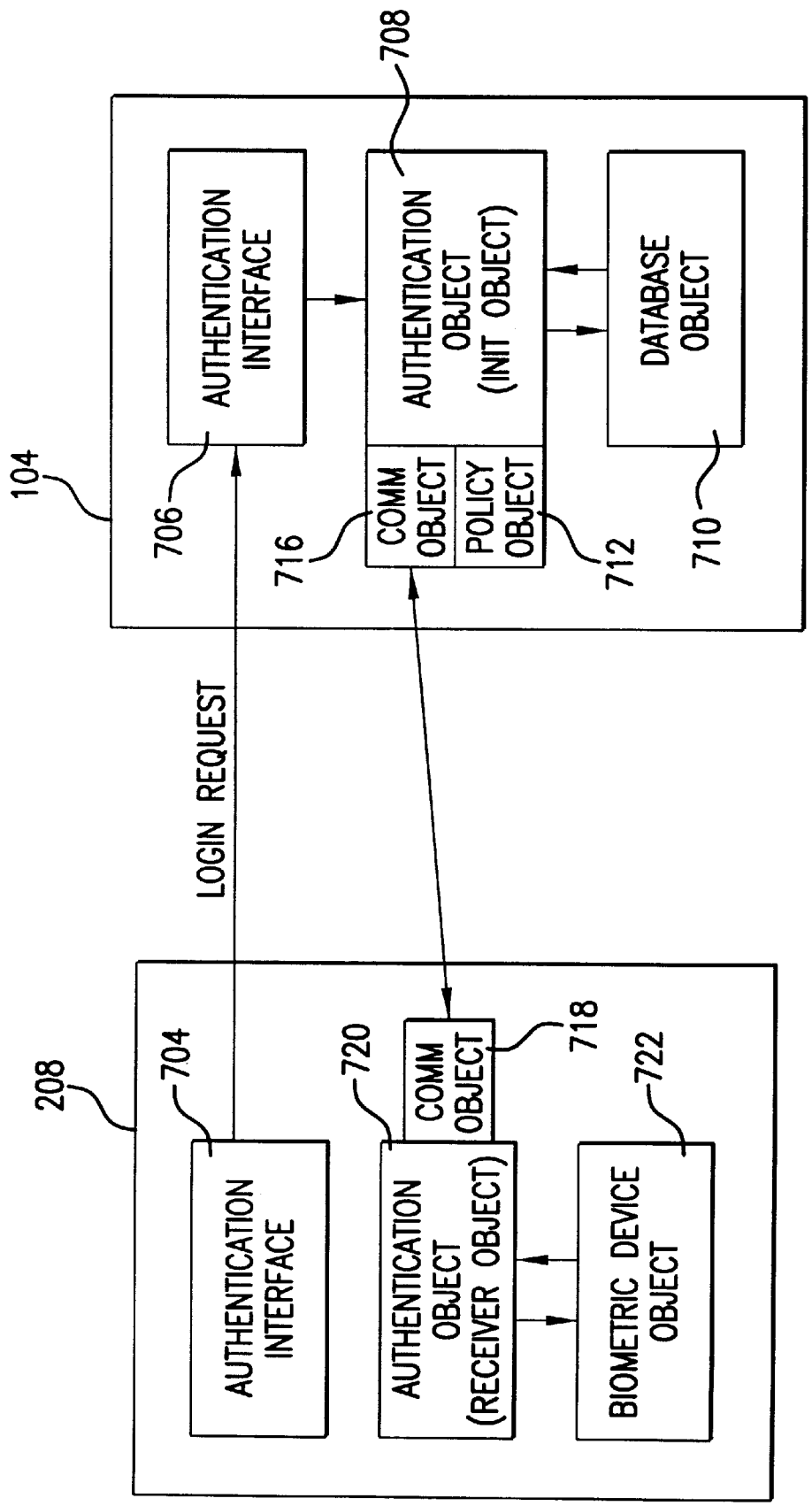
FIG. 7 is a block diagram of the objects involved in authenticating a user by the present invention.

FIG. 7 is a block diagram of the objects involved in authenticating a user of the present invention. As described above, a peer-to-peer object architecture is when each computer in the network has equivalent capabilities and responsibilities (e.g., a single computer can perform as a server and then at other times perform as a client). This allows for each computer in the network to initiate communication with any other computer in the network. FIG. 7 includes biometric server 104 (FIG. 1), computer 208 (or alternatively remote/web computer 210, both from FIG. 2), authentication interface 704, authentication interface 706, authentication object 708, database object 710, policy object 712, comm object 716, comm object 718, authentication object 720 and biometric device object 722. Here, biometric server 104 is performing as the server and computer 208 is performing as the client.

It is important to note that authentication interface 704 and authentication interface 706 are not part of the present invention. In fact, authentication interface 704 and authentication interface 706 are specific to the particular operating system and/or application the present invention is interfacing with. In general, operating systems provide a software platform on top of which other programs, called applications, can run. Applications must be written to run on top of a particular operating system. The choice of operating system, therefore, determines to a great extent the applications that can be run. Examples of operating systems include Windows NT, UNIX and Solaris. The present invention interfaces with the applicable operating system through application interface 706.

Authentication object 708 replaces init object 406 (FIG. 4). Authentication object 708 is used to request computer 208 to authenticate a user. Comm object 716 is attached to authentication object 708 and replaces comm object 408

(FIG. 4). Authentication object 708 and authentication object 720 communicate, via comm object 716 and comm object 718.

Policy object 712 is also attached to authentication object 708. Policy object 712 differs depending on the specific biometric policy 504 (FIG. 5). As discussed above, it is biometric policy 504 (FIG. 5) that determines the method or way in which a user is to be authenticated by biometric server 104. It is important to note that a user is not authenticated until he or she passes biometric policy 504. In the present invention, a user is never authenticated by solely passing one or more biometric devices without also passing his or her biometric policy 504. The type of communication between authentication object 708 and authentication object 720 is very dependent on the particular biometric policy 504 being used to authenticate the user.

In FIG. 7, database object 710 stores the data described above in reference to FIG. 5. The data includes collections of biometric templates 502, biometric policies 504, biometric groups 506, biometric device IDs 508, user IDs 510, computer IDs 512 and application IDs 514. Authentication object 720 replaces receiver object 412 (FIG. 4). Authentication object 720 is used to perform the specific task requested by authentication object 708. Comm object 718 replaces comm object 410 (FIG. 4). Finally, biometric device object 722 is used to identify the user by determining if the user passes the biometric device. Biometric device object 722 differs depending on what biometric device the user is attempting to pass.

Figure 8A:
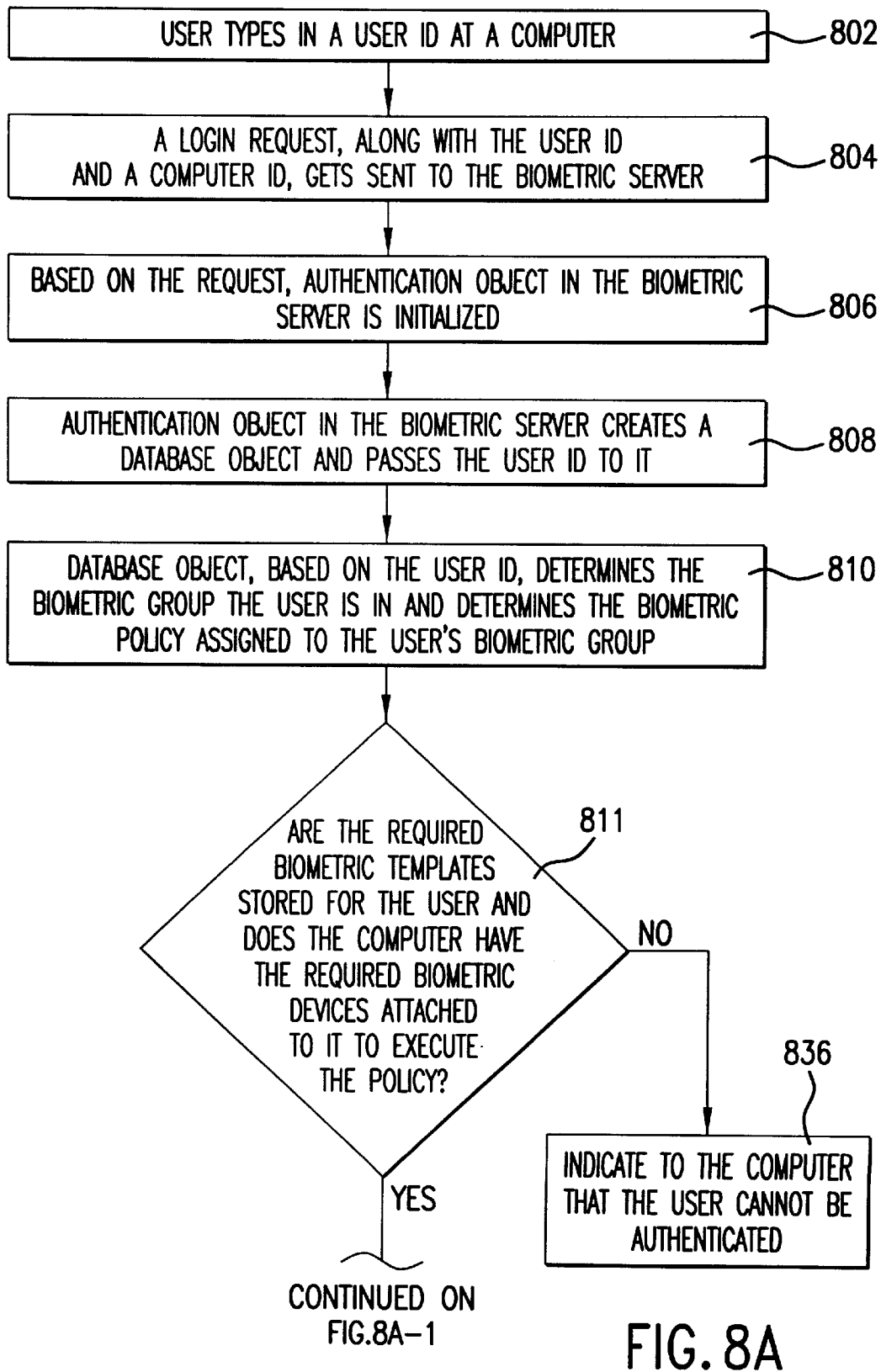
Figures 1, 8A:
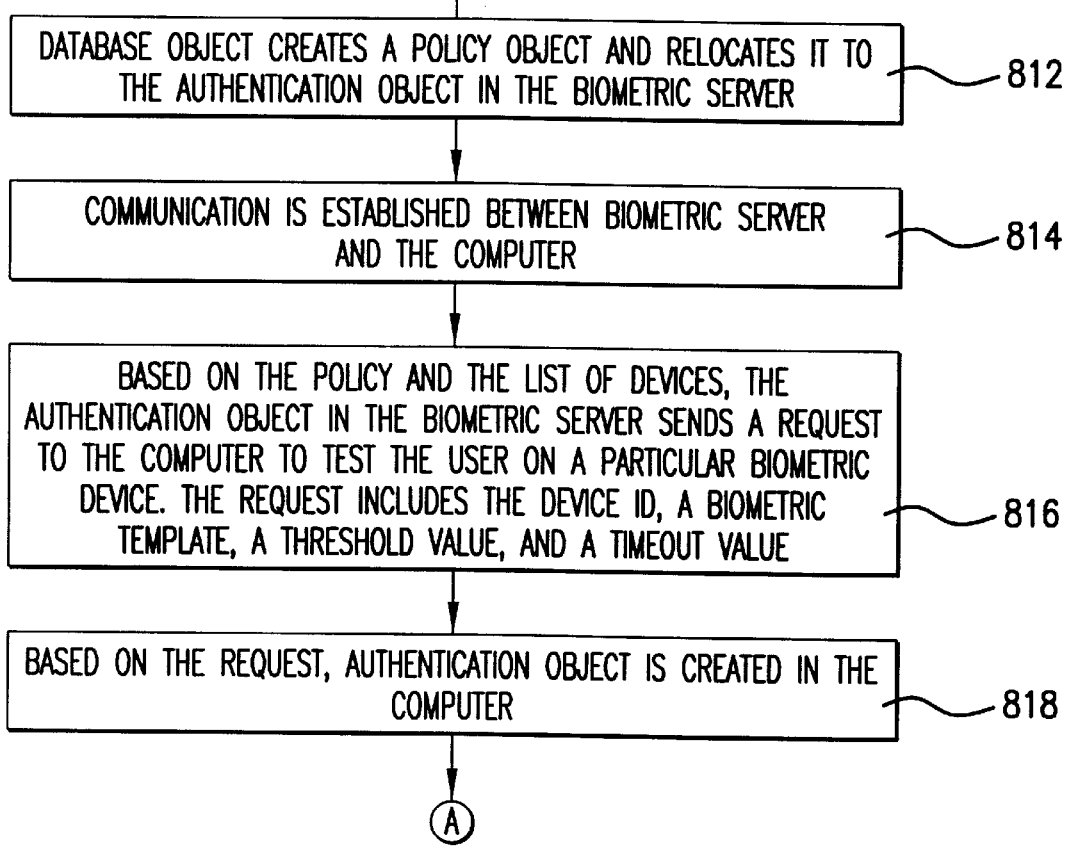
Figure 8B:
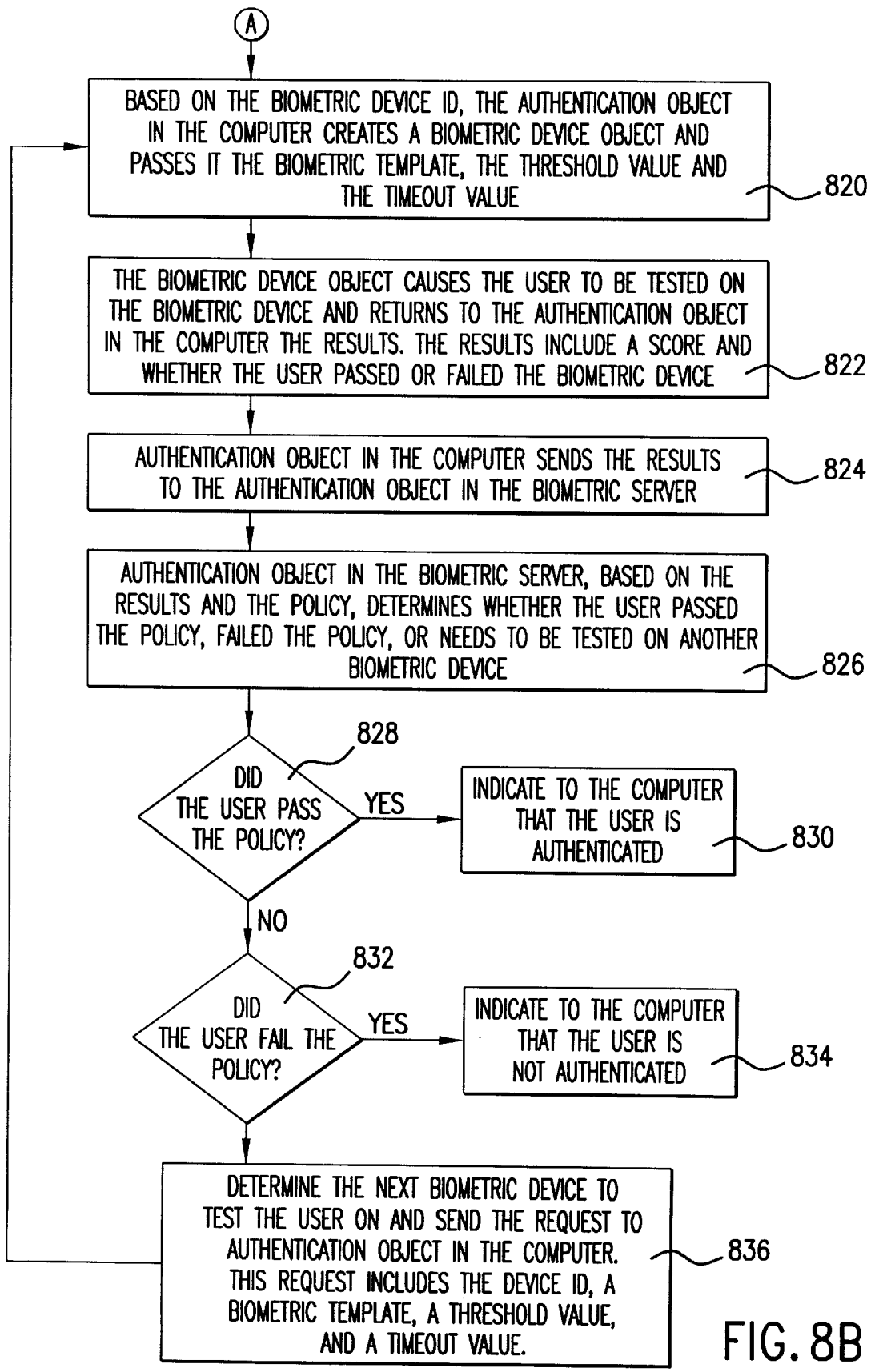

FIGS. 8A and 8B present a flowchart depicting the high-level operation of the objects in FIG. 7. In step 802, a user is at computer 208 and types in user ID 510 (FIG. 5) given to him or her by the administrator. Authentication interface 704 recognizes this as a login request. As mentioned above, to facilitate user access, each computer 208 provides an interface for users to be authenticated by biometric system 102 (FIG. 1). This interface is authentication interface 704. In step 804, authentication interface 704 sends the login request, which includes a computer ID 512 (FIG. 5) and user ID 510, to biometric server 104. Application interface 706 actually receives the login request. Based on the fact that the request is one for login, authentication object 708 gets initialized in step 806 (e.g., the login request starts the engine in biometric system 102). Prior to authentication object 708 being initialized, it is a generic init object 406 as described in reference to FIG. 4.

In step 808, authentication object 708 creates database object 710 and passes user ID 510 to it. Based on user ID 510, database object 710 determines the user's biometric group 506 (FIG. 5) in step 810. As described previously, the administrator has already determined which biometric group 506 the user is in. Based on biometric group 506, database object 710 determines the biometric policy 504 (FIG. 5) that is assigned to biometric group 506.

In step 811, database object 710 determines whether the required biometric templates 502 (FIG. 5) for the user are stored in biometric object 710 to execute the user's biometric policy 504. In addition, database object 710 also determines if computer 208 has the required biometric devices attached to it to execute the user's biometric policy 504. If the required biometric templates 502 or the required biometric devices do not exist, then control transfers to step 836. In step 836, biometric server 104 communicates, via authentication interface 706 and authentication interface 704, to computer 208 that the user cannot be authenticated. Authentication interface 704 then denies the user access. At this point the flowchart in FIGS. 8A and 8B ends.

Alternatively, if in step 811 the required biometric templates 502 and the required biometric devices do exist, then control transfers to step 812.

In step 812, database object 710 creates policy object 712 and relocates policy object 712 to authentication object 708. Policy object 712 knows the specific type of biometric policy 504 (e.g. OR policy, AND policy, etc.), the list of devices for biometric policy 504 and the required biometric templates 502. There is one biometric template 502 for each biometric device ID (FIG. 5) 508 listed in the list of devices. Each biometric template 502 contains the user's stored biometric data to be used in testing the user on a particular biometric device. In addition, each biometric device in the list of devices has associated with it a threshold value and a timeout value. As explained above, the threshold value indicates the level of identification the biometric device must determine for the user to pass the device. The timeout value indicates the time in which the biometric device has to identify the user to the level of identification indicated by the threshold value.

In step 814, communication is established between biometric server 104 and computer 208. This communication is established exactly as described in reference to FIG. 4. In step 816, based on biometric policy 504 and its list of devices, authentication object 708 sends a request to computer 208 to test the user on a particular biometric device. The request includes biometric device ID 508, biometric template 502, the threshold value and the timeout value. Biometric template 502, the threshold value and the timeout value are all determined by user ID 510 and biometric device ID 508.

In step 818, based on the request, authentication object 720 is created. In step 820, authentication object 720 looks at biometric device ID 508 and creates biometric device object 722. Authentication object 720 then passes to biometric device object 722 biometric template 502, the threshold value and the timeout value. In step 822, biometric device object 722 tests the user on the specific biometric device and returns the results to authentication object 720. The results include a score and whether the user passed or failed the biometric device. Authentication object 720 then sends the results back to authentication object 708 in step 824, via comm object 718 and comm object 716.

In step 826, authentication object 708 looks at both the results and policy object 712 and determines whether the user passed biometric policy 504, failed biometric policy 504 or needs to be tested on another biometric device. Policy object 712 determines how many different biometric devices the user needs to be tested on. In step 828, if the user passed biometric policy 504, then control transfers to step 830. In step 830, the fact that the user passed biometric policy 504 is communicated, via authentication interface 706 and authentication interface 704, to computer 208. Authentication interface 704 then allows the user access to enterprise resources. Alternatively, if in step 828, the user did not pass biometric policy 504, then control transfers to step 832.

In step 832, if the user failed biometric policy 504, then control transfers to step 834. In step 834, the fact that the user failed biometric policy 504 is communicated, via authentication interface 706 and authentication interface 704, to computer 208. Authentication interface 704 then denies the user access to enterprise resources. Alternatively, if in step 832, the user did not fail biometric policy 504, then control transfers to step 836. In step 836, the next biometric device to test the user on is determined and another request is sent to authentication object 720. At this point control returns to step 820 and the user gets tested on the next biometric device. The flowchart in FIG. 8 continues until the user either passes or fails biometric policy 504.

Figure 9:
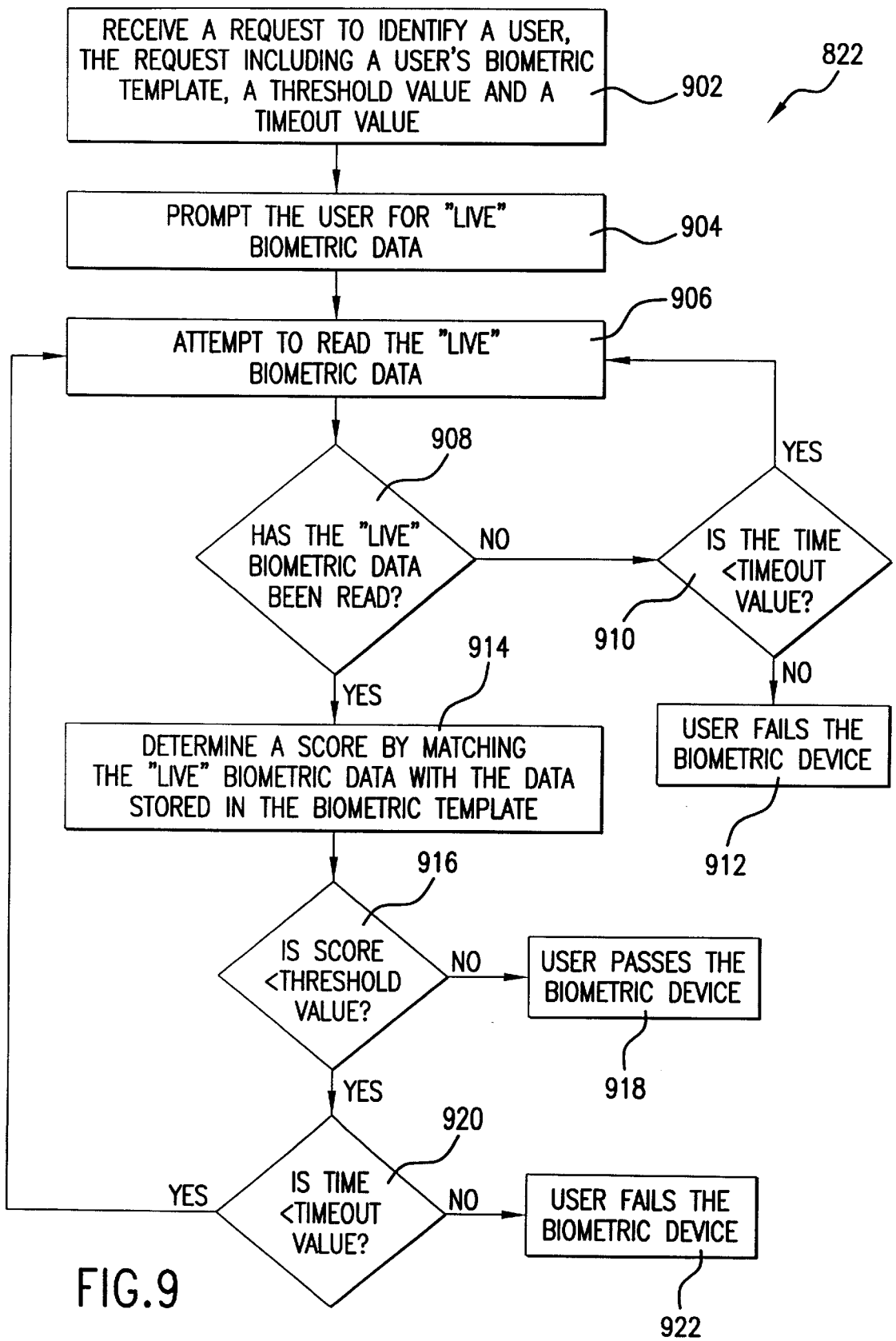
FIG. 9 is a flowchart illustrating the typical operation of a biometric device as it tests a user.

Step 822 of FIG. 8, is further explained in FIG. 9. FIG. 9 is a flowchart illustrating the typical operation of a biometric device as it tests a user. In step 902, the biometric device receives a request to test a user. The request includes the user's biometric template 502, a threshold value and a timeout value. Again, the threshold value and timeout value are user ID 510 and biometric device ID 508. In step 904, the biometric device prompts the user for "live" biometric data. In step 906, the biometric device attempts to read the "live" biometric data.

The biometric device, in step 908, determines whether or not the biometric data has been read. As discussed above, if the environment is not conducive for reading the particular biometric measurement (e.g., the environment has poor lighting and the biometric device is trying to read facial image data), then the biometric device may not be able to read the "live" biometric data. If the "live" biometric data has not been read in step 908, then in step 910, the actual time the biometric device has attempted to read the "live" biometric data is compared to the timeout value. If the actual time is greater than or equal to the timeout value, then control transfers to step 912 and the user fails the biometric device. Alternatively, if the actual time is less than the timeout value, then control transfers back to step 906 and the biometric device attempts to read the "live" biometric data again. This loop continues until either the "live" biometric data has been read or the actual time is greater than or equal to the timeout value (i.e., the time expires to read the "live" biometric data).

In step 908, if the "live" biometric data has been read, then control transfers to step 914. In step 914, a score is determined by matching the "live" biometric data with the data stored in biometric template 502. In step 916, the score determined by step 914 is compared to the threshold value. If the score is greater than or equal to the threshold value, then control transfers to step 918. In step 918, the user passes the biometric device and the flowchart in FIGS. 8A and 8B ends. Alternatively, in step 916, if the score is less than the threshold value then control passes to step 920. In step 920, the actual time is once again compared to the timeout value. If the actual time is greater than or equal to the timeout value, then control transfers to step 922 and the user fails the biometric device. At this point the flowchart in FIG. 9 ends. If the actual time is less than the timeout value, then control transfers back to step 906 and the device attempts again to read the "live" biometric data.

The process described above to authenticate a user shows biometric template 502 being matched on the client side (i.e., at computer 208). While this is a preferred embodiment of the present invention, it is important to recognize that biometric template 502 can just as easily be matched on the server side (i.e., at biometric server 104).

Figure 10:
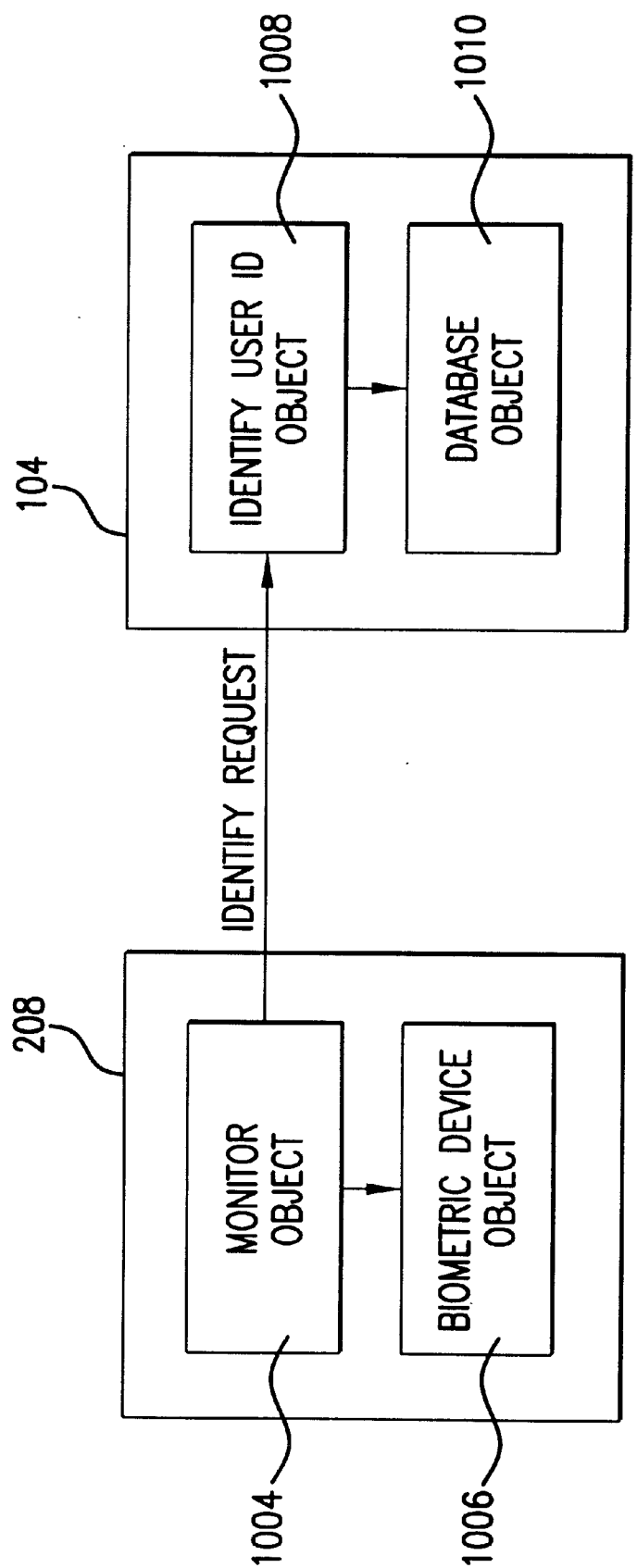
FIG. 10 is a block diagram of the objects involved in starting the authentication process of the present invention with "live" biometric data.

As pointed out above, it is the login request that starts the engine in biometric system 102 to authenticate a user. The login request is initiated by a user typing in a user ID 510 (FIG. 5). In another embodiment of the present invention, it is "live" biometric data that identifies the user and starts the engine in biometric system 102 to authenticate a user. FIG. 10 is a block diagram of the objects involved in starting the authentication process of the present invention with "live" biometric data. FIG. 10 includes computer 208 (or alternatively remote/web computer 210, both from FIG. 2), monitor object 1004, biometric device object 1006, identify user ID object 1008 and database object 1010.

Monitor object 1004 is provided by the present invention for each computer 208 in the enterprise where the administrator desires to have "live" biometric data start off the engine in biometric system 102 to authenticate a user. Monitor object 1004 is up and waiting for "live" biometric data to be presented. In addition, monitor object 1004 is specialized (e.g., a fingerprint monitor object waits for "live" fingerprint data and a facial image monitor object waits for "live" facial image data).

Figure 11:
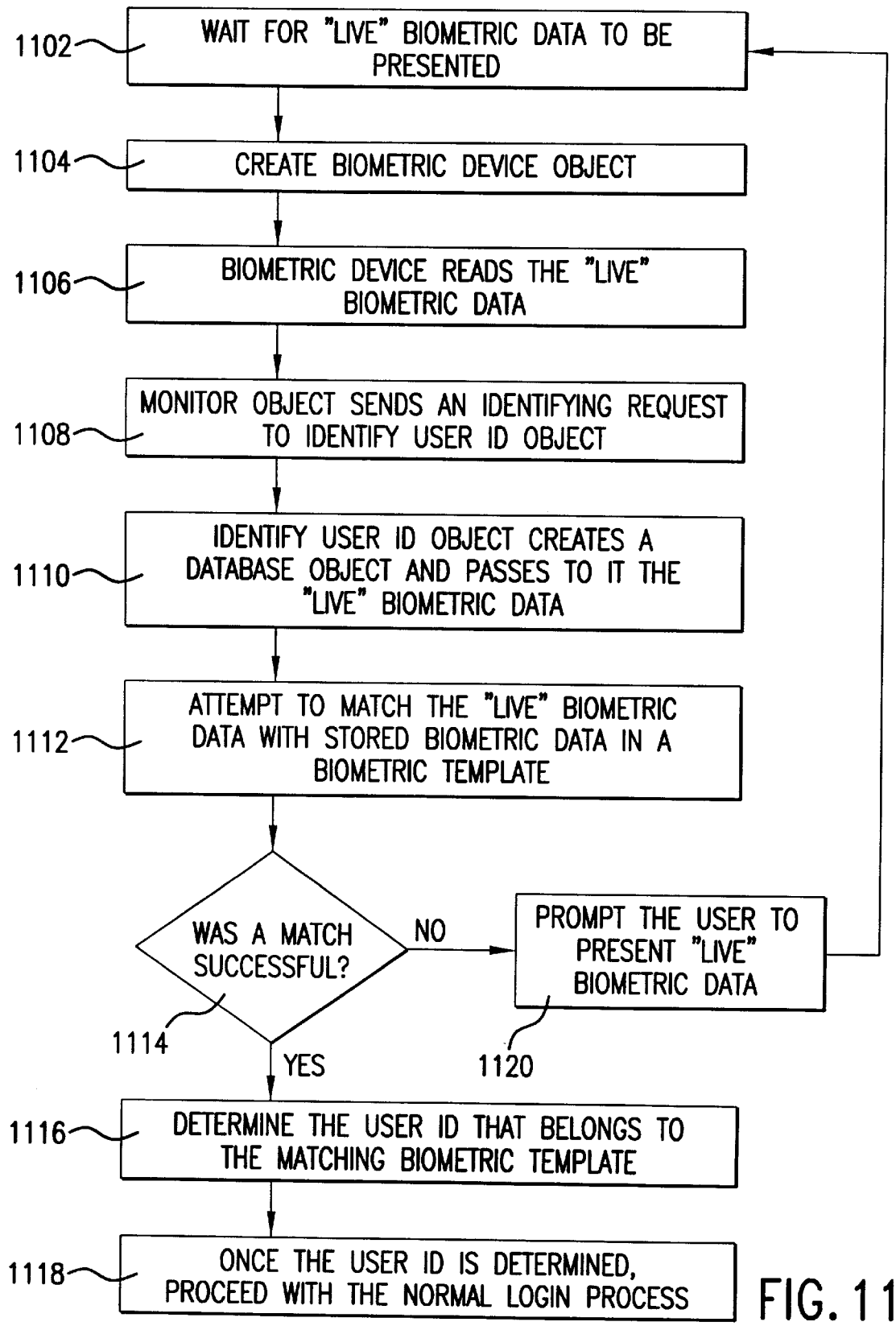
FIG. 11 presents a flowchart depicting the high-level operation of the objects in FIG. 10.

FIG. 11 presents a flowchart depicting the high-level operation of the objects in FIG. 10. In step 1102, monitor object 1004 is waiting for "live" biometric data to be presented. In step 1104, once "live" biometric has been presented, monitor object 1004 creates biometric device object 1006. Because monitor object 1004 is specialized, there is no need for monitor object 1004 to be aware of any biometric device IDs 508 (FIG. 5). In step 1106, biometric device object 1006 causes a biometric device to read the "live" biometric data. This "live" biometric gets returned to monitor object 1004.

In step 1108, monitor object 1004 sends an identify request to identify user ID object 1008. The identify request includes the "live" biometric data and computer ID 512 (FIG. 5). The "live" biometric data is used to to identify user ID object 1008 on biometric server 104 (FIG. 1). Computer ID 512 uniquely identifies computer 208. Although not illustrated in FIGS. 10 and 11 for simplicity reasons, the same steps in establishing communication between objects must occur as shown in FIG. 4. In step 1110, identify user ID object 1008 creates a database object 1010 and passes to it the "live" biometric data. Database object 1010 contains the same data as described in reference to database object 710 in FIG. 7. In step 1112, an attempt is made to match the "live" biometric data with biometric data stored in a biometric template 502 (FIG. 5).

In step 1114, if a match was successful, then control transfers to step 1116. In step 1116, the user ID 510 (FIG. 5) that belongs to the matching biometric template 502 is determined. In step 1118, once user ID 510 is determined, then the authentication process proceeds as described in step 804 in FIG. 8. If in step 1114 a match was not successful, then control transfers to step 1120. In step 1120, the user is prompted to present "live" biometric data and control transfers back to step 1102. Because monitor object 1004 is always waiting for "live" biometric data to be presented, it does not matter if the same user presents the next "live" biometric data. Each time "live" biometric data is presented to monitor object 1004, it does not distinguish it from previously presented "live" biometric data.

2. Enrolling a User

As stated above, one of the advantages of object-oriented programming techniques over procedural programming techniques is that they enable programmers to create modules that do not need to be changed when a new type of object is added. This advantage is illustrated in FIG. 12. FIG. 12 is a block diagram of the objects involved in the enrollment process of the present invention. FIG. 12 includes biometric server 104 (FIG. 1), enrollment interface 1206, enrollment object 1208, comnm object 1214, policy object 1212, database object 1210, enrollment station 106 (FIG. 1), enrollment interface 1204, enrollment object 1220, comm object 1218 and biometric device object 1222. Here, biometric server 104 is performing as the server and enrollment station 106 is performing as the client.

Enrollment station 106 is used to enroll users into biometric system 102. Enrollment station 106 has attached to it every type of biometric identification device used by biometric system 102 to identify and ultimately authenticate users.

It is important to note that enrollment interface 1204 and enrollment interface 1206 are not part of the present invention. In fact, enrollment interface 1204 and enrollment interface 1206 are specific to the particular operation system the present invention is interfacing with.

Enrollment object 1208 replaces init object 406 (FIG. 4). Enrollment object 1208 is used to request enrollment station 106 to enroll a user on a biometric device. Comm object 1214 is attached to enrollment object 1208 and replaces comm object 408 ( FIG. 4). Enrollment object 1208 and enrollment object 1220 communicate, via comm object 1214 and comm object 1218.

Policy object 1212 is also attached to enrollment object 1208. Policy object 1212 is the same as policy object 712 (FIG. 7). As discussed above, it is the policy that determines the method or way in which a user is to be authenticated by biometric server 104. Database object 1210 stores the same data as database object 710 as described in reference to FIG. 7. Enrollment object 1220 replaces receiver object 412 (FIG. 4). Enrollment object 1220 is used to perform the specific task in enrolling a user on a biometric device. Comm object 1218 replaces comm object 410 (FIG. 4). Finally, biometric device object 1222 is used to enroll the user by requesting multiple samples of a particular type of "live" biometric data from the user. Biometric device object 1222 uses the samples of biometric data to create an unique biometric template 502 (FIG. 5) for the user.

Figure 13A:
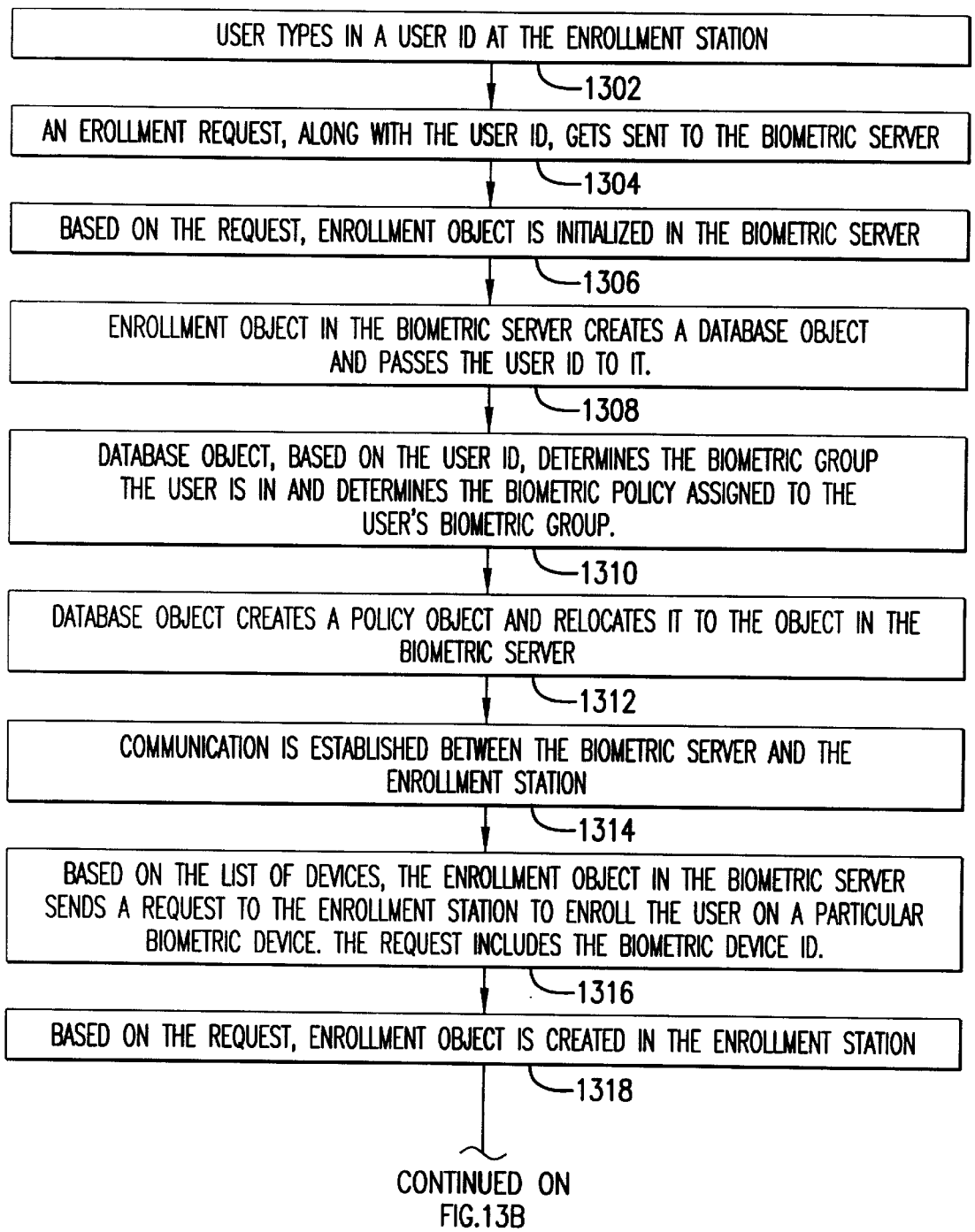
FIG. 13 is a flowchart illustrating the typical operation of the enrollment process of the present invention.
Figure 13B:
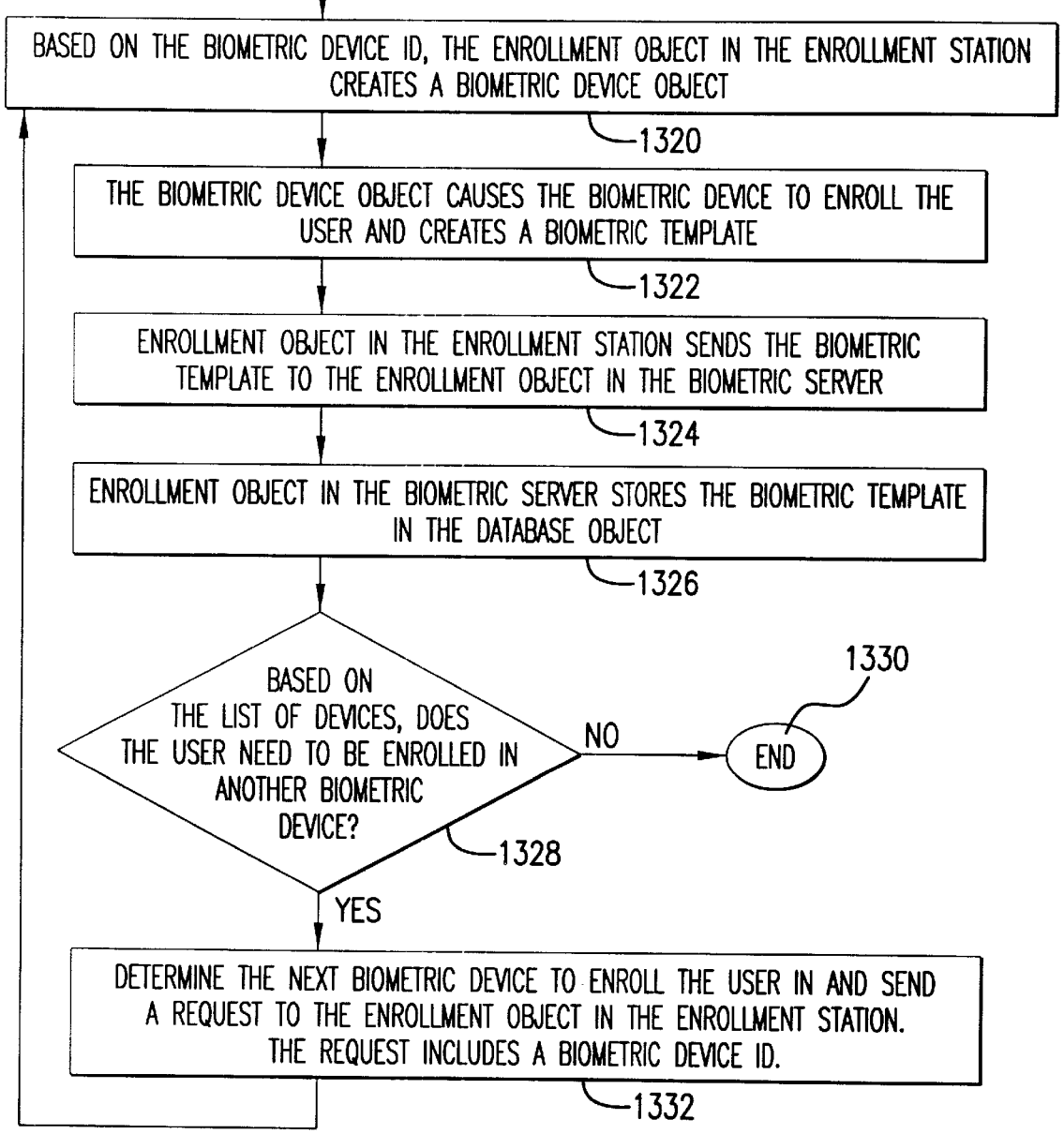

FIG. 13 presents a flowchart depicting the high-level operation of the objects in FIG. 12. In step 1302, a user is at enrollment server 106 and types in user ID 510 (FIG. 5) given to the user by the administrator. Enrollment interface 1204 recognizes this as an enrollment request. To facilitate user enrollment, enrollment station 106 provides an interface for users to be enrolled by biometric system 102 (FIG. 1). This interface is enrollment interface 1204. In step 1304, enrollment interface 1204 sends an enrollment request, which includes computer ID 512 (FIG. 5) and user ID 510, to biometric server 104. Enrollment interface 1206 actually receives the enrollment request. Based on the fact that the request is one for enrollment, enrollment object 1208 gets initialized in step 1306 (e.g., the enrollment request starts the engine in biometric system 102). Prior to enrollment object 1208 being initialized, it is generic init object 406 as described in reference to FIG. 4.

In step 1308, enrollment object 1208 creates database object 1210 and passes user ID 510 to it. Based on user ID 510, database object 1210 determines the user's biometric group 506 (FIG. 5) in step 1310. As described previously, the administrator has already determined which biometric group 506 the user is in. Based on biometric group 506, database object 1210 determines the biometric policy 504 (FIG. 5) that is assigned to biometric group 506.

In step 1312, database object 1210 creates policy object 1212 and relocates policy object 1212 to enrollment object 1208. Policy object 1212 knows the specific type of biometric policy 504 (e.g. OR policy, AND policy, etc.) and its list of devices for that biometric policy 504. In step 1314, communication is established between biometric server 104 and enrollment station 106. This communication is established exactly as described in reference to FIG. 4. In step 1316, based on the list of devices, enrollment object 1208 sends a request to enrollment station 106 to test the user on a particular biometric device. The request includes biometric device ID 508 (FIG. 5) that identifies the particular biometric device the user is to be enrolled in.

In step 1318, based on the request, enrollment object 1220 is created. In step 1320, enrollment object 1220 looks at biometric device ID 508 and creates biometric device object 1222. Biometric device object 1222 causes the biometric device to enroll the user in step 1322. In particular, the user is asked to give biometric measurements a few different times. For example, the user may be asked to give multiple fingerprint measurements for each finger. The enrollment of a user in a device creates a biometric template 502 (FIG. 5). In step 1324, enrollment object 1220 sends biometric template 502 to enrollment object 1208, via comm object 1218 and comm object 1214. Then, in step 1326, enrollment object 1208 stores biometric template 502 in database object 1210.

In step 1328, it is determined based on the list of devices, if the user needs to be enrolled in another biometric device. Although the user should at least be enrolled in the biometric devices listed in his or her list of devices, the administrator can decide to enroll the user in a biometric device not listed in the list of devices. If in step 1328, it is determined the user does not need to be enrolled in another biometric device, then control transfers to step 1330 and the flowchart in FIG. 13 ends. Alternatively, if the user does need to be enrolled in another biometric device, then control transfers to step 1332. In step 1332, the next biometric device to enroll the user in is determined and a request is sent to enrollment object 1220. The request includes biometric device ID 508 for the next biometric device. Control transfers again to step 1320. This process continues until the user is enrolled in all the required biometric devices.

As described with reference to FIGS. 12 and 13, in one embodiment of the present invention the user is enrolled through enrollment station 106. Typically, enrollment station 106 and the administrator are physically located at the same location within the enterprise. When a new user needs to enroll into the resource protection system, it may not be convenient for that user to physically be at the same location as administration. This presents two additional limitations for networked environments.

The first limitation deals with the use of any identification device. To enroll a user into biometric system 102 (FIG. 1) an administrator needs to be sure that the user enrolling is really the right person. This is difficult to do when the user and administrator are not physically at the same location.

The second limitation deals with the use of biometric identification devices. Many biometric measurements change over time. For example, people grow older, lose or gain weight, etc. In the case of biometric templates storing a user's facial image, the biometric data in the template may need to be updated from time to time. Once again, if the user and administrator are not physically at the same location in the network, the administrator needs to be sure the user requesting to update a template is really the person he or she says.

The inventors of the present invention recognized that what is needed is a scheme for remotely authenticating a user prior to allowing that user to either enroll or re-enroll with a particular biometric device to update a biometric template. Remote enrollment and/or re-enrollment (refreshing of biometric templates) can be either initiated by the administrator or the user.

There are several scenarios of where remote enrollment and/or re-enrollment is used. The first scenario already mentioned above is when the administrator and the user desiring to be enrolled or re-enrolled in biometric system 102 are not physically at the same location in the network. The administrator still needs to authenticate the user first. There are at least two possible solutions to this problem. The first involves assigning a temporary password (or token or smart card) to the user. The user goes to one of remote/web computers 210 (FIG. 2) and types in the password. Once biometric system 102 authenticates the user by the password, then the user starts the enrollment process. Of course, the temporary password expires after one use. In the case of re-enrollment (refreshing of templates) if the user is currently enrolled in multiple biometric devices, then one of the other biometric devices can be used to authenticate the user prior to allowing the user to refresh a biometric template 502 (FIG. 5) on the desired biometric device.

The second solution for remote enrollment and/or re-enrollment takes advantage of the fact that certain biometric devices are attached to remote/web computer 210. Several examples involve the use of facial image and voice recognition biometric devices. If an administrator is familiar with how the user looks, then the administrator can use video conferencing to authenticate the user prior to allowing the enrollment process to begin. If an administrator is familiar with the user's voice, then a voice recognition device can be used to speak to the administrator to authenticate the user.

A second scenario is when an enterprise desires not to use an administrator to enroll users into biometric system 102. Here, if the enterprise has an existing non-biometric identification system in place, it is easy to changeover from its existing system to biometric system 102. What is important to note is that the integrity of the existing non-biometric identification system must not be in question. For instance, if User B has access to another User A's password, then User B can enroll into biometric system 102 and gain access to User A's resources. Assuming the integrity of the existing identification system is good, then the method of authentication of the existing identification system is used to introduce the user to biometric system 102. Once the user is introduced to biometric system 102, the user can no longer gain access to enterprise resources through the old method. This is also important because it provides flexibility in rolling out biometric system 102 by not having to enroll all users at the same time.

E. Biometric Policies

The inventors of the present invention recognized a limitation when identification devices are used in any environment, whether or not the environment is networked. Enterprises with many resources have the desire to protect some resources more than others. For example, an enterprise may not care if its electronic bulletin board is accessed by every user in the enterprise. Whereas, an enterprise may want only the enterprise president to access merger and acquisition information. If an enterprise applies the same level of protection to all its resources, then one of two scenarios will occur. The first scenario is applying a lower-end level of protection to all resources. Here the result is inadequate authentication to some network resources. The second scenario is applying a higher-end level of protection to all resources. While this scenario may adequately protect all resources in the network, it would make the administration of resource protection more complex and thus decrease network productivity.

Biometric policies 504 (FIG. 5) of the present invention provides the flexibility to apply the appropriate level of protection to each network resource without decreasing network productivity. As discussed above, it is the biometric policies 504 of the present invention that determine the method or way in which a user is to be authenticated by biometric server 104 (FIG. 1). It is important to note that a user is not authenticated until he or she passes a biometric policy 504. In the present invention, a user is never authenticated by solely passing one or more biometric devices without the user also passing his or her biometric policy 504.

The specific way in which biometric policies 504 provide flexibility to the level of protection for each resource is through the layering of identification devices, including both biometric and non-biometric devices. The layering of identification devices allows the administrator of biometric system 102 (FIG. 1) to combine one or more identification devices in a logical way to protect each resource. Layering also allows the administrator to adjust the level of identification each biometric device must determine in order for the user to pass the biometric device. This is accomplished through threshold values as described above.

FIG. 15 is a chart illustrating an example of the layering process of biometric system 102 for a particular enterprise. Chart 1502 has columns and rows. Users can be required to be authenticated by biometric system 102 when they try to access various points in network system 202. The columns of chart 1502 represent the various points in network system 202. The various points (in this particular enterprise) include network system 202 itself, one or more of applications 204, one or more of user computers 208, Internet access 1504 and dial-in access 1506. The rows in chart 1502 represent the identification devices used in biometric system 102. The identification devices include both biometric and non-biometric devices. Non-biometric devices (in this particular enterprise) include password and smart card devices. Biometric devices (in this particular enterprise) include fingerprint, voice recognition, facial image and signature.

Once the administrator identifies the various points in network system 202 that require protection and the identification devices, the administrator determines the layering process of the present invention. The layering process for a single resource can include the steps illustrated by FIG. 16.

Figure 16:
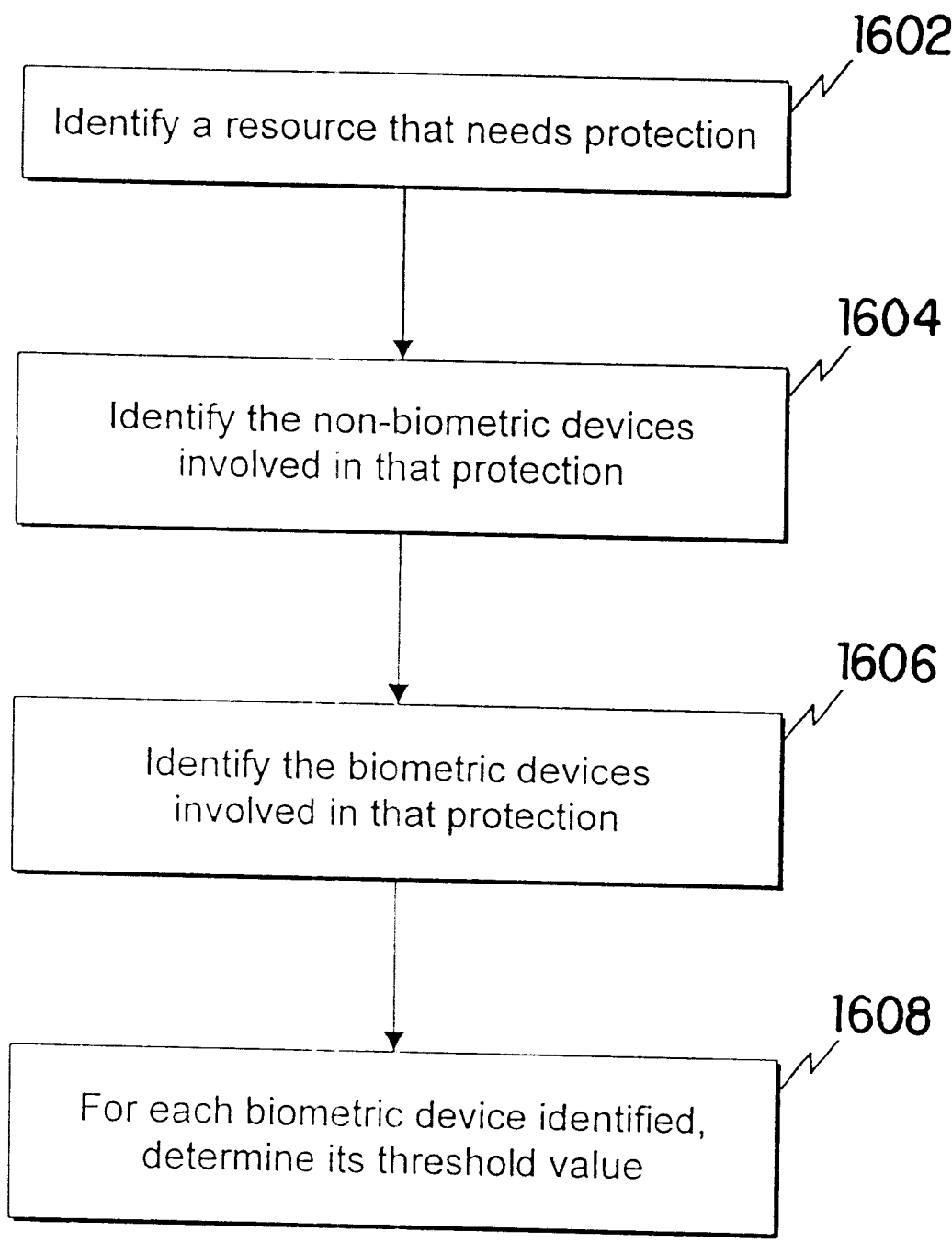
FIG. 16 is a flowchart illustrating the process of layering using biometric policies of the present invention.

FIG. 16 is a flowchart that illustrates the process of layering for a single resource of the present invention. In step 1602, a resource in network system 202 that requires protection is identified. In step 1604, the non-biometric devices that are going to be utilized in protecting the resource are identified. Here, the administrator may decide to not use any non-biometric devices. In step 1606, the biometric devices that are going to be utilized in protecting the resource are identified. Again, the administrator may decide to use zero, one or more of the biometric devices. Finally, in step 1608, for each identified biometric device its threshold value is determined. Chart 1502 (FIG. 15) illustrates the possible values of threshold value as being L (low), M (medium) and H (high). The present invention is not limited to representing the values of threshold values this way. In fact, possible values of threshold values can be represented in other ways. One possible way is numerically where the threshold value can have as many different values as the administrator desires.

Referring again to FIG. 15, network system 202 is protected by two biometric devices and no non-biometric devices. The two biometric devices include a fingerprint device and a voice recognition device. Fingerprint device's threshold value is set at M. Voice recognition device's threshold value is set at L. Therefore, for a user to access network system 202, the user might potentially be tested on both a fingerprint device and a voice recognition device. When tested, the user might have to pass the fingerprint device with at least a M threshold value and pass the voice recognition device with at least a L threshold value.

The reason why the user might only potentially be tested on both devices is because ultimate authentication into biometric system 102 is governed by biometric polices 504. For example, an OR biometric policy would only require the user from above to pass either the fingerprint device or the voice recognition device. The only way the user will be tested on both devices is if the user fails the first device tested on. An AND biometric policy requires the user to be tested on both biometric devices to be authenticated. But even with the AND biometric policy the user may be tested on one of the biometric devices. If the user fails the first biometric device tested on, then the user automatically fails the AND policy and there is no need to test the user on the second biometric device.

Although biometric policies 504 have been introduced above, this section explains in detail the various pre-defined biometric policies and administrator-defined policies provided by the present invention. As explained above, each biometric policy has a list of devices associated with it. The list of devices identifies the biometric devices that are used to execute the biometric policy. Each biometric device in the list of devices has a threshold value and a timeout value associated with it. The threshold value indicates the level of identification the biometric device must determine for the user to pass the device. The timeout value indicates the time in which the biometric device has to identify the user to the level of identification indicated by the threshold value.

As stated above, the present invention not only provides specific pre-defined biometric policies but also allows the administrator to define other administrator-defined policies. The specific pre-defined biometric polices include an OR policy, an AND policy, a CONTINGENT policy, a RANDOM policy and a THRESHOLD policy. The pre-defined biometric policies are limited to having only biometric devices in their list of devices. This limits being able to use non-biometric devices to protect a resource. Therefore, the present invention also provides administrator-defined policies having a list of policies or devices. An additional administrator-defined type of policy includes biometric policies within a policy. Described in detail below, are the pre-defined biometric policies and the administrator-defined policies.

1. OR Policy

Figure 17A:
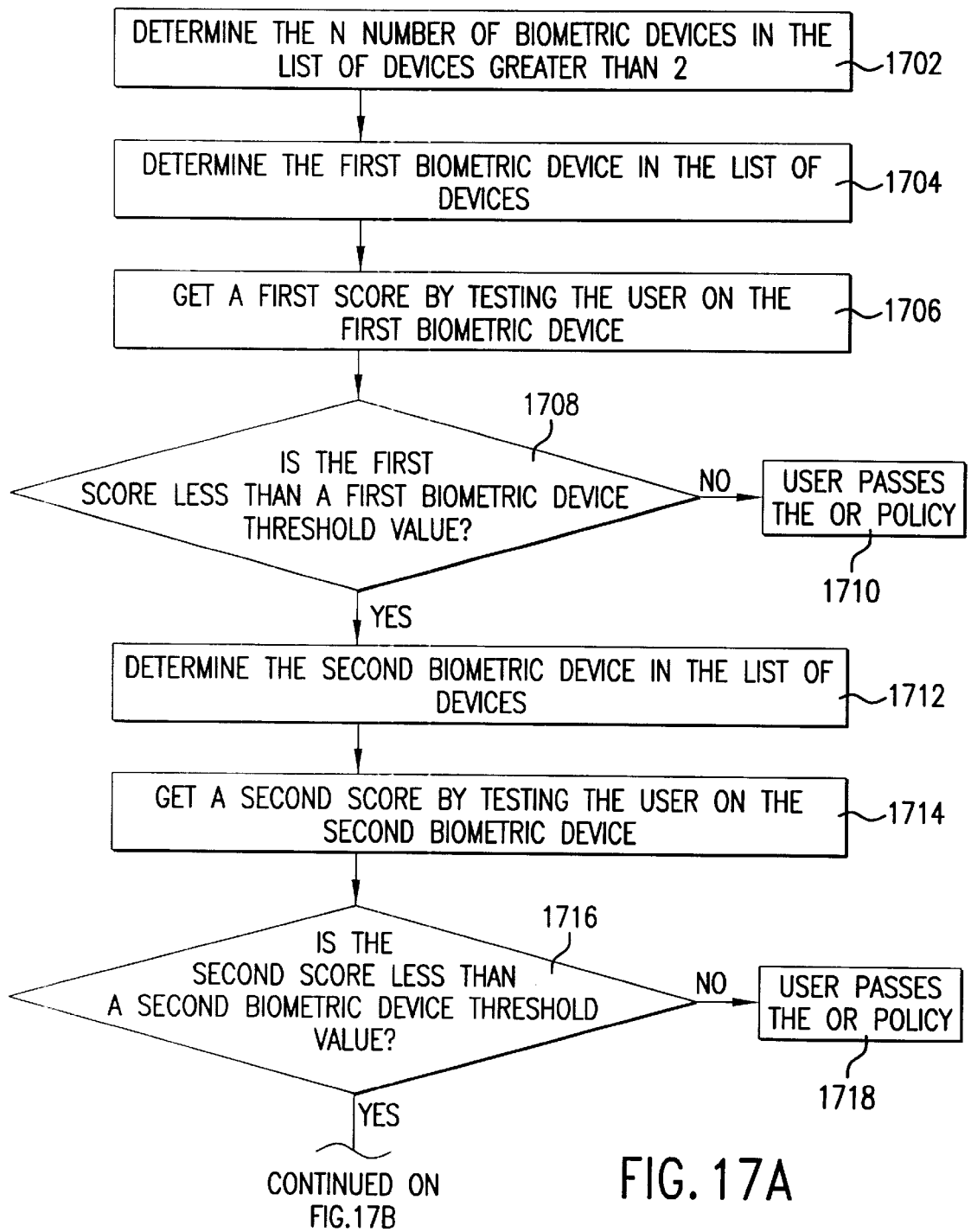
FIG. 17 is a flowchart illustrating the steps involved in executing an OR policy of the present invention.
Figure 17B:
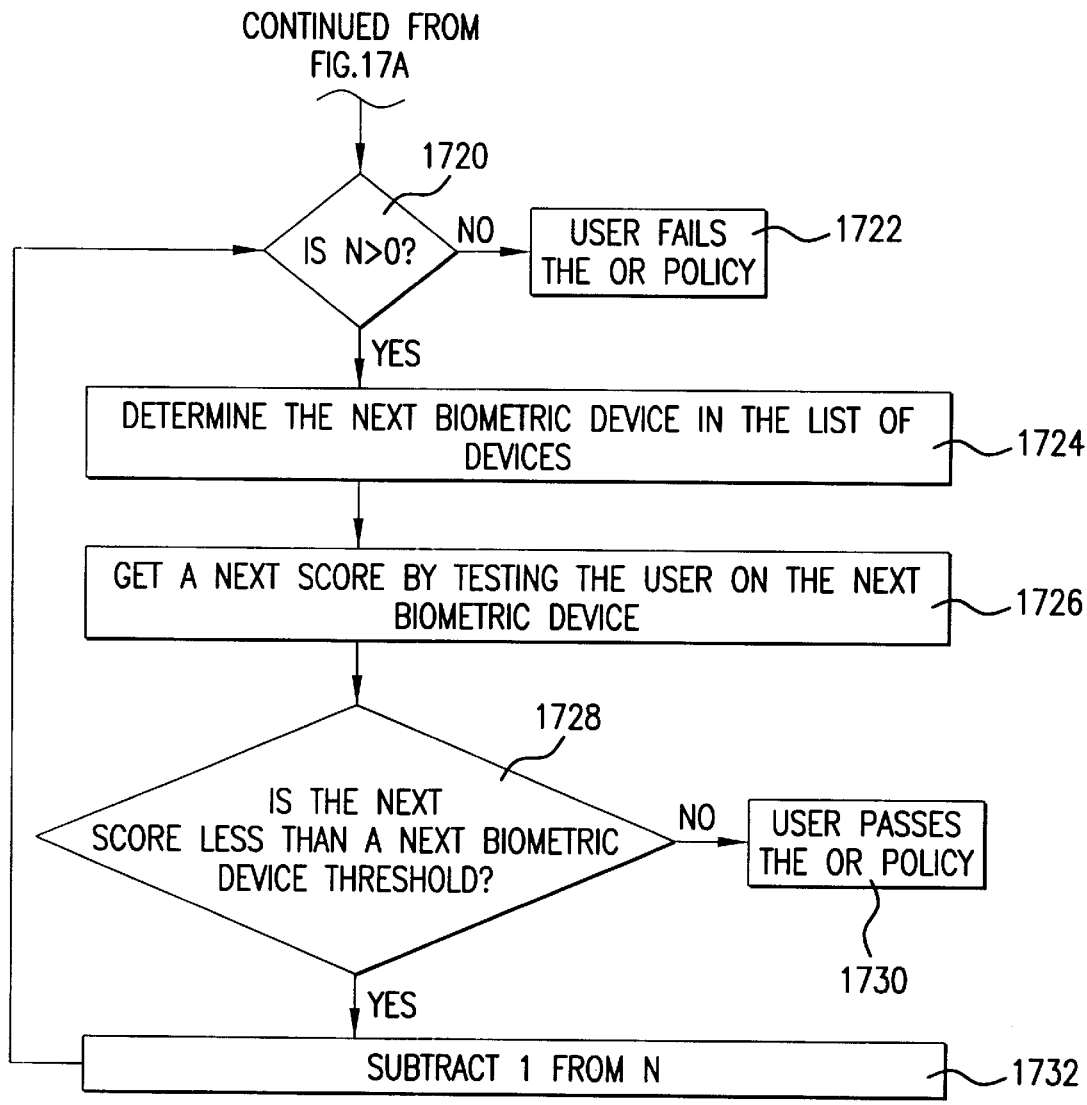

The user passes an OR policy of the present invention if the user passes one of the biometric devices in the list of devices. FIG. 17 is a flowchart illustrating the steps involved in executing the OR policy of the present invention. In step 1702, the n number of biometric devices in the list of devices greater than two is determined. An OR policy will typically have at least two different biometric devices in its list of devices. In step 1704, the first biometric device in the list of devices is determined. Once the first biometric device is determined, the user is tested on the first biometric device to produce a first score in step 1706. In step 1708, the first score is compared to a first biometric device threshold value. If the first score is greater than or equal to the first biometric device threshold value, then control transfers to step 1710. In step 1710, the user has passed the OR policy and the flowchart in FIG. 17 ends. At this point the user has been authenticated by biometric system 102 (FIG. 1). Alternatively, if in step 1708 the first score is less than the first biometric device threshold value, then control transfers to step 1712.

In step 1712, the second biometric device in the list of devices is determined. Once the second biometric device is determined, the user is tested on the second biometric device to produce a second score in step 1714. In step 1716, the second score is compared to a second biometric device threshold value. If the second score is greater than or equal to the second biometric device threshold value, then control transfers to step 1718. In step 1718, the user has passed the OR policy and the flowchart in FIG. 17 ends. At this point the user has been authenticated by biometric system 102. Alternatively, if in step 1716 the second score is less than the second biometric device threshold value, then control transfers to step 1720.

In step 1720, if n is not greater than zero, then control transfers to step 1722. If control transfers to step 1722 it means that the list of devices has only two biometric devices in it and the user has failed both biometric devices. In step 1722, the user has failed the OR policy and the flowchart in FIG. 17 ends. Alternatively, if in step 1720 n is greater than zero, then control transfers to step 1724. In this situation the list of devices has more than two biometric devices in it. In step 1724, the next biometric device is determined. Once the next biometric device is determined, the user is tested on the next biometric device to produce a next score in step 1726. In step 1728, the next score is compared to a next biometric device threshold value. If the next score is greater than or equal to the next biometric device threshold value, then control transfers to step 1730. In step 1730, the user has passed the OR policy and the flowchart in FIG. 17 ends. At this point the user has been authenticated by biometric system 102. Alternatively, if in step 1728 the next score is less than the next biometric device threshold value, then control transfers to step 1732.

In step 1732, one is subtracted from n and control returns to step 1720. In step 1720, if n is not greater than zero then the user has failed all the biometric devices in the list of devices. Here, control transfers to step 1722. In step 1722, the user has failed the OR policy and the flowchart in FIG. 17 ends. At this point the user has not been authenticated by biometric system 102. Alternatively, if in step 1720 n is greater than zero, this means there are still more biometric devices in the list of devices that the user has not been tested on yet. The flowchart in FIG. 17 continues until the user has either failed all the biometric devices or the user passes one biometric device in the list of devices.

Although the OR policy will typically have at least two different biometric devices in its list of devices, the list of devices may have a single biometric device. Here, the user is tested on a single biometric device with multiple biometric measurements to pass the OR policy. For example, if the single biometric device is a fingerprint device, the user may be required to pass the OR policy by being tested on the fingerprint device with the left index finger and by being tested on the fingerprint device with the right index finger. The user only needs to pass the fingerprint device using one of the biometric measurements to pass the OR policy. Other single biometric devices that can be used to test multiple biometric measurements are facial image (different angles of a face), retina image (right and left retina), hand geometry (right and left hand), voice recognition (two different phrases), different lighting (visible and infra red), etc.

2. AND Policy

Figure 18A:
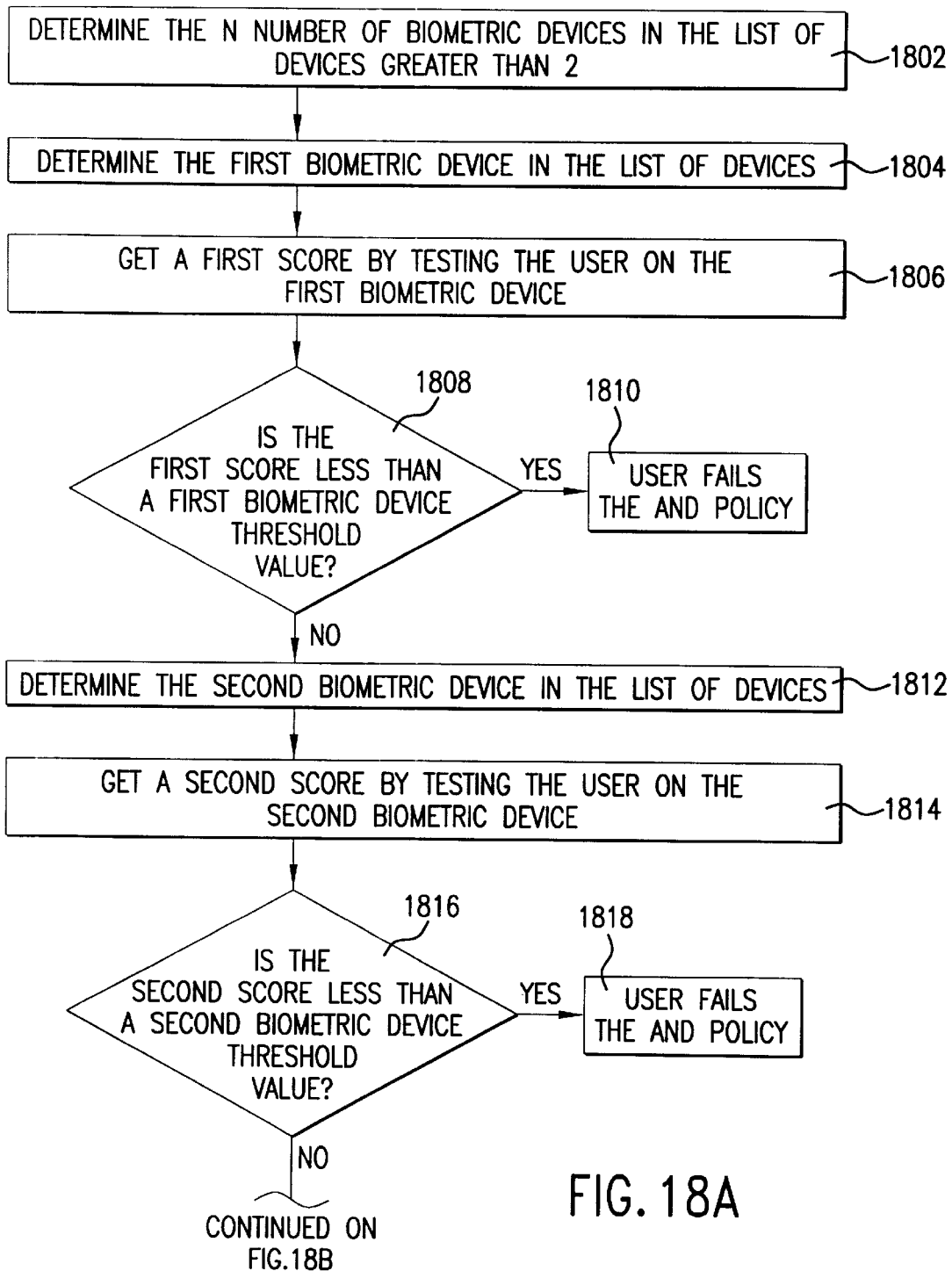
FIG. 18 is a flowchart illustrating the steps involved in executing an AND policy of the present invention.
Figure 18B:
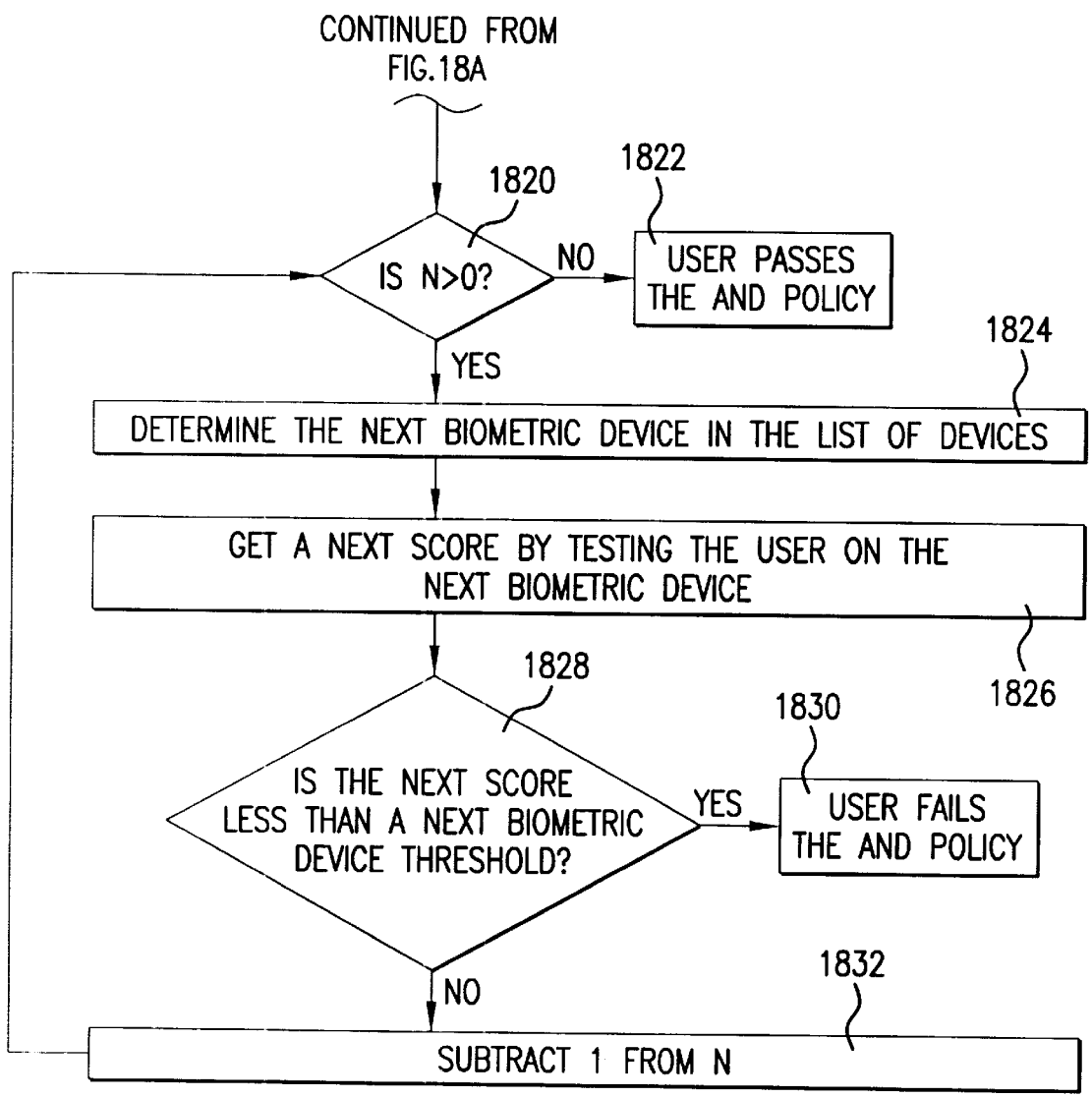

The user passes an AND policy of the present invention if the user passes all of the biometric devices in the list of devices. FIG. 18 is a flowchart illustrating the steps involved in executing the AND policy of the present invention. In step 1802, the n number of biometric devices in the list of devices greater than two is determined. An AND policy will typically have at least two different biometric devices in its list of devices. In step 1804, the first biometric device in the list of devices is determined. Once the first biometric device is determined, the user is tested on the first biometric device to produce a first score in step 1806. In step 1808, the first score is compared to a first biometric device threshold value. If the first score is less than the first biometric device threshold value, then control transfers to step 1810. In step 1810, the user has failed the AND policy and the flowchart in FIG. 18 ends. At this point the user has not been authenticated by biometric system 102 (FIG. 1). Alternatively, if in step 1808 the first score is greater than or equal to the first biometric device threshold value, then control transfers to step 1812.

In step 1812, the second biometric device in the list of devices is determined. Once the second biometric device is determined, the user is tested on the second biometric device to produce a second score in step 1814. In step 1816, the second score is compared to a second biometric device threshold value. If the second score is less than the second biometric device threshold value, then control transfers to step 1818. In step 1818, the user has failed the AND policy and the flowchart in FIG. 18 ends. At this point the user has not been authenticated by biometric system 102. Alternatively, if in step 1816 the second score is greater than or equal to the second biometric device threshold value, then control transfers to step 1820.

In step 1820, if n is not greater than zero, then control transfers to step 1822. If control transfers to step 1822 it means that the list of devices has only two biometric devices in it and the user has passed both biometric devices. In step 1822, the user has passed the AND policy and the flowchart in FIG. 18 ends. Alternatively, if in step 1820 n is greater than zero, then control transfers to step 1824. In this situation the list of devices has more than two biometric devices in it. In step 1824, the next biometric device is determined. Once the next biometric device is determined, the user is tested on the next biometric device to produce a next score in step 1826. In step 1828, the next score is compared to a next biometric device threshold value. If the next score is less than the next biometric device threshold value, then control transfers to step 1830. In step 1830; the user has failed the AND policy and the flowchart in FIG. 18 ends. At this point the user has not been authenticated by biometric system 102. Alternatively, if in step 1828 the next score is greater than or equal to the next biometric device threshold value, then control transfers to step 1832.

In step 1832, one is subtracted from n and control returns to step 1820. In step 1820, if n is not greater than zero then the user has passed all the biometric devices in the list of devices. Here, control transfers to step 1822. In step 1822, the user has passed the AND policy and the flowchart in FIG. 18 ends. At this point the user has been authenticated by biometric system 102. Alternatively, if in step 1820 n is greater than zero, this means there are still more biometric devices in the list of devices that the user has not been tested on yet. The flowchart in FIG. 18 continues until the user has either passed all the biometric devices or the user fails one biometric device in the list of devices.

Although the AND policy will typically have at least two biometric devices in its list of devices, the list of devices may have a single biometric device. Here, the user is tested on a single biometric device with multiple biometric measurements to pass the AND policy. For example, if the single biometric device is a fingerprint device, the user may be required to pass the AND policy by being tested on the fingerprint device with the left index finger and by being tested on the fingerprint device with the right index finger. The user needs to pass the fingerprint device using both of the biometric measurements to pass the AND policy. As mentioned above with the OR policy, the other single biometric devices can also be used with the AND policy to test multiple biometric measurements.

3. CONTINGENT Policy

Figure 19:
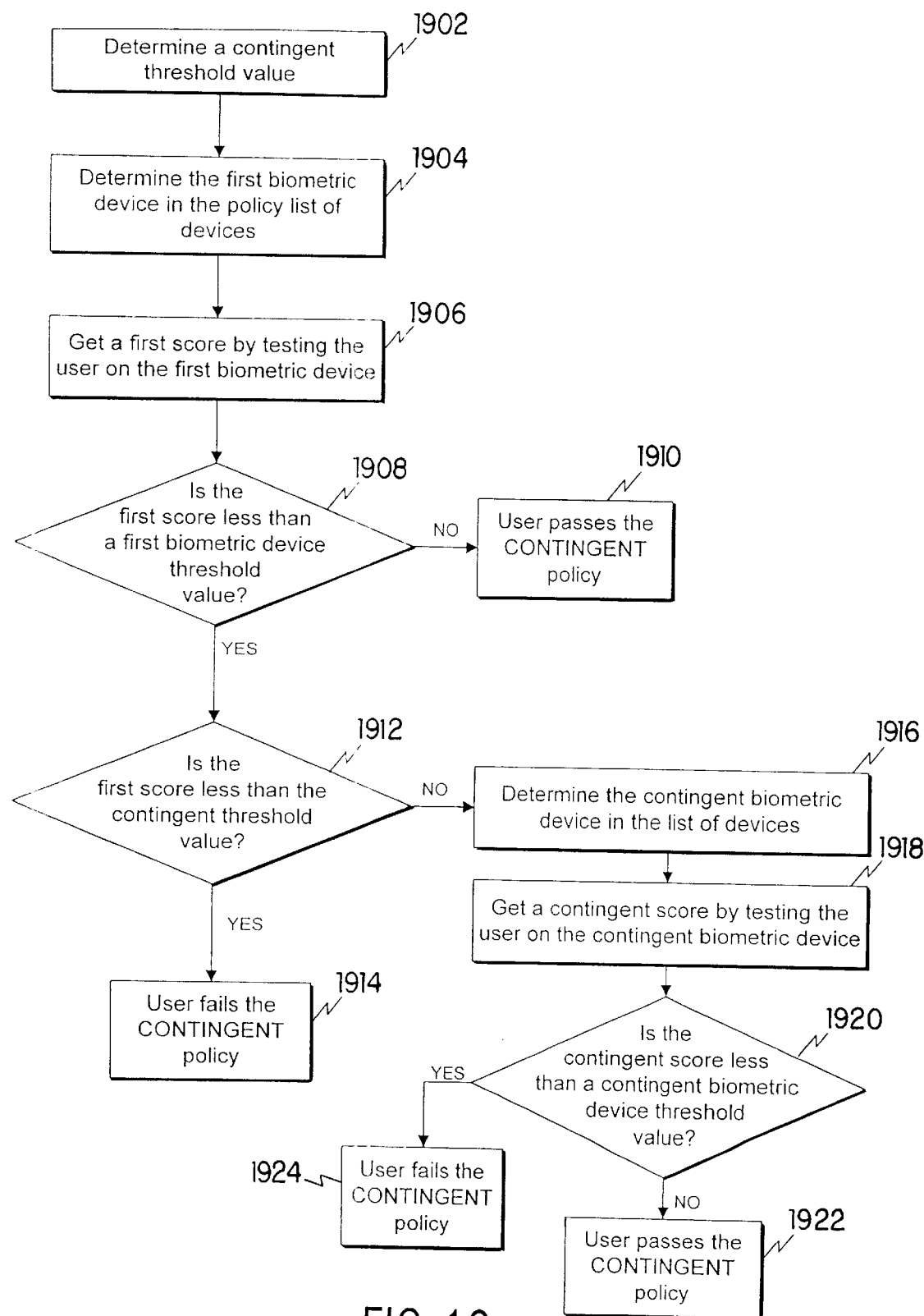
FIG. 19 is a flowchart illustrating the steps involved in executing a CONTINGENT policy of the present invention.

The user passes a CONTINGENT policy of the present invention if either the user exceeds a minimum threshold (i.e., a first biometric device threshold value) associated with a first biometric device or if the user exceeds a contingent threshold associated with the first biometric device and the user exceeds a minimum threshold (i.e., a contingent biometric device threshold value) associated with a contingent biometric device. FIG. 19 is a flowchart illustrating the steps involved in executing the CONTINGENT policy of the present invention. The are typically two different biometric devices in the list of devices for the CONTINGENT policy. In step 1902, a contingent threshold value is determined. In step 1904, the first biometric device in the list of devices is determined. Once the first biometric device is determined, the user is tested on the first biometric device to produce a first score in step 1906.

In step 1908, the first score is compared to a first biometric device threshold value. If the first score is greater than or equal to the first biometric device threshold value, then control transfers to step 1910. In step 1910, the user has passed the CONTINGENT policy and the flowchart in FIG. 19 ends. At this point the user has been authenticated by biometric system 102 (FIG. 1). Alternatively, if in step 1908 the first score is less than the first biometric device threshold value, then control transfers to step 1912.

In step 1912, the first score is compared to the contingent threshold value. In step 1912, if the first score is less than the contingent threshold value, then control transfers to step 1914. In step 1914, the user has failed the CONTINGENT policy. At this point the user has not been authenticated by biometric system 102. Alternatively, if in step 1912 the first score is greater than or equal to the contingent threshold value, then control transfers to step 1916. The contingent threshold value is used to give the user a second chance to pass the CONTINGENT policy and thus be authenticated by biometric system 102.

In step 1916, the contingent biometric device in the list of devices is determined. The type of biometric device selected for the contingent biometric device may be based environmental conditions as discussed above. Once the contingent biometric device is determined, the user is tested on the contingent biometric device to produce a contingent score in step 1918. In step 1920, the contingent score is compared to a contingent biometric device threshold value. If the contingent score is less than the contingent biometric device threshold value, then control transfers to step 1924. In step 1924, the user has failed the CONTINGENT policy and the flowchart in FIG. 19 ends. At this point the user has not been authenticated by biometric system 102. Alternatively, if in step 1920 the contingent score is greater than or equal to the contingent biometric device threshold value, then control transfers to step 1922. In step 1922, the user has passed the CONTINGENT policy and the flowchart in FIG. 19 ends. At this point the user has been authenticated by biometric system 102.

Although the CONTINGENT policy will typically have two biometric devices in its list of devices, the list of devices may have a single biometric device. Here, the user is tested on a single biometric device with multiple biometric measurements to pass the CONTINGENT policy. For example, if the single biometric device is a fingerprint device, the user may be required to pass the CONTINGENT policy by being tested on the fingerprint device with the user's left index finger first. If the user passes the fingerprint device with his or her left index finger, then the user passes the CONTINGENT policy. If the user fails the fingerprint device with his or her left index finger, and the first score is greater than or equal to the contingent threshold value score, the user is tested on the fingerprint device with the right index finger. As mentioned above with the OR policy, the other single biometric devices can also be used with the CONTINGENT policy to test multiple biometric measurements.

4. RANDOM Policy

Figure 20:
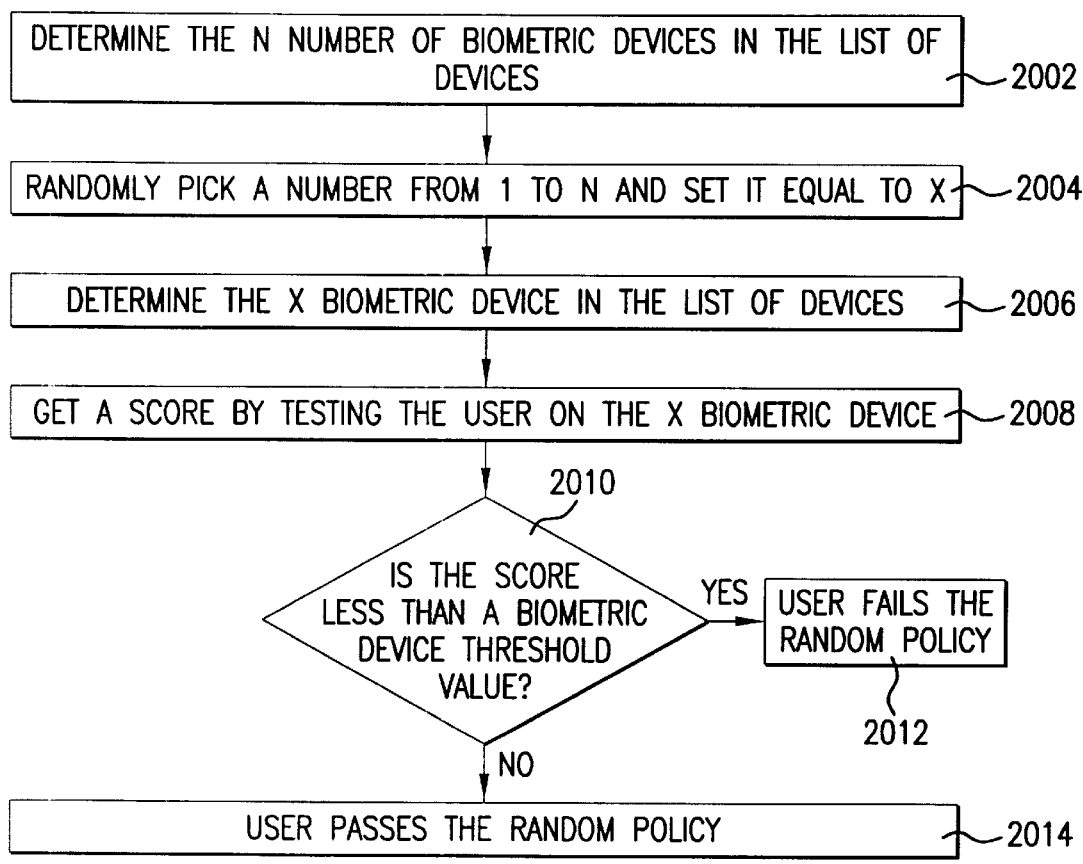
FIG. 20 is a flowchart illustrating the steps involved in executing a RANDOM policy of the present invention.

The user passes a RANDOM policy of the present invention if the user passes a random biometric device. FIG. 20 is a flowchart illustrating the steps involved in executing a RANDOM policy of the present invention. In step 2002, the n number of biometric devices in the list of devices is determined. A RANDOM policy will typically have at least two different biometric devices in its list of devices. In step 2004, a random number from one to n is picked and the random number is set equal to X. In step 2006, the X biometric device in the list of devices is determined. Once the X biometric device is determined, the user is tested on the X biometric device to produce a score in step 2008.

In step 2010, the score is compared to a biometric device threshold value. If the score is less than the biometric device threshold value, then control transfers to step 2012. In step 2012, the user has failed the RANDOM policy and the flowchart in FIG. 20 ends. At this point the user has not been authenticated by biometric system 102 (FIG. 1). Alternatively, if in step 2010 the score is greater than or equal to the biometric device threshold value, then control transfers to step 2014. In step 2014, the user has passed the RANDOM policy and the flowchart in FIG. 20 ends. At this point the user has been authenticated by biometric system 102.

The RANDOM policy is used to request a random biometric measurement from the user each time the user attempts to be authenticated by biometric system 102. Another embodiment of the RANDOM policy is to modify the list of devices to be a list of either fingerprints or word phrases. Here, the user may be tested on a random fingerprint (e.g., the index finger of the user's left hand). Alternatively, the user may be tested on a random word phrase (e.g., "My name is Bob Smith.").

Although the RANDOM policy will typically have at least two different biometric devices in its list of devices, the list of devices may have a single biometric device. Here, the user is tested on a single biometric device with any one of multiple biometric measurements to pass the RANDOM policy. For example, if the single biometric device is a fingerprint device, the user may be required to pass the RANDOM policy by being tested on any one of the user's fingers. If the user passes the fingerprint device with the random finger, then the user passes the RANDOM policy. As mentioned above with the OR policy, the other single biometric devices can also be used with the RANDOM policy to test multiple biometric measurements.

5. THRESHOLD Policy

Figure 21A:
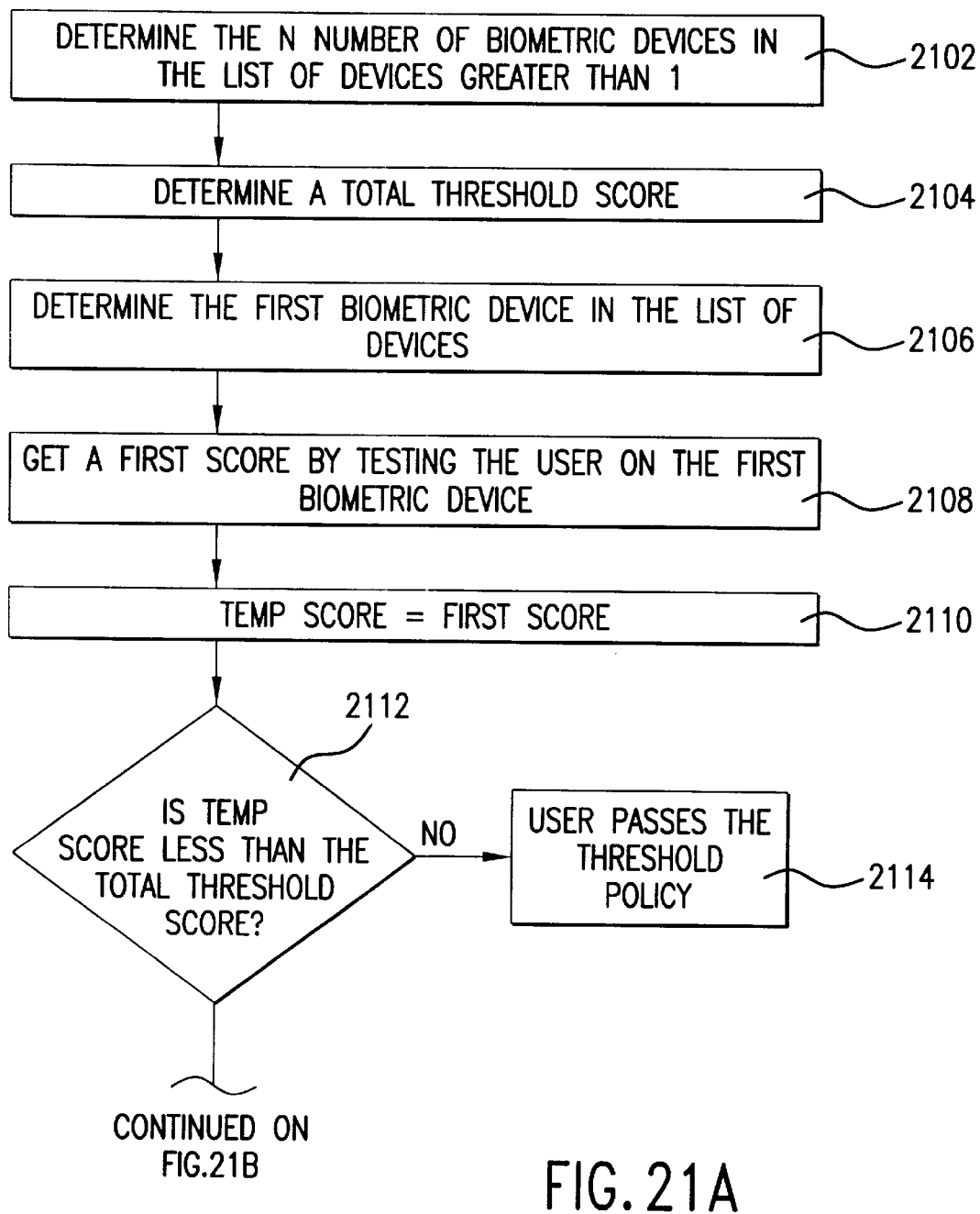
FIG. 21 is a flowchart illustrating the steps involved in executing a THRESHOLD policy of the present invention.
Figure 21B:
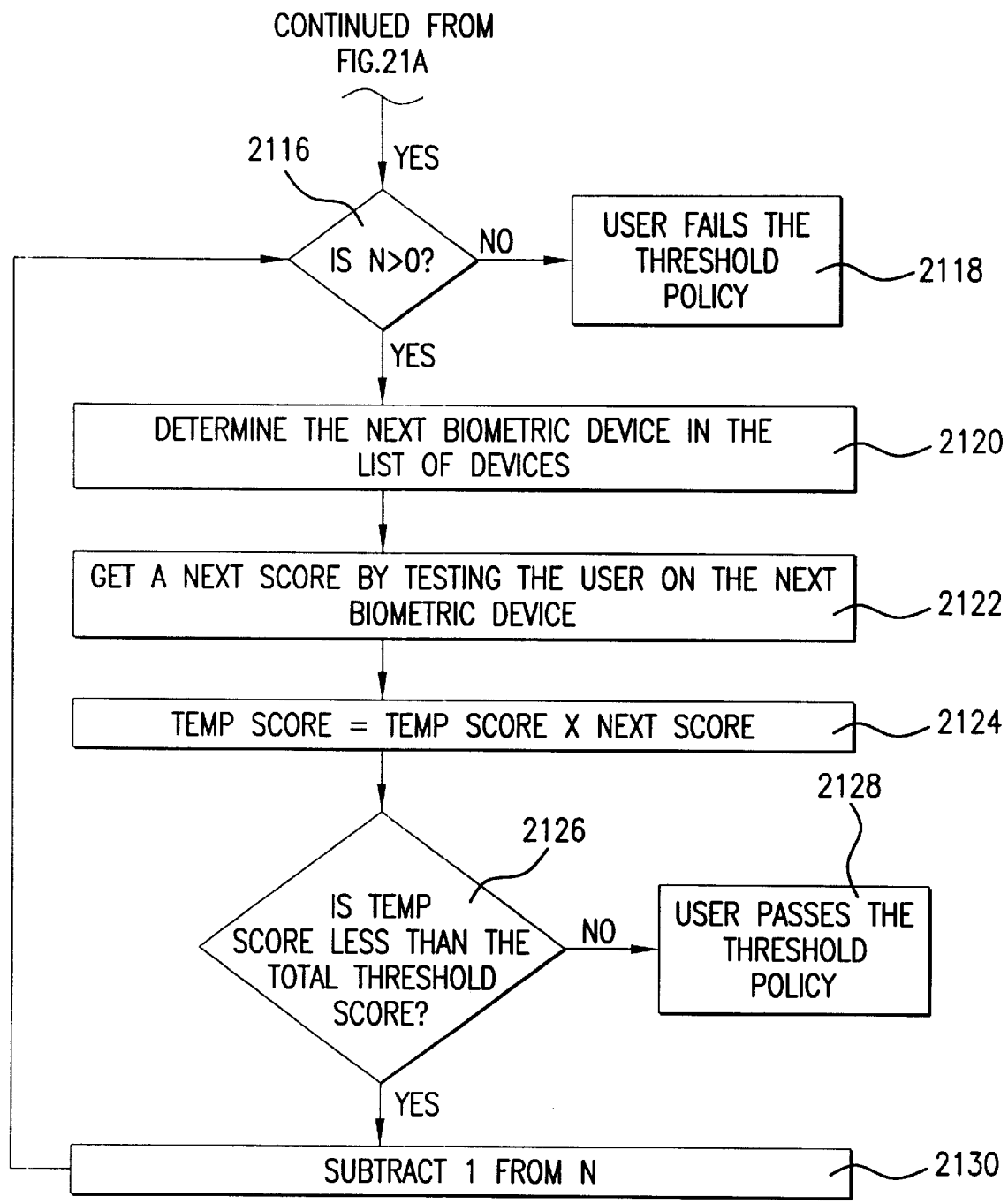

The user passes a THRESHOLD policy of the present invention if the user exceeds a total threshold (i.e., total threshold score) while being tested on one or more biometric devices in the list of devices. FIG. 21 is a flowchart illustrating the steps involved in executing a THRESHOLD policy of the present invention. In step 2102, then number of biometric devices in the list of devices greater than one is determined. A THRESHOLD policy typically has one or more different biometric devices in its list of devices. In step 2104 a total threshold score is determined. In step 2106, the first biometric device in the list of devices is determined. Once the first biometric device is determined, the user is tested on the first biometric device to produce a first score in step 2108.

In step 2110, a temp score is set equal to the first score. In step 2112, the temp score is compared to the total threshold score. If the temp score is greater than or equal to the total threshold score, then control transfers to step 2114. In step 2114, the user has passed the THRESHOLD policy and the flowchart in FIG. 21 ends. At this point the user has been authenticated by biometric system 102 (FIG. 1). Alternatively, if in step 2112 the temp score is less than the total threshold score, then control transfers to step 2116.

In step 2116, if n is not greater than zero, then control transfers to step 2118. In step 2118, the user has failed the THRESHOLD policy and the flowchart in FIG. 21 ends. At this point the user has not been authenticated by biometric system 102 (FIG. 1). Alternatively, if in step 2116 n is greater than zero, then control transfers to step 2120. In step 2120, the next biometric device in the list of devices is determined. Once the next biometric device is determined, the user is tested on the next biometric device to produce a next score in step 2122.

In step 2124, temp score gets multiplied by the next score and the product gets stored back into temp score. In another embodiment of the RANDOM policy, temp score may be added to the next score and the sum stored back into temp score. In step 2126, the temp score is compared to the total threshold score. If the temp score is greater than or equal to the total threshold score, then control transfers to step 2128. In step 2128, the user has passed the THRESHOLD policy and the flowchart in FIG. 21 ends. At this point the user has been authenticated by biometric system 102 (FIG. 1). Alternatively, if in step 2126 the temp score is less than the total threshold score, then control transfers to step 2130.

In step 2130, one is subtracted from n and control returns to step 2116. In step 2116, if n is not greater than zero then the user has been tested all the biometric devices in the list of devices. Here, control transfers to step 2118. In step 2118, the user has failed the THRESHOLD policy and the flowchart in FIG. 21 ends. At this point the user has not been authenticated by biometric system 102. Alternatively, if in step 2116 n is greater than zero, this means there are still more biometric devices in the list of devices that the user has not been tested on yet. The flowchart in FIG. 21 continues until the user has either been tested on all the biometric devices in the list of devices or temp score is greater than or equal to the total threshold score.

Although the THRESHOLD policy typically has one or more different biometric devices in its list of devices, the list of devices may have a single biometric device. Here, the user is tested on a single biometric device with any one of multiple biometric measurements to pass the THRESHOLD policy. For example, if the single biometric device is a fingerprint device, the user may be required to pass the THRESHOLD policy by being tested on multiple fingers until the total threshold score is reached. As mentioned above with the OR policy, the other single biometric devices can also be used with the THRESHOLD policy to test multiple biometric measurements.

6. Biometric Policies Having a List of Biometric Policies

As discussed above, the present invention allows for administrator-defined policies. Once type of administrator-defined policy is a biometric policy having a list of biometric policies. Here, instead of the biometric policy having a list of biometric devices as discussed above, this type of biometric policy has a list of biometric policies. The types of biometric policies that can be listed in the list of biometric policies include an OR policy, an AND policy, a CONTINGENT policy, a RANDOM policy and a THRESHOLD policy (all described above). This type of policy is also limited to testing a user on biometric devices only.

The other type of administrator-defined policy is a policy having a policy list of policies or devices. This administrator-defined policy allows for the use of non-biometric devices.

a. OR Policy Having a List of Biometric Policies

Figure 22A:
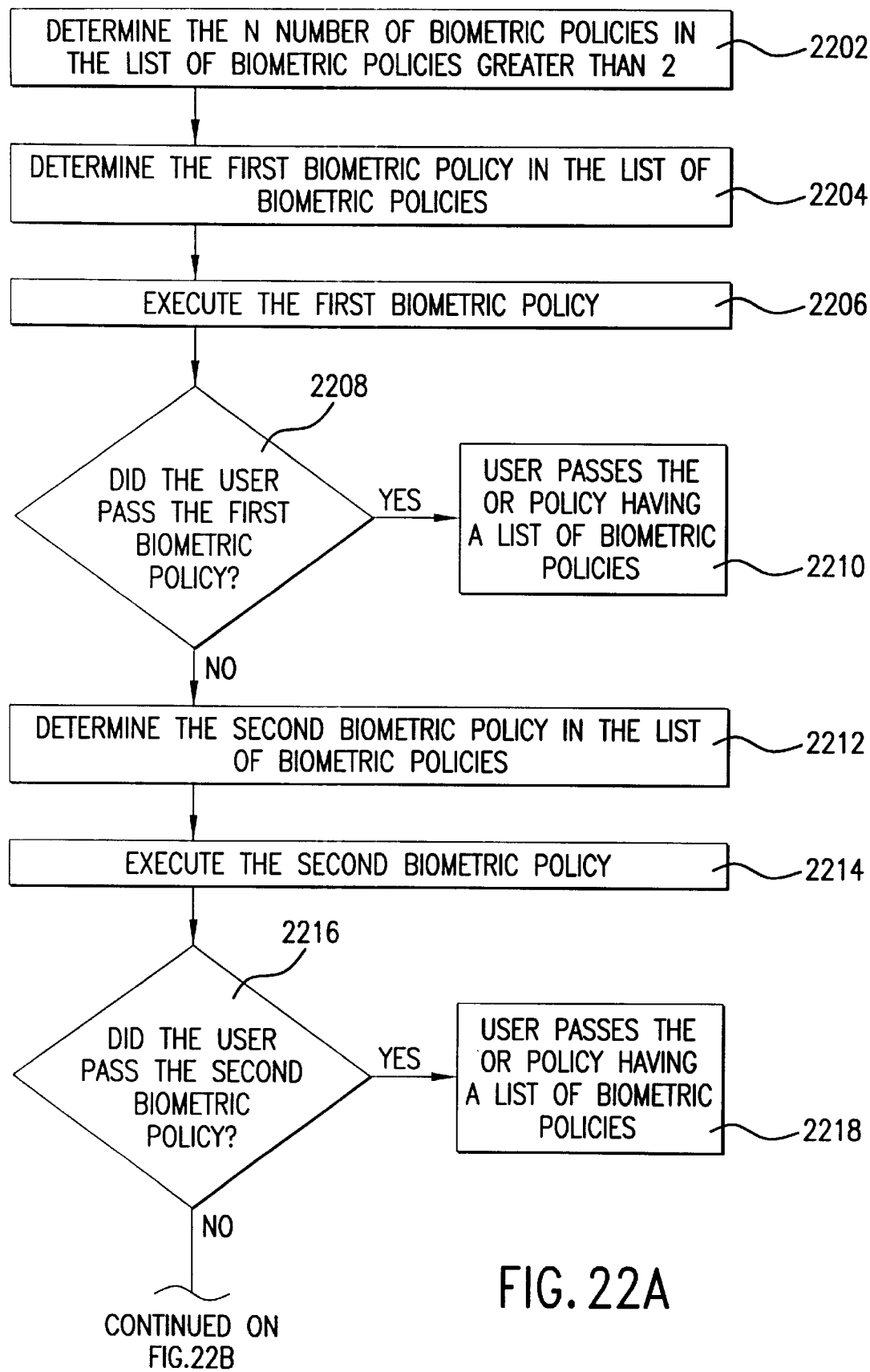
FIG. 22 is a flowchart illustrating the steps involved in executing OR policy having a list of biometric policies of the present invention.
Figure 22B:
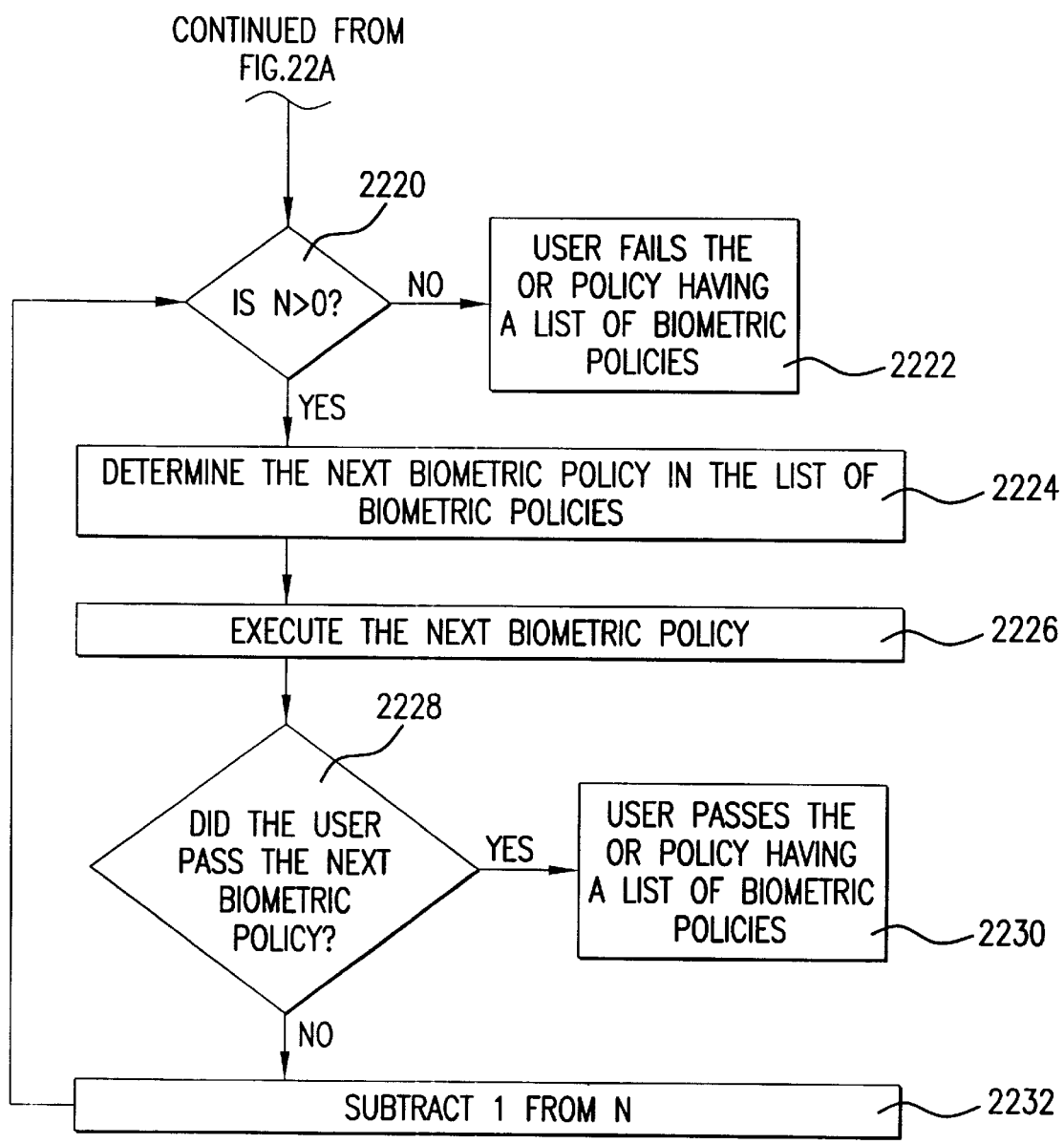

The user passes an OR policy having a list of biometric policies of the present invention if the user passes one of the biometric policies in the list of biometric policies. FIG. 22 is a flowchart illustrating the steps involved in executing the OR policy having a list of biometric policies of the present invention. In step 2202, the n number of biometric policies in the list of biometric policies greater than two is determined. The OR policy will always have at least two biometric policies in its list of biometric policies. In step 2204, the first biometric policy in the list of biometric policies is determined. Once the first biometric policy is determined, the first biometric policy is executed in step 2206. Here, the steps in the flowchart that applies to the first biometric policy are executed. For example, if the first biometric policy is a CONTINGENT policy, then the flowchart in FIG. 19 would be executed. Referring to FIG. 19, the outcome of FIG. 19 is either the user passes or fails the CONTINGENT policy. Therefore, this information gets returned to step 2206 of FIG. 22.

In step 2208, if the user passes the first biometric policy, then control transfers to step 2210. In step 2210, the user has passed the OR policy and the flowchart in FIG. 22 ends. At this point the user has been authenticated by biometric system 102 (FIG. 1). Alternatively, if in step 2208 the user fails the first biometric policy, then control transfers to step 2212.

In step 2212, the second biometric policy in the list of biometric policies is determined. Once the second biometric policy is determined, the second biometric policy is executed in step 2214. Here, the steps in the flowchart that applies to the second biometric policy are executed. For example, the second biometric policy can be the same type of policy as the first biometric policy or it can be one of the other biometric policies.

In step 2216, if the user passes the second biometric policy, then control transfers to step 2218. In step 2218, the user has passed the OR policy and the flowchart in FIG. 22 ends. At this point the user has been authenticated by biometric system 102. Alternatively, if in step 2216 the user fails the second biometric policy, then control transfers to step 2220.

In step 1220, if n is not greater than zero, then control transfers to step 2222. If control transfers to step 2222 it means that the list of biometric policies has only two biometric policies in it and the user has failed both biometric policies. In step 2222, the user has failed the OR policy and the flowchart in FIG. 22 ends. At this point the user has not been authenticated by biometric system 102. Alternatively, if in step 2220 n is greater than zero, then control transfers to step 2224. In this situation the list of biometric policies has more than two biometric policies in it. In step 2224, the next biometric policy is determined. Once the next biometric policy is determined, the next biometric policy is executed in step 2226.

In step 2228, if the user passes the next biometric policy, then control transfers to step 2230. In step 2230, the user has passed the OR policy and the flowchart in FIG. 22 ends. At this point the user has been authenticated by biometric system 102. Alternatively, if in step 2228 the user fails the next biometric policy, then control transfers to step 2232.

In step 2232, one is subtracted from n and control returns to step 2220. In step 2220, if n is not greater than zero then the user has failed all the biometric policies in the list of biometric policies. Here, control transfers to step 2222. In step 2222, the user has failed the OR policy and the flowchart in FIG. 22 ends. At this point the user has not been authenticated by biometric system 102. Alternatively, if in step 2220 n is greater than zero, this means there are still more biometric policies in the list of biometric policies that have not been executed. The flowchart in FIG. 22 continues until the user has either failed all the biometric policies or the user passes one biometric policy in the list of biometric policies.

b. AND Policy Having a List of Biometric Policies

Figure 23A:
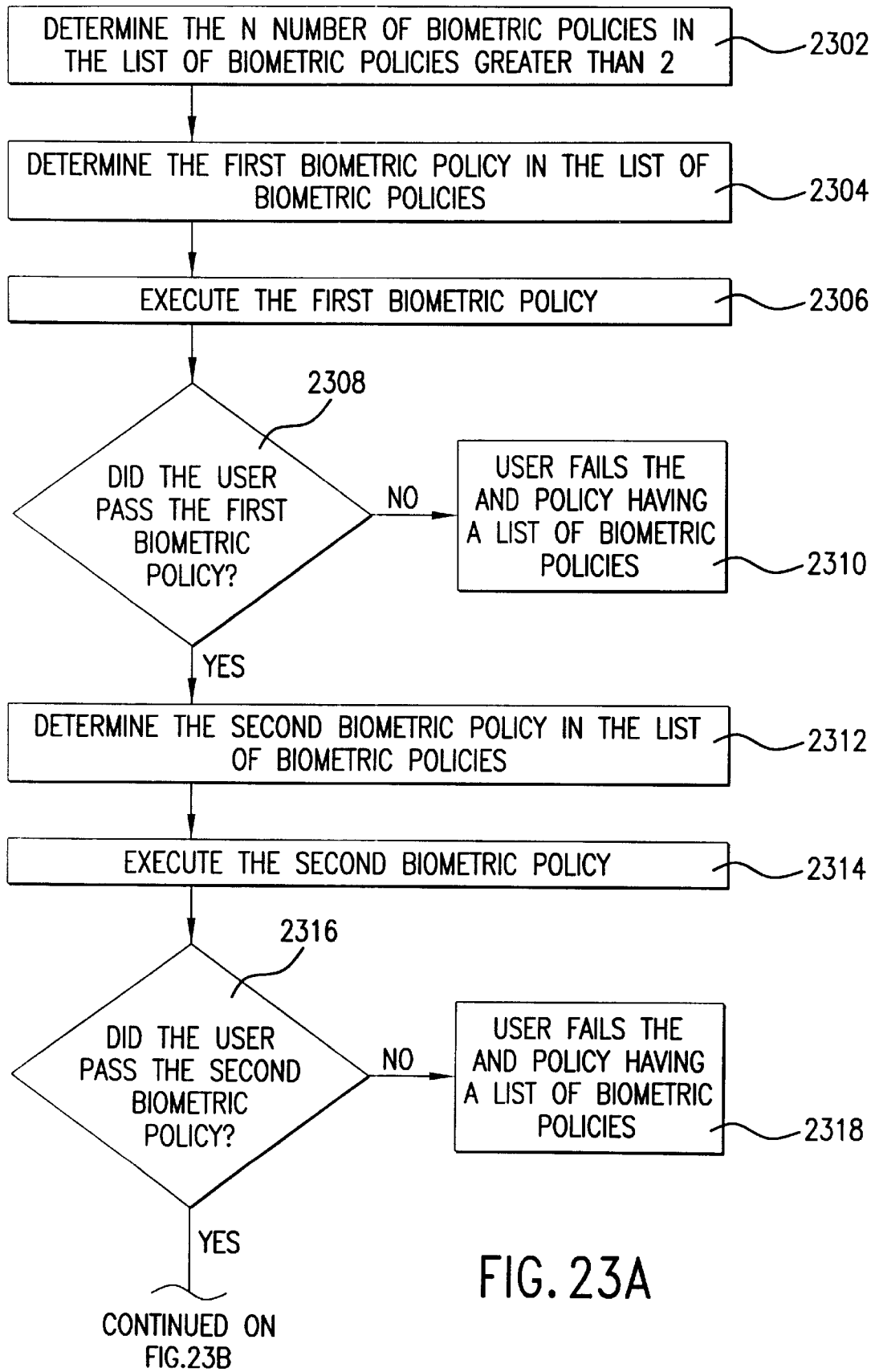
FIG. 23 is a flowchart illustrating the steps involved in executing an AND policy having a list of biometric policies of the present invention.
Figure 23B:
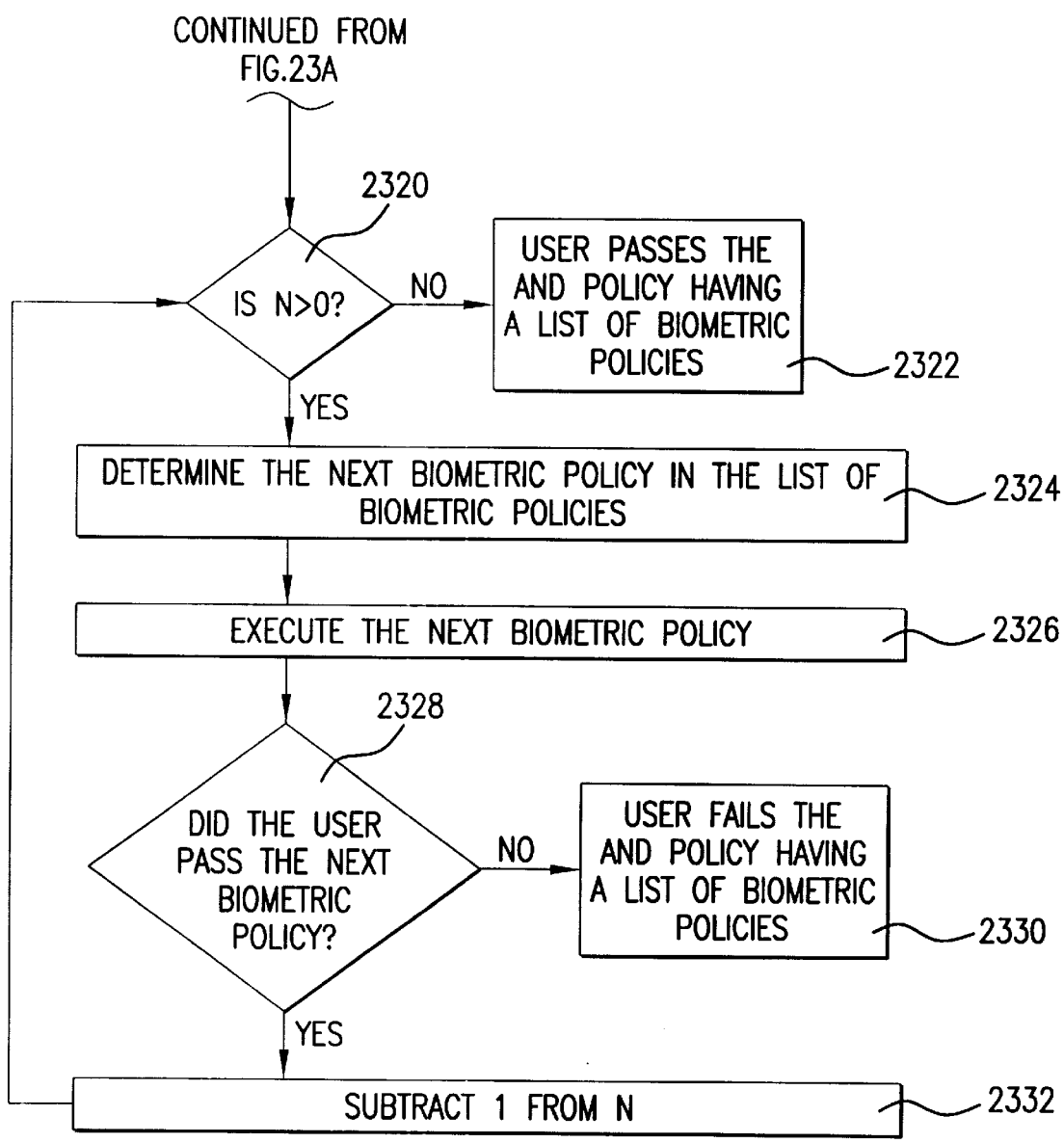

The user passes an AND policy having a list of biometric policies of the present invention if the user passes all of the biometric policies in the list of biometric policies. FIG. 23 is a flowchart illustrating the steps involved in executing an AND policy having a list of biometric policies of the present invention. In step 2302, then number of biometric policies in the list of biometric policies greater than two is determined. This type of AND policy will always have at least two biometric policies in its list of biometric policies. In step 2304, the first biometric policy in the list of biometric policies is determined. Once the first biometric policy is determined, the first biometric policy is executed in step 2306. Here, the steps in the flowchart that applies to the first biometric policy are executed. For example, if the first biometric policy is a AND policy, then the flowchart in FIG. 18 would be executed. Referring to FIG. 18, the outcome of FIG. 18 is either the user passes or fails the AND policy. Therefore, this information gets returned to step 2306 of FIG. 23.

In step 2308, if the user fails the first biometric policy, then control transfers to step 2310. In step 2310, the user has failed the AND policy and the flowchart in FIG. 23 ends. At this point the user has not been authenticated by biometric system 102 (FIG. 1). Alternatively, if in step 2308 the user passes the first biometric policy, then control transfers to step 2312.

In step 2312, the second biometric policy in the list of biometric policies is determined. Once the second biometric policy is determined, the second biometric policy is executed in step 2314. Here, the steps in the flowchart that applies to the second biometric policy are executed.

In step 2316, if the user fails the second biometric policy, then control transfers to step 2318. In step 2318, the user has failed the AND policy and the flowchart in FIG. 23 ends. At this point the user has not been authenticated by biometric system 102. Alternatively, if in step 2316 the user passes the second biometric policy, then control transfers to step 2320.

In step 1320, if n is not greater than zero, then control transfers to step 2322. If control transfers to step 2322 it means that the list of biometric policies has only two biometric policies in it and the user has passed both biometric policies. In step 2322, the user has passed the AND policy and the flowchart in FIG. 23 ends. At this point the user has been authenticated by biometric system 102. Alternatively, if in step 2320 n is greater than zero, then control transfers to step 2324. In this situation the list of biometric policies has more than two biometric policies in it. In step 2324, the next biometric policy is determined.

Once the next biometric policy is determined, the next biometric policy is executed in step 2326.

In step 2328, if the user fails the next biometric policy, then control transfers to step 2330. In step 2330, the user has failed the AND policy and the flowchart in FIG. 23 ends. At this point the user has not been authenticated by biometric system 102. Alternatively, if in step 2328 the user passes the next biometric policy, then control transfers to step 2332.

In step 2332, one is subtracted from n and control returns to step 2320. In step 2320, if n is not greater than zero then the user has passed all the biometric policies in the list of biometric policies. Here, control transfers to step 2322. In step 2322, the user has passed the AND policy and the flowchart in FIG. 23 ends. At this point the user has been authenticated by biometric system 102. Alternatively, if in step 2320 n is greater than zero, this means there are still more biometric policies in the list of biometric policies that have not been executed. The flowchart in FIG. 23 continues until the user has either passed all the biometric policies or the user fails one biometric policy in the list of biometric policies.

c. RANDOM Policy Having a List of Biometric Policies

Figure 24:
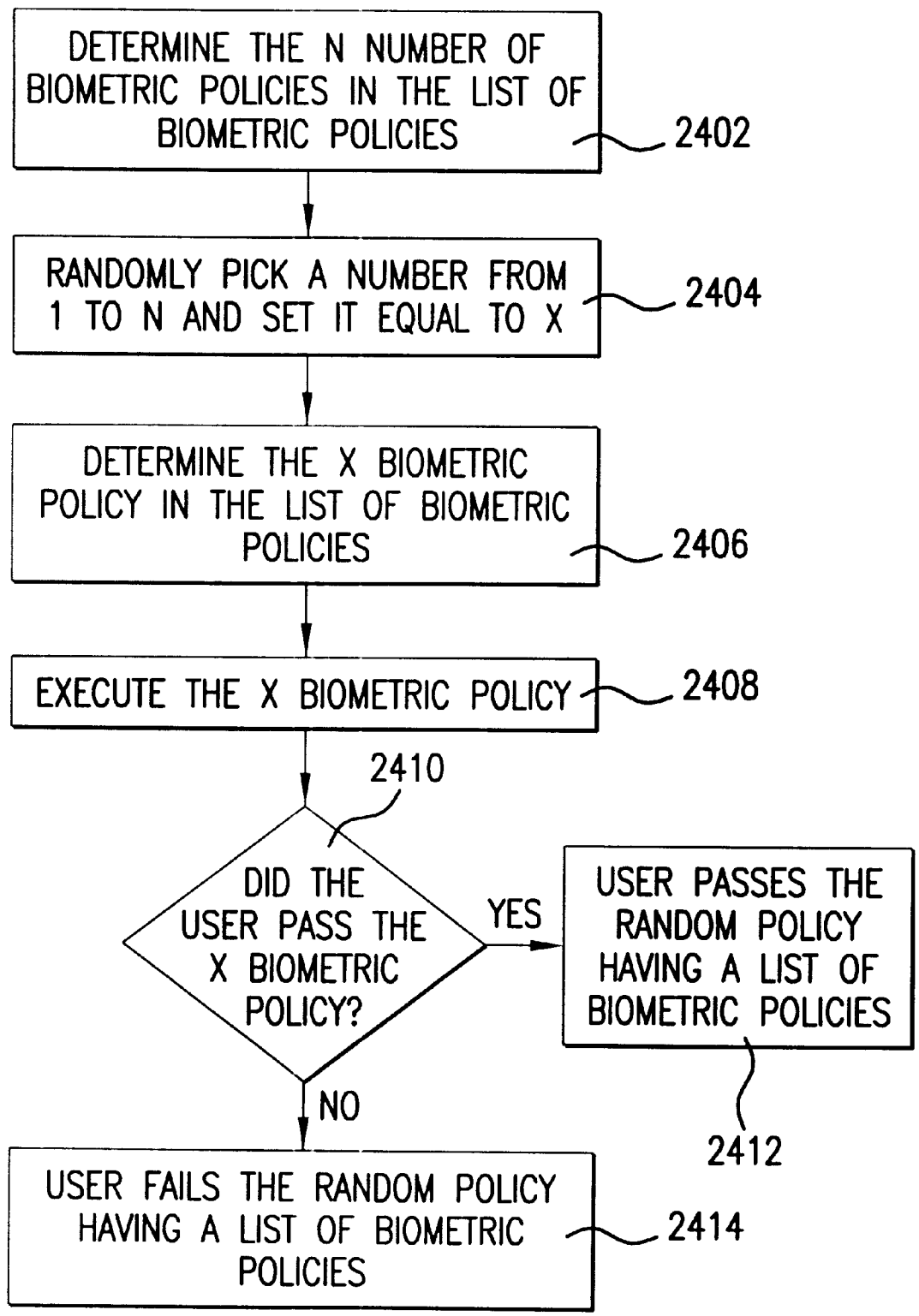
FIG. 24 is a flowchart illustrating the steps involved in executing a RANDOM policy having a list of biometric policies of the present invention.

The user passes a RANDOM policy having a list of biometric policies of the present invention if the user passes a random biometric policy. FIG. 24 is a flowchart illustrating the steps involved in executing the RANDOM policy having a list of biometric policies of the present invention. In step 2402, the n number of biometric policies in the list of biometric policies is determined. This type of RANDOM policy will always have at least two biometric policies in its list of biometric policies. In step 2404, a random number from one to n is picked and the random number is set equal to X. In step 2406, the X biometric policy in the list of biometric policies is determined. Once the X biometric policy is determined, the x biometric policy is executed in step 2408. Here, the steps in the flowchart that applies to the first biometric policy are executed.

In step 2410, if the user passes the X biometric policy, then control transfers to step 2412. In step 2412, the user has passed the RANDOM policy and the flowchart in FIG. 24 ends. At this point the user has been authenticated by biometric system 102. Alternatively, if in step 2410 the user fails the X biometric policy, then control transfers to step 2414. In step 2414, the user has failed the RANDOM policy and the flowchart in FIG. 24 ends. At this point the user has not been authenticated by biometric system 102.

The RANDOM policy having a list of biometric policies is used to request the user to pass a random biometric policy 504 each time the user attempts to be authenticated by biometric system 102.

d. CONTINGENT Policy Having a List of Biometric Policies

As discussed above each biometric policy returns a pass/fail result. In addition, the biometric policy can also provide one or more threshold values relating to the biometric devices in the list of devices associated with the biometric policy. In other words, each biometric policy returns a composite threshold value that is generated from one or more of the threshold values generated by the biometric devices. The composite threshold values are returned regardless of whether the biometric policy was passed or failed by the user. These composite threshold values can then be used by a CONTINGENT policy having a list of biometric policies. This feature provides the administrator with flexibility to adjust the level of authentication.

Figure 31:
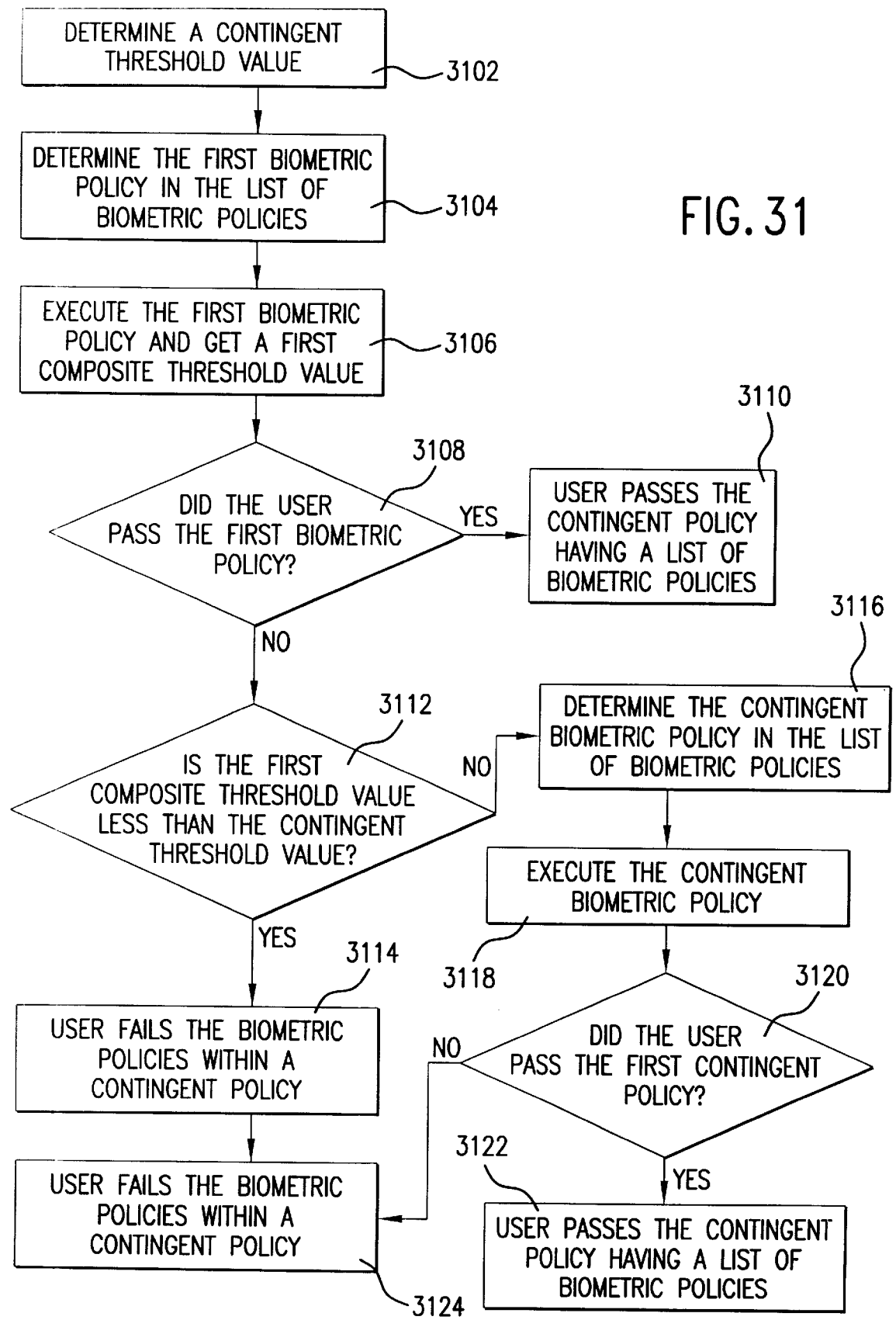
FIG. 31 is a flowchart illustrating the steps involved in executing a CONTINGENT policy having a list of biometric policies of the present invention.

The user passes a CONTINGENT policy having a list of biometric policies of the present invention if either the user exceeds a minimum threshold (i.e., a first composite threshold value) associated with a first biometric policy or if the user exceeds a contingent threshold associated with the first biometric policy and the user exceeds a minimum threshold (i.e., a contingent threshold value) associated with a contingent biometric policy. FIG. 31 is a flowchart illustrating the steps involved in executing the CONTINGENT policy having a list of biometric policies of the present invention. With this type of CONTINGENT policy there is always two biometric policies in the list of biometric policies.

In step 3102, a contingent threshold value is determined. In step 3104, the first biometric policy in the list of biometric policies is determined. Once the first biometric policy is determined, then the first biometric policy is executed in step 3106. The results from the execution of the first biometric policy are whether or not the user passed the first biometric policy and a first composite threshold value.

In step 3108, whether the user passed the first biometric policy is determined. If the user passed the first biometric policy, then control transfers to step 3110. In step 3110, the user has passed the CONTINGENT policy and the flowchart in FIG. 31 ends. At this point the user has been authenticated by biometric system 102 (FIG. 1). Alternatively, if in step 3108 the user failed the first biometric policy, then control transfers to step 3112.

In step 3112, the first composite threshold value is compared to the contingent threshold value. If the first composite threshold value is less than the contingent threshold value, then control transfers to step 3114. In step 3114, the user has failed the CONTINGENT policy. At this point the user has not been authenticated by biometric system 102. Alternatively, if in step 3112 the first composite threshold value is greater than or equal to the contingent threshold value, then control transfers to step 3116. The contingent threshold value is used to give the user a second chance to pass the CONTINGENT policy and thus be authenticated by biometric system 102.

In step 3116, the contingent biometric policy in the list of biometric policies is determined. Once the contingent biometric policy is determined, then the contingent biometric policy is executed in step 3118. In step 3120, if the user passed the contingent biometric policy, then control transfers to step 3122. In step 3122, the user has passed the CONTINGENT policy and the flowchart in FIG. 31 ends. At this point the user has been authenticated by biometric system 102. Alternatively, if in step 3120 the user failed the contingent biometric policy, then control transfers to step 3124. In step 3124, the user has failed the CONTINGENT policy and the flowchart in FIG. 31 ends. At this point the user has not been authenticated by biometric system 102.

e. THRESHOLD Policy Having a List of Biometric Policies

As discussed above each biometric policy returns a pass/fail result. In addition, the biometric policy can also provide one or more threshold values relating to the biometric devices in the list of devices associated with the biometric policy. In other words, each biometric policy returns a composite threshold value that is generated from one or more of the threshold values generated by the biometric devices. The composite threshold values are returned regardless of whether the biometric policy was passed or failed by the user. These composite threshold values can then be used by a THRESHOLD policy having a list of biometric policies. This feature provides the administrator with flexibility to adjust the level of authentication.

Figure 32A:
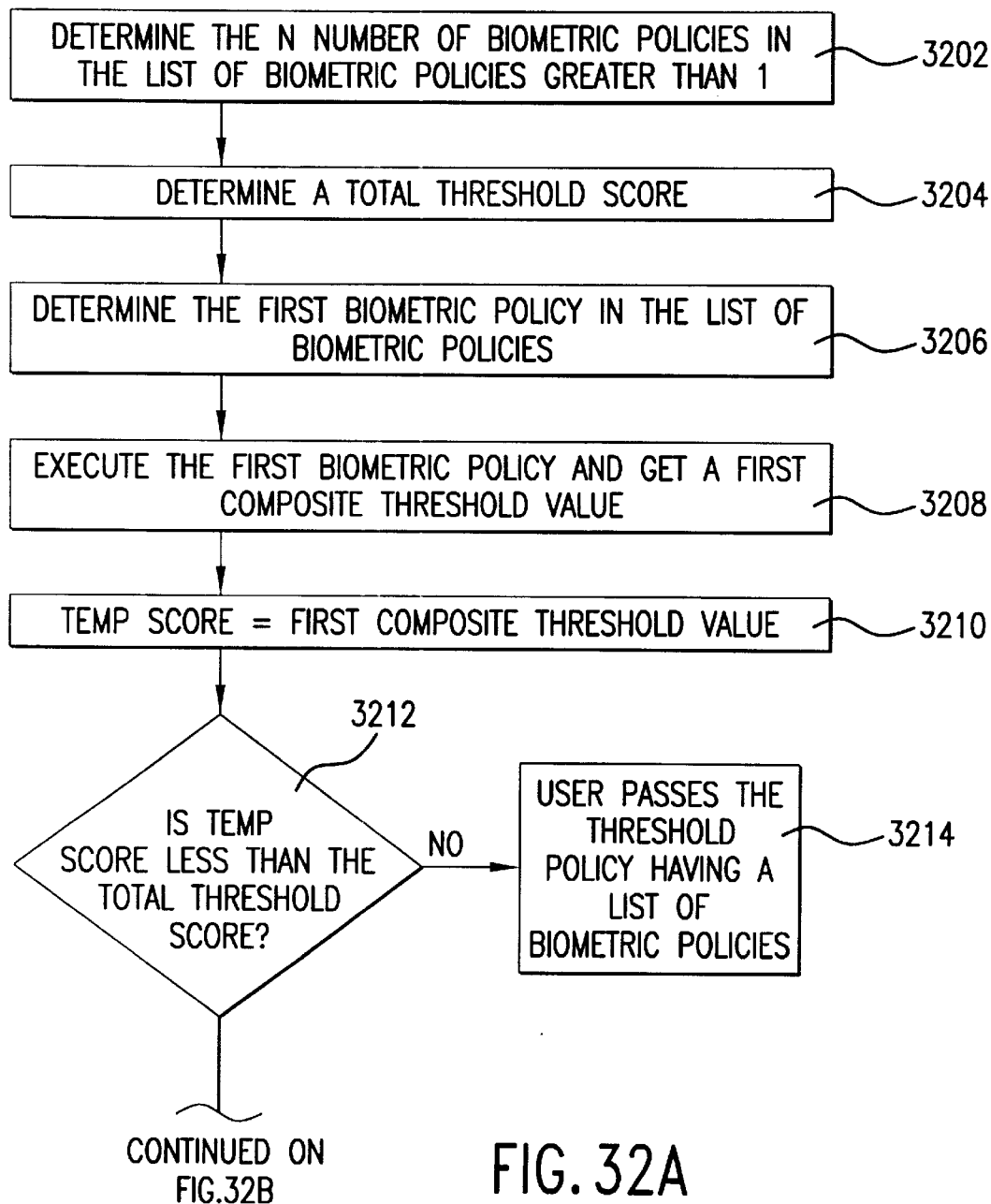
FIG. 32 is a flowchart illustrating the steps involved in executing a THRESHOLD policy having a list of biometric policies of the present invention.
Figure 32B:
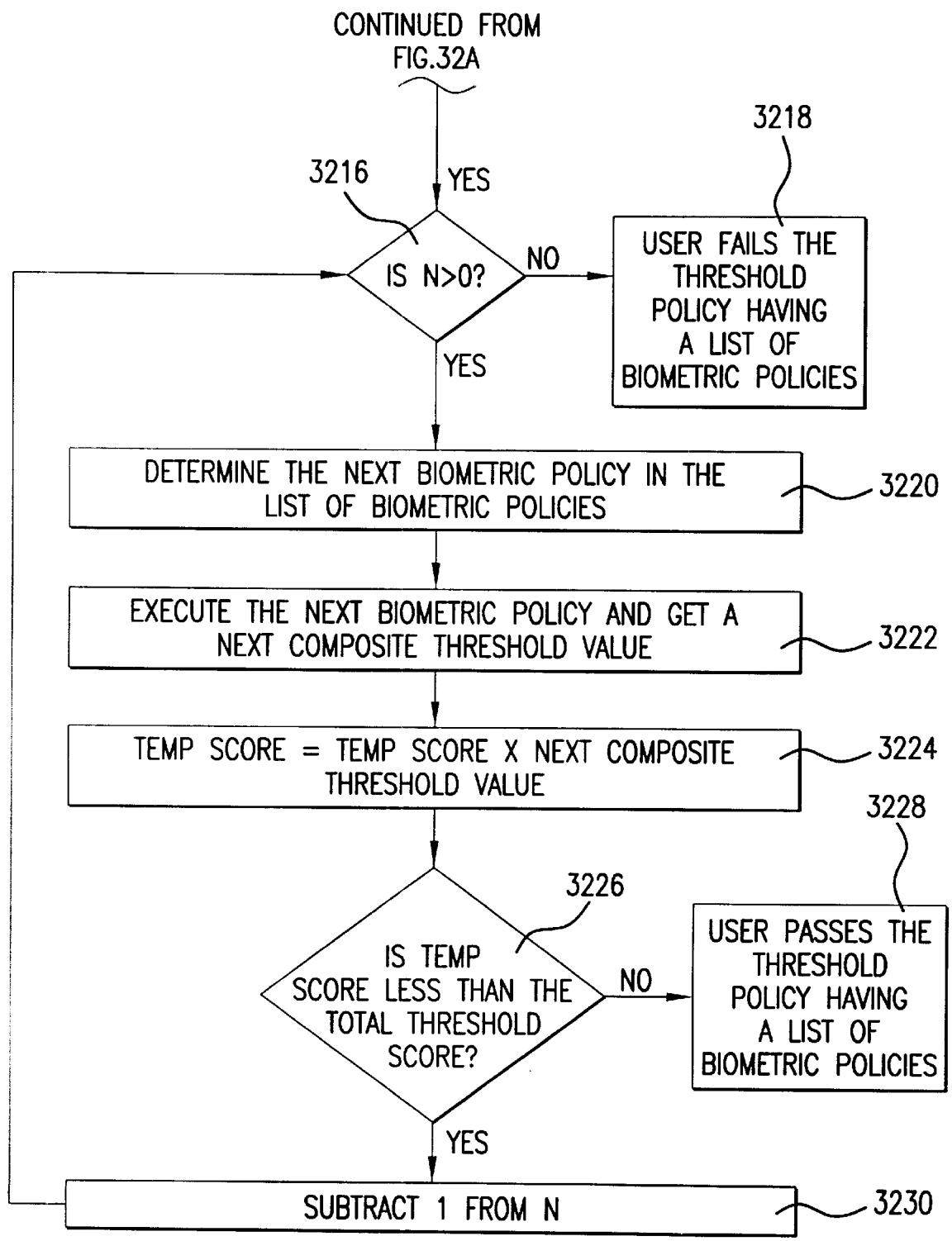

The user passes a THRESHOLD policy having a list of biometric policies of the present invention if the user exceeds a total threshold (i.e., total threshold score) while being tested on one or more biometric policies in the list of biometric policies. FIG. 32 is a flowchart illustrating the steps involved in executing the THRESHOLD policy having a list of biometric policies of the present invention. In step 3202, the n number of biometric policies in the list of biometric policies greater than one is determined. This type of THRESHOLD policy can have one or more biometric policies in its list of biometric policies. In step 3204 a total threshold score is determined. In step 3206, the first biometric policy in the list of biometric policies is determined. Once the first biometric policy is determined, the first biometric policy is executed in step 3208. The results from the execution of the first biometric policy are whether or not the user passed the first biometric policy and a first composite threshold value.

In step 3210, a temp score is set equal to the first composite threshold value. In step 3212, the temp score is compared to the total threshold score. If the temp score is greater than or equal to the total threshold score, then control transfers to step 3214. In step 3214, the user has passed the THRESHOLD policy and the flowchart in FIG. 32 ends. At this point the user has been authenticated by biometric system 102 (FIG. 1). Alternatively, if in step 3212 the temp score is less than the total threshold score, then control transfers to step 3216.

In step 3216, if n is not greater than zero, then control transfers to step 3218. In step 3218, the user has failed the THRESHOLD policy and the flowchart in FIG. 32 ends. At this point the user has not been authenticated by biometric system 102 (FIG. 1). Alternatively, if in step 3216 n is greater than zero, then control transfers to step 3220. In step 3220, the next biometric policy in the list of biometric policies is determined. Once the next biometric policy is determined, the next biometric policy gets executed in step 3222. The results from the execution of the next biometric policy are whether or not the user passed the next biometric policy and a next composite threshold value.

In step 3224, temp score gets multiplied by the next composite threshold value and the product gets stored back into temp score. In step 3226, the temp score is compared to the total threshold score. If the temp score is greater than or equal to the total threshold score, then control transfers to step 3228. In step 3228, the user has passed the THRESHOLD policy and the flowchart in FIG. 32 ends. At this point the user has been authenticated by biometric system 102. Alternatively, if in step 3226 the temp score is less than the total threshold score, then control transfers to step 3230.

In step 3230, one is subtracted from n and control returns to step 3216. In step 3216, if n is not greater than zero then all the biometric policies in the list of biometric policies have been executed. Here, control transfers to step 3218. In step 3218, the user has failed the THRESHOLD policy and the flowchart in FIG. 32 ends. At this point the user has not been authenticated by biometric system 102. Alternatively, if in step 3216 n is greater than zero, this means there are still more biometric policies in the list of biometric policies that have not been executed. The flowchart in FIG. 32 continues until all the biometric policies in the list of biometric policies have been executed or temp score is greater than or equal to the total threshold score 7. Biometric Policies having a List of Policies or Devices The other type of administrator-defined policy is a biometric policy with a policy list of policies or devices. This administrator-defined policy allows for the combined use of biometric devices, non-biometric devices and/or biometric policies. This type of policy gives added flexibility that all the other policies mentioned above do not provide. With this type of policy, it is possible for a user to be authenticated by biometric system 102 by being tested on a single non-biometric device. This is important because it provides flexibility in converting to biometric system 102 by not having to enroll all users at the same time with biometric devices. Here, a user can continue to use the non-biometric device the user has always used to log into biometric system 102.

There are two ways in which biometric system 102 provides flexibility in rolling out biometric system 102 by not having to enroll all users at the same time with biometric devices. The first way is by not assigning a user to a biometric group 506. Here, when biometric system 102 discovers that the user does not have a biometric group 506, the previous way of allowing users to gain access to enterprise resources (e.g., passwords, tokens or smart cards) takes control to authenticate the user. The second way is when the administrator has assigned the user to a biometric group 506. The second way involves an OR policy with a list of policies or devices of the present invention as described below.

If the user has been assigned to a biometric group 506, then the flexibility of not requiring all users to be enrolled in biometric devices at the same time requires a slight variation from what was described in reference to FIGS. 8A and 8B above. As described above, in step 811, database object 710 (FIG. 7) determines whether the required biometric templates 502 (FIG. 5) for the user are stored in biometric object 710 (FIG. 7) to execute the user's biometric policy 504 (FIG. 5). In addition, database object 710 also determines if computer 208 (FIG. 2) has the required biometric devices attached to it to execute the user's biometric policy 504. If the required biometric templates 502 or the required biometric devices do not exist, then control transfers to step 836. In step 836, biometric server 104 (FIG. 1) communicates to computer 208 that the user cannot be authenticated. Authentication interface 704 (FIG. 7) then denies the user access. Therefore, to provide the flexibility of not requiring all users to be enrolled in biometric devices at the same time, biometric server 104 knows when to skip over step 811 (e.g., a flag) and go directly to step 812 (FIGS. 8A and 8B).

a. OR Policy Having a List of Policies or Devices

Figure 25A:
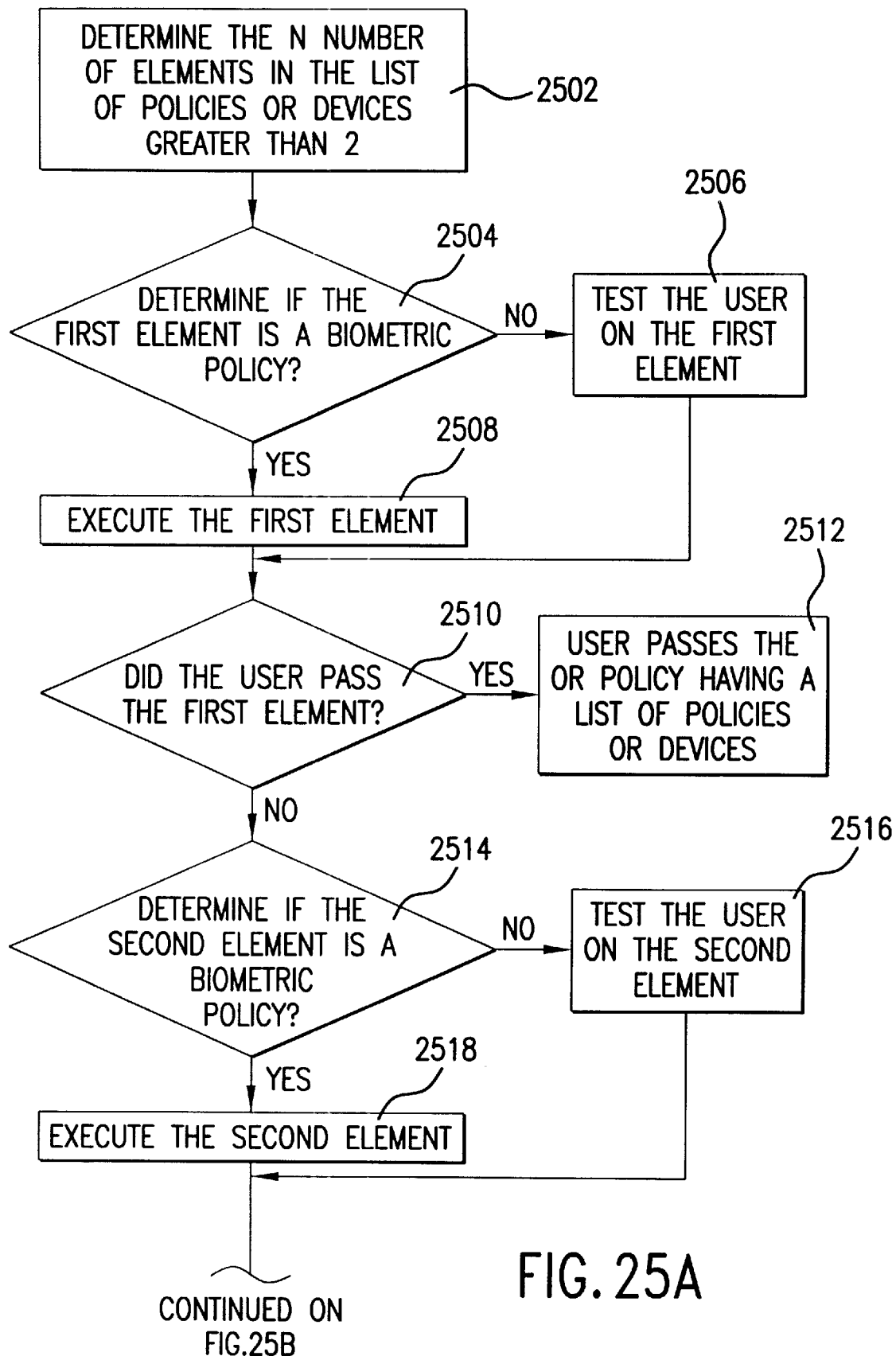
FIG. 25 is a flowchart illustrating the steps involved in executing an OR policy having a list of policies or devices of the present invention.
Figure 25B:
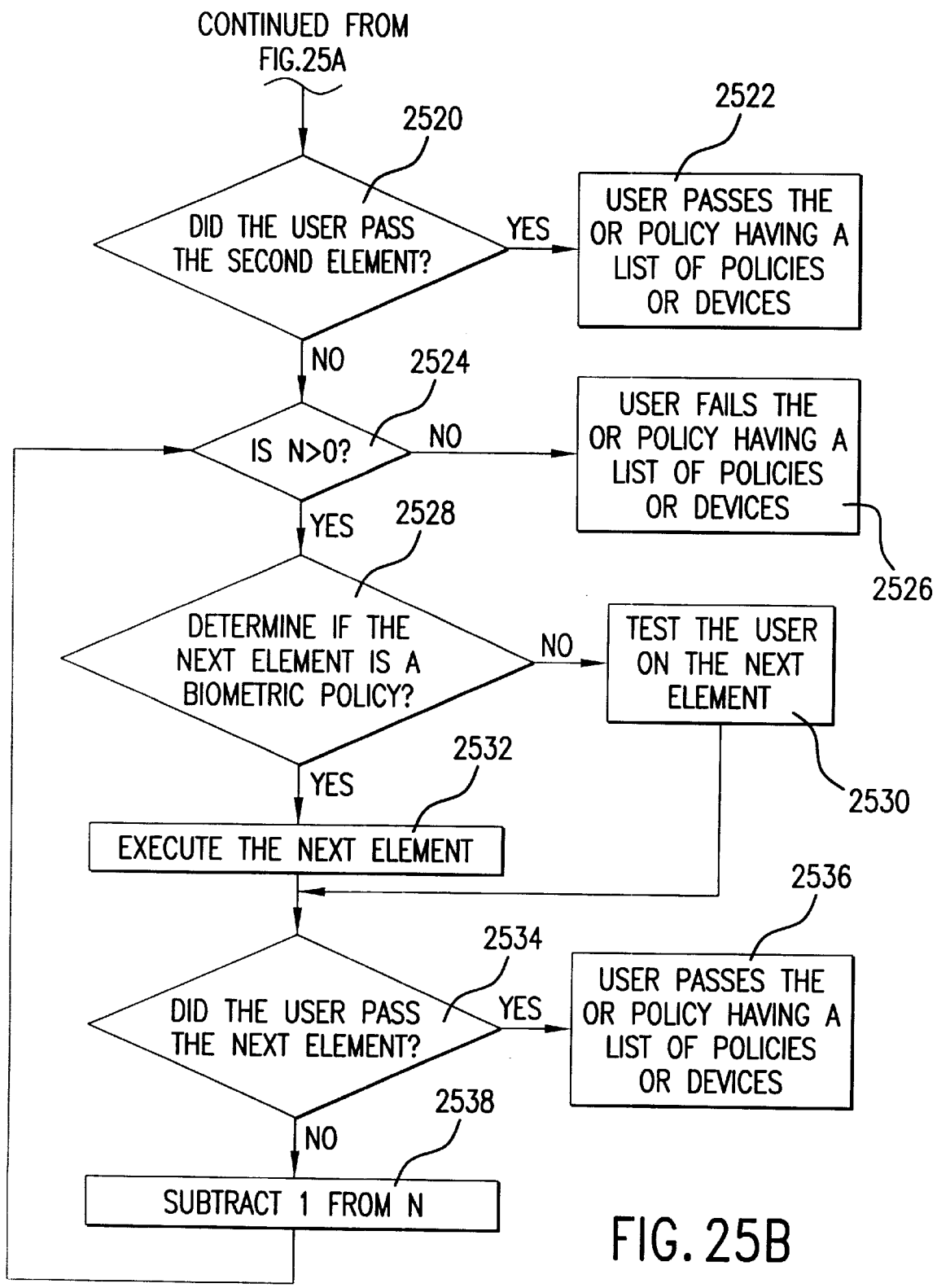

The user passes an OR policy having a list of policies or devices of the present invention if the user passes one of the elements in the list of policies or devices. FIG. 25 is a flowchart illustrating the steps involved in executing the OR policy having a list of policies or devices of the present invention. In step 2502, the n number of elements in the list of policies or devices greater than two is determined. An element can be one of the biometric polices described herein, a biometric device or a non-biometric device. This type of OR policy will always have at least two elements in its list of polices or devices. In step 2504, it is determined whether the first element in the list of policies or devices is a biometric policy. If the first element is not a biometric policy, then control transfers to step 2506.

In step 2506, the first element is either a biometric or a non-biometric device. FIGS. 8A, 8B and 9 involve the user being tested on a biometric device. Referring again to FIGS. 8A, 8B and 9, when a user gets tested on a biometric device, the result returned includes both a score and whether the user passed or failed the biometric device. The flowchart in FIG. 25 utilizes the information of whether the user passed or failed only. As with biometric devices, when the user is tested on a non-biometric device, the result includes whether the user passed or failed the non-biometric device. Thus, in step 2506, the user is tested on the first element (i.e., either a biometric or a non-biometric device) and the result indicates whether the user passed or failed the first element (i.e., the device).

Alternatively, in step 2504, if the first element is a biometric policy, then control transfers to step 2508. In step 2508, the first element (i.e., the biometric policy) is executed and the result indicates whether the user passed or failed the first element (i.e., the biometric policy). Whether the first element is a biometric policy or a device, controls transfers to step 2510.

In step 2510, if the user passes the first element, then control transfers to step 2512. In step 2512, the user has passed the OR policy and the flowchart in FIG. 25 ends. At this point the user has been authenticated by biometric system 102 (FIG. 1). An example of the flexibility biometric system 102 provides by not forcing all users to be enrolled in biometric system 102 at the same time can be illustrated here. Assume the non-biometric device the user has used in the past to gain access to enterprise resources is a password device. If the first element in the list of policies or devices is a password device, the user can be authenticated by biometric system 102 by passing the password device.

Alternatively, if in step 2510 the user fails the first element, then control transfers to step 2514. In step 2514, it is determined whether the second element in the list of policies or devices is a biometric policy. If the second element is not a biometric policy, then control transfers to step 2516. In step 2516, the second element is either a biometric or a non-biometric device. The user is tested on the second element and the result indicates whether the user passed or failed the second element (i.e, the device).

Alternatively, in step 2514, if the second element is a biometric policy, then control transfer to step 2518. The second element is executed to determine whether the user passes or fails the second element (i.e., the biometric policy). Whether the second element is a biometric policy or a device, controls transfers to step 2520. In step 2520, if the user passes the second element, then control transfers to step 2522. In step 2522, the user has passed the OR policy and the flowchart in FIG. 25 ends. At this point the user has been authenticated by biometric system 102. Alternatively, if in step 2520 the user fails the second element, then control transfers to step 2524.

In step 2524, if n is not greater than zero, then control transfers to step 2526. If control transfers to step 2526 it means that the list of policies or devices has only two elements in it and the user has failed both elements. In step 2526, the user has failed the OR policy and the flowchart in FIG. 25 ends. At this point the user has not been authenticated by biometric system 102. Alternatively, if in step 2524 n is greater than zero, then control transfers to step 2528. In this situation the list of policies or devices has more than two elements in it.

In step 2528, it is determined whether the next element in the list of policies or devices is a biometric policy. If the next element is not a biometric policy, then control transfers to step 2530. In step 2530, the next element is either a biometric or a non-biometric device. The user is tested on the next element and the result indicates whether the user passed or failed the next element (i.e, the device).

Alternatively, in step 2528, if the next element is a biometric policy, then control transfer to step 2532. The next element is executed to determine whether the user passes or fails the next element (i.e., the biometric policy). Whether the next element is a biometric policy or a device, controls transfers to step 2534. In step 2534, if the user passes the next element, then control transfers to step 2536. In step 2536, the user has passed the OR policy and the flowchart in FIG. 25 ends. At this point the user has been authenticated by biometric system 102 (FIG. 1). Alternatively, if in step 2534 the user fails the next element, then control transfers to step 2538.

In step 2538, one is subtracted from n and control returns to step 2524. In step 2524, if n is not greater than zero then the user has failed all the elements in the list of policies or devices. Here, control transfers to step 2526. In step 2526, the user has failed the OR policy and the flowchart in FIG. 25 ends. At this point the user has not been authenticated by biometric system 102. Alternatively, if in step 2524 n is greater than zero, this means there are still more elements in the list of policies or devices. The flowchart in FIG. 25 continues until the user has either failed all the elements or the user passes one element in the list of policies or devices.

b. AND Policy Having a List of Policies or Devices

Figure 26A:
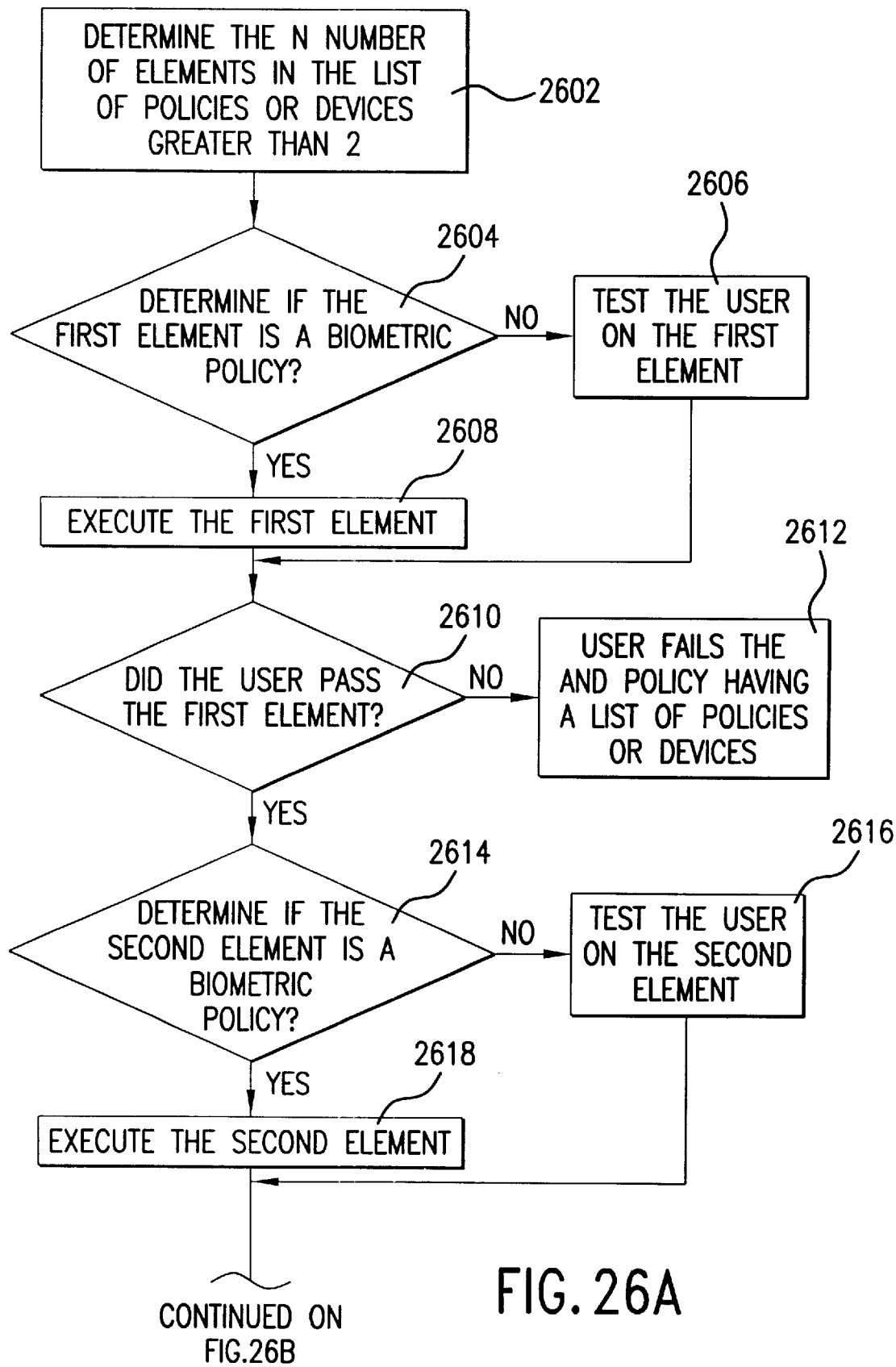
FIG. 26 is a flowchart illustrating the steps involved in executing an AND policy having a list of policies or devices of the present invention.
Figure 26B:
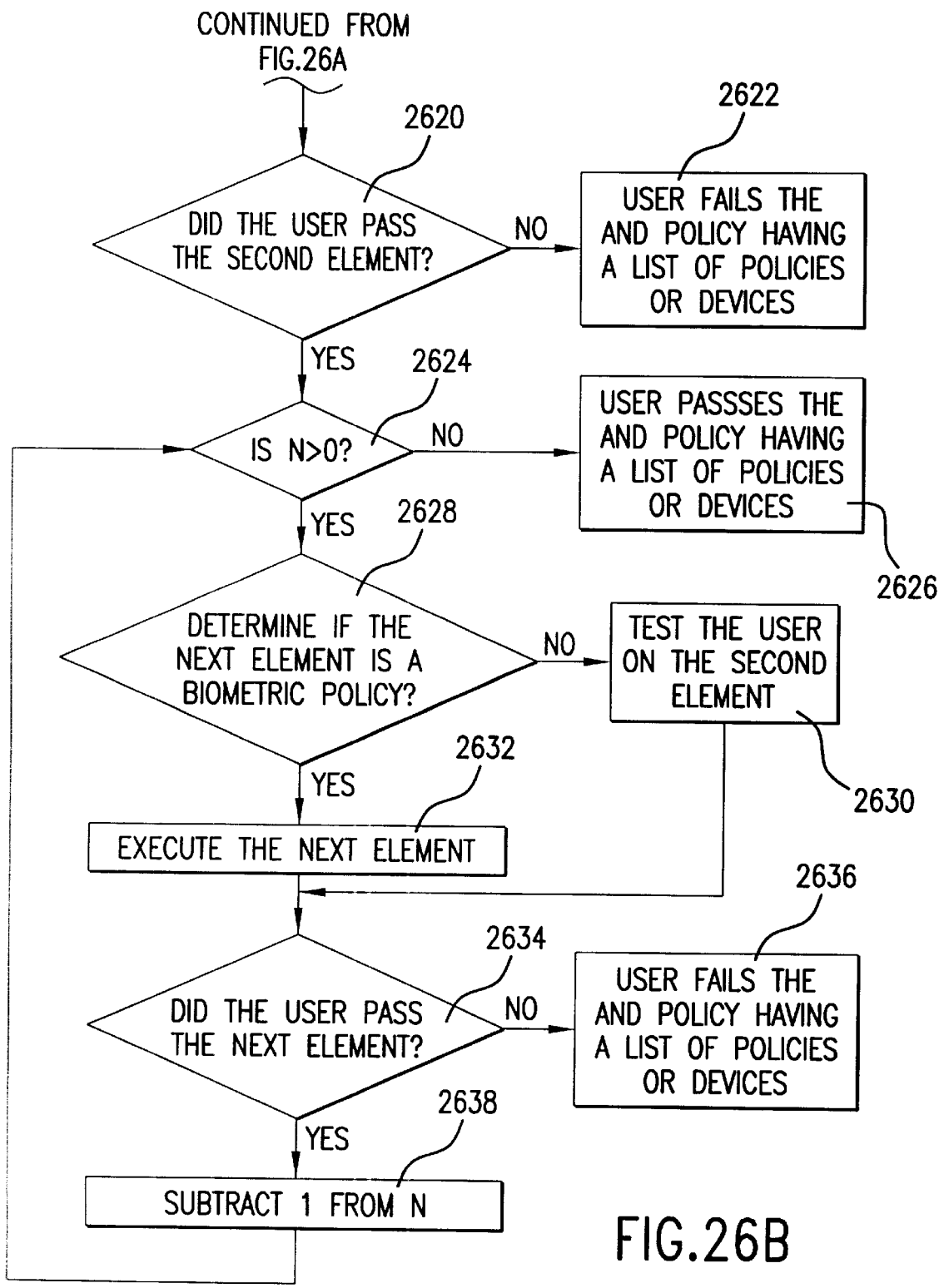

The user passes an AND policy having a list of policies or devices of the present invention if the user passes all of the elements in the list of policies or devices. FIG. 26 is a flowchart illustrating the steps involved in executing the AND policy having a list of policies or devices of the present invention. In step 2602, the n number of elements in the list of policies or devices greater than two is determined. An element can be one of the biometric polices described herein, a biometric device or a non-biometric device. This type of AND policy will always have at least two elements in its list of polices or devices. In step 2604, it is determined whether the first element in the list of policies or devices is a biometric policy. If the first element is not a biometric policy, then control transfers to step 2606.

In step 2606, the first element is either a biometric or a non-biometric device. In step 2606, the user is tested on the first element (i.e., either a biometric or a non-biometric device) and the result indicates whether the user passed or failed the first element (i.e., the device).

Alternatively, in step 2604, if the first element is a biometric policy, then control transfers to step 2608. In step 2608, the first element (i.e., the biometric policy) is executed and the result indicates whether the user passed or failed the first element (i.e., the biometric policy). Whether the first element is a biometric policy or a device, controls transfers to step 2610.

In step 2610, if the user fails the first element, then control transfers to step 2612. In step 2612, the user has failed the AND policy and the flowchart in FIG. 26 ends. At this point the user has not been authenticated by biometric system 102 (FIG. 1). Alternatively, if in step 2610 the user passes the first element, then control transfers to step 2614. In step 2614, it is determined whether the second element in the list of policies or devices is a biometric policy. If the second element is not a biometric policy, then control transfers to step 2616. In step 2616, the second element is either a biometric or anon-biometric device. The user is tested on the second element and the result indicates whether the user passed or failed the second element (i.e, the device).

Alternatively, in step 2614, if the second element is a biometric policy, then control transfer to step 2618. The second element is executed to determine whether the user passes or fails the second element (i.e., the biometric policy). Whether the second element is a biometric policy or a device, controls transfers to step 2620. In step 2620, if the user fails the second element, then control transfers to step 2622. In step 2622, the user has failed the AND policy and the flowchart in FIG. 26 ends. At this point the user has not been authenticated by biometric system 102. Alternatively, if in step 2620 the user passes the second element, then control transfers to step 2624.

In step 2624, if n is not greater than zero, then control transfers to step 2626. If control transfers to step 2626 it means that the list of policies or devices has only two elements in it and the user has passed both elements. In step 2626, the user has passed the AND policy and the flowchart in FIG. 26 ends. At this point the user has been authenticated by biometric system 102. Alternatively, if in step 2624 n is greater than zero, then control transfers to step 2628. In this situation the list of policies or devices has more than two elements in it.

In step 2628, it is determined whether the next element in the list of policies or devices is a biometric policy. If the next element is not a biometric policy, then control transfers to step 2630. In step 2630, the next element is either a biometric or a non-biometric device. The user is tested on the next element and the result indicates whether the user passed or failed the next element (i.e, the device).

Alternatively, in step 2628, if the next element is a biometric policy, then control transfer to step 2632. The next element is executed to determine whether the user passes or fails the next element (i.e., the biometric policy). Whether the next element is a biometric policy or a device, controls transfers to step 2634. In step 2634, if the user fails the next element, then control transfers to step 2636. In step 2636, the user has failed the AND policy and the flowchart in FIG. 26 ends. At this point the user has not been authenticated by biometric system 102 (FIG. 1). Alternatively, if in step 2634 the user passes the next element, then control transfers to step 2638.

In step 2638, one is subtracted from n and control returns to step 2624. In step 2624, if n is not greater than zero then the user has passed all the elements in the list of policies or devices. Here, control transfers to step 2626. In step 2626, the user has passed the AND policy and the flowchart in FIG. 26 ends. At this point the user has been authenticated by biometric system 102. Alternatively, if in step 2624 n is greater than zero, this means there are still more elements in the list of policies or devices. The flowchart in FIG. 26 continues until the user has either passed all the elements or the user fails one element in the list of policies or devices.

c. RANDOM Policy Having a List of Policies or Devices

Figure 27:
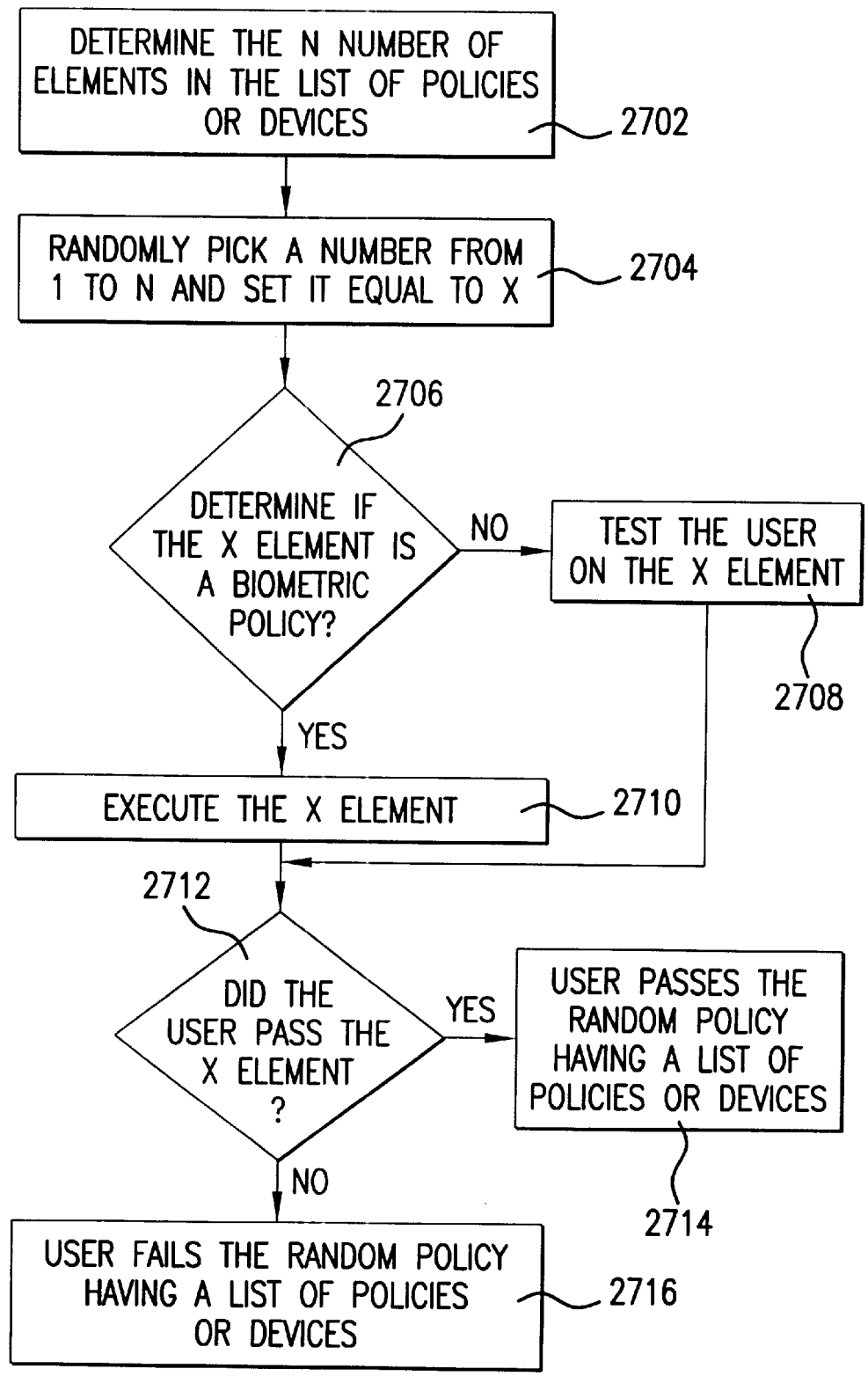
FIG. 27 is a flowchart illustrating the steps involved in executing a RANDOM policy having a list of policies or devices of the present invention.

The user passes a RANDOM policy having a list of policies or devices of the present invention if the user passes a random element. FIG. 27 is a flowchart illustrating the steps involved in executing a RANDOM policy having a list of policies or devices of the present invention. In step 2702, the n number of elements in the list of policies or devices is determined. An element can be one of the biometric polices described herein, a biometric device or a non-biometric device. This type of RANDOM policy will always have at least two elements in its list of polices or devices. In step 2704, a random number from one to n is picked and the random number is set equal to x. In step 2706, it is determined whether the X element in the list of policies or devices is a biometric policy. If the X element is not a biometric policy, then control transfers to step 2708.

In step 2708, the X element is either a biometric or a non-biometric device. In step 2708, the user is tested on the X element (i.e., either a biometric or a non-biometric device) and the result indicates whether the user passed or failed the first element (i.e., the device).

Alternatively, in step 2706, if the X element is a biometric policy, then control transfers to step 2710. In step 2710, the X element (i.e., the biometric policy) is executed and the result indicates whether the user passed or failed the X element (i.e., the biometric policy). Whether the X element is a biometric policy or a device, controls transfers to step 2712.

In step 2712, if the user passes the X element, then control transfers to step 2714. In step 2714, the user has passed the RANDOM policy and the flowchart in FIG. 27 ends. At this point the user has been authenticated by biometric system 102 (FIG. 1). Alternatively, if in step 2712 the user fails the X element, then control transfers to step 2716. In step 2716, the user has failed the RANDOM policy and the flowchart in FIG. 27 ends. At this point the user has not been authenticated by biometric system 102 (FIG. 1).

This type of RANDOM policy is used to request the user to pass a random biometric policy 504 or identification device each time the user attempts to be authenticated by biometric system 102.

d. CONTINGENT Policy Having a List of Policies or Devices

As discussed above each biometric policy returns a pass/fail result. In addition, the biometric policy can also provide one or more threshold values relating to the biometric devices in the list of devices associated with the biometric policy. In other words, each biometric policy returns a composite threshold value that is generated from one or more of the threshold values generated by the biometric devices. The composite threshold values are returned regardless of whether the biometric policy was passed or failed by the user. These composite threshold values can then be used by a CONTINGENT policy having a list of policies or devices. This feature provides the administrator with flexibility to adjust the level of authentication.

Figure 33A:
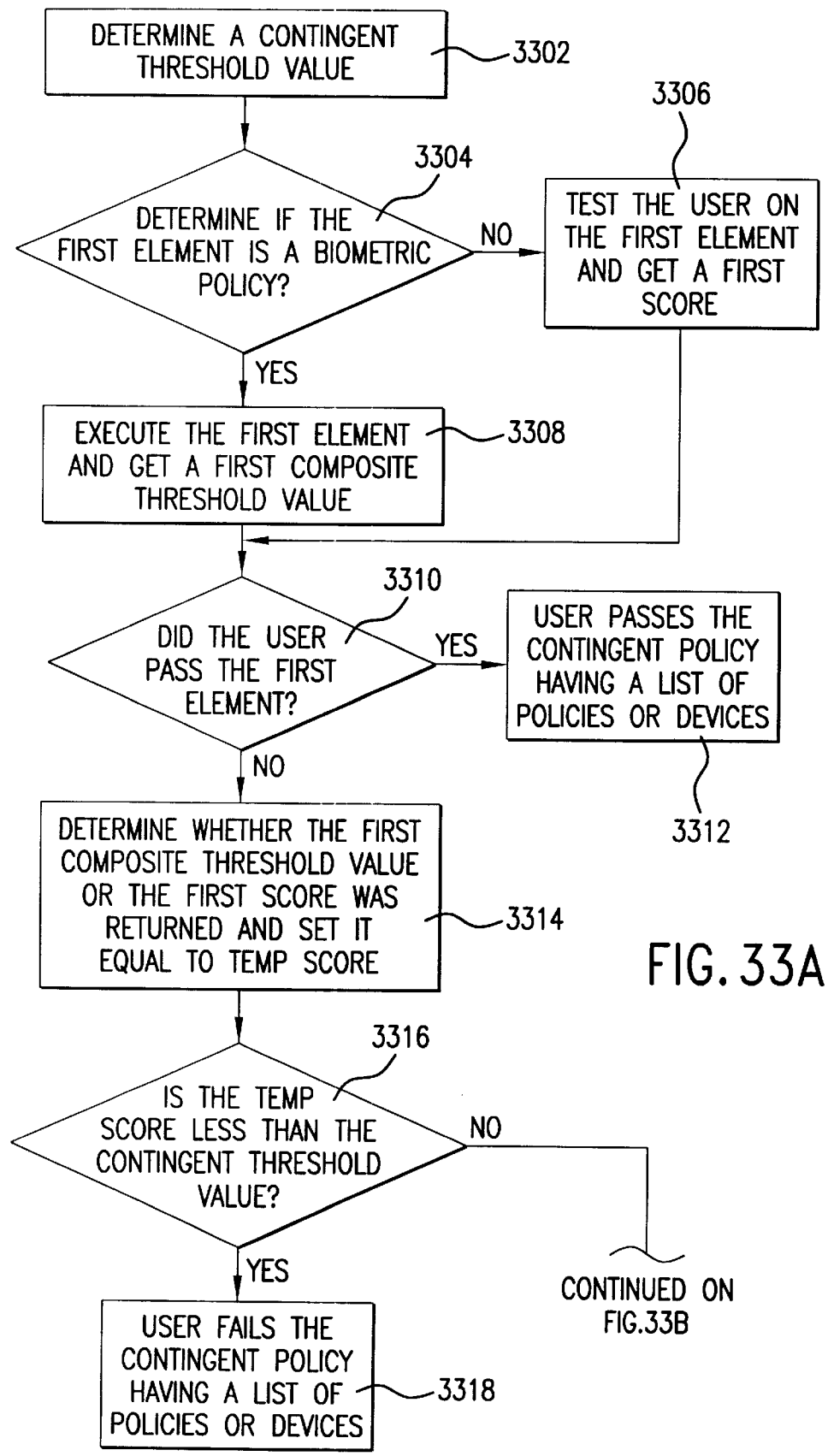
FIG. 33 is a flowchart illustrating the steps involved in executing a CONTINGENT policy having a list of policies or devices of the present invention.
Figure 33B:
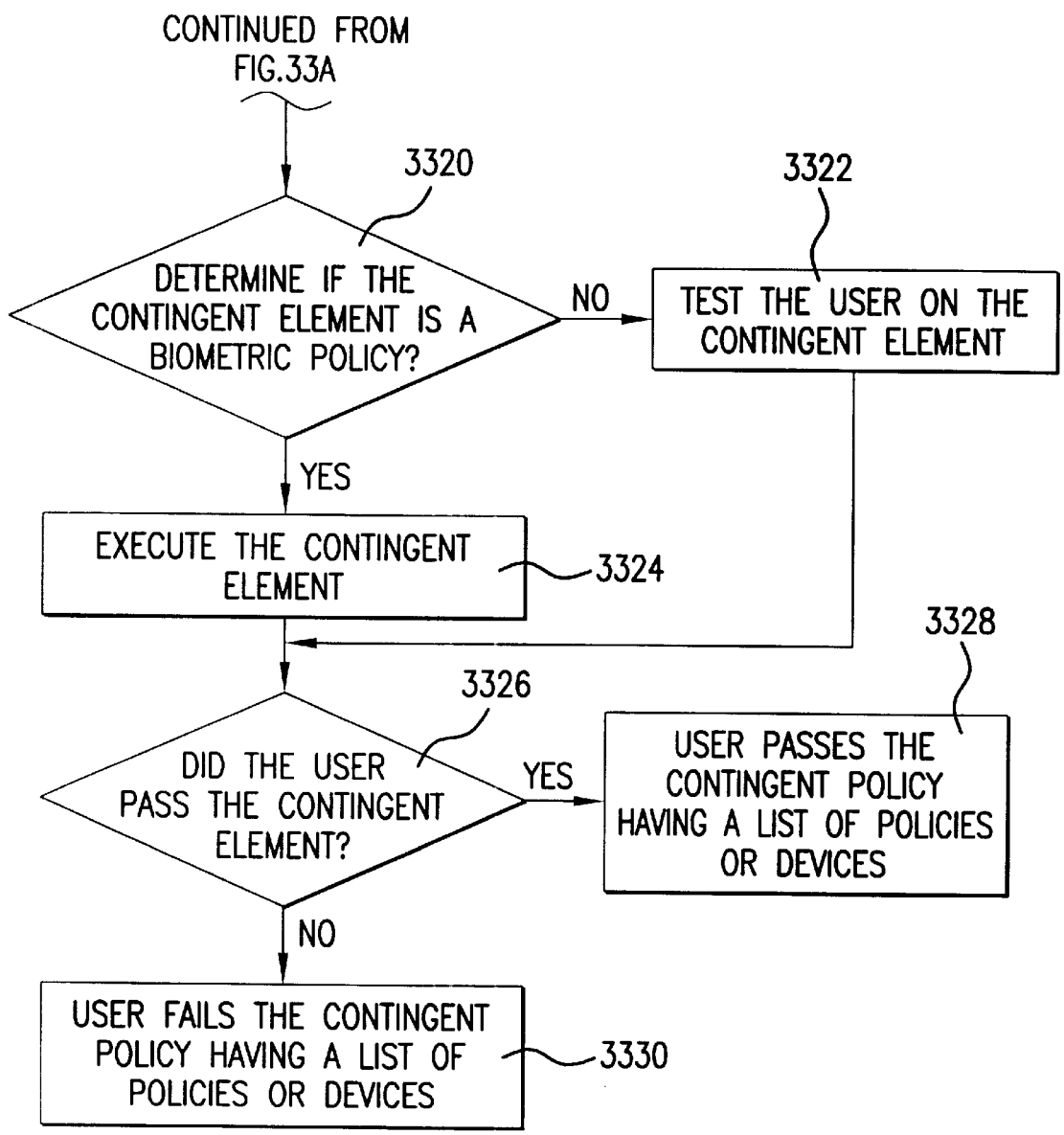

The user passes a CONTINGENT policy having a list of policies or devices of the present invention if either the user exceeds a minimum threshold associated with a first element or if the user exceeds a contingent threshold associated with the first element and the user exceeds a minimum threshold associated with a contingent element. FIG. 33 is a flowchart illustrating the steps involved in executing the CONTINGENT policy having a policy list of policies or devices of the present invention. This type of CONTINGENT policy always has two elements in the list of policies or devices. An element can be one of the biometric polices described herein, a biometric device or a non-biometric device.

In step 3302, a contingent threshold value is determined. In step 3304, it is determined whether the first element is a biometric policy. If the first element is not a biometric policy, then control transfers to step 3306. In step 3306, the first element is either a biometric or a non-biometric device. FIGS. 8A, 8B and 9 involve the user being tested on a biometric device. Referring again to FIGS. 8A, 8B and 9, when a user gets tested on a biometric device, the result returned includes both a score and whether the user passed or failed the biometric device. As with biometric devices, when the user is tested on a non-biometric device, the result includes whether the user passed or failed the non-biometric device. This result can be modified to also include a score. Thus, in step 3306, the user is tested on the first element (i.e., either a biometric or a non-biometric device) and the result indicates whether the user passed or failed the first element (i.e., the device) and a first score.

Alternatively, in step 3304, if the first element is a biometric policy, then control transfers to step 3308. In step 3308, the first element (i.e., the biometric policy) is executed and the result indicates whether the user passed or failed the first element (i.e., the biometric policy) and a first composite threshold value. Whether the first element is a biometric policy or a device, control transfers to step 3310.

In step 3310, if the user passes the first element, then control transfers to step 3312. In step 3312, the user has passed the CONTINGENT policy and the flowchart in FIG. 33 ends. At this point the user has been authenticated by biometric system 102 (FIG. 1). Alternatively, if in step 3310 the user fails the first element, then control transfers to step 3314. In step 3314, it is determined whether the first composite threshold value or the first score was returned and it is set equal to temp score.

In step 3316, it is determined whether temp score is less than the contingent threshold value. If the temp score is less than the contingent threshold value, then control transfers to step 3318. In step 3318, the user has failed the CONTINGENT policy and the flowchart in FIG. 33 ends. At this point the user has not been authenticated by biometric system 102 (FIG. 1). Alternatively, if in step 3316 it is determined that temp score is greater than or equal to the contingent threshold value, then control transfers to step 3320.

In step 3320, it is determined whether the contingent element is a biometric policy. If the contingent element is not a biometric policy, then control transfers to step 3322. In step 3322, the contingent element is either a biometric or a non-biometric device. Thus, in step 3322, the user is tested on the contingent element (i.e., either a biometric or anonbiometric device) and the result indicates whether the user passed or failed the contingent element.

Alternatively, in step 3320, if the contingent element is a biometric policy, then control transfers to step 3324. In step 3324, the contingent element (i.e., the biometric policy) is executed and the result indicates whether the user passed or failed the contingent element. Whether the contingent element is a biometric policy or a device, controls transfers to step 3326.

In step 3326, if the user passes the contingent element, then control transfers to step 3328. In step 3328, the user has passed the CONTINGENT policy and the flowchart in FIG. 33 ends. At this point the user has been authenticated by biometric system 102. Alternatively, if in step 3326 the user fails the first element, then control transfers to step 3330. In step 3330, the user has failed the CONTINGENT policy and the flowchart in FIG. 33 ends. At this point the user has not been authenticated by biometric system 102.

e. THRESHOLD Polky Having a List of Policies or Devices

As discussed above each biometric policy returns a pass/fail result. In addition, the biometric policy can also provide one or more threshold values relating to the biometric devices in the list of devices associated with the biometric policy. In other words, each biometric policy returns a composite threshold value that is generated from one or more of the threshold values generated by the biometric devices. The composite threshold values are returned regardless of whether the biometric policy was passed or failed by the user. These composite threshold values can then be used by a THRESHOLD policy having a list of biometric policies. This feature provides the administrator with flexibility to adjust the level of authentication.

Figure 34A:
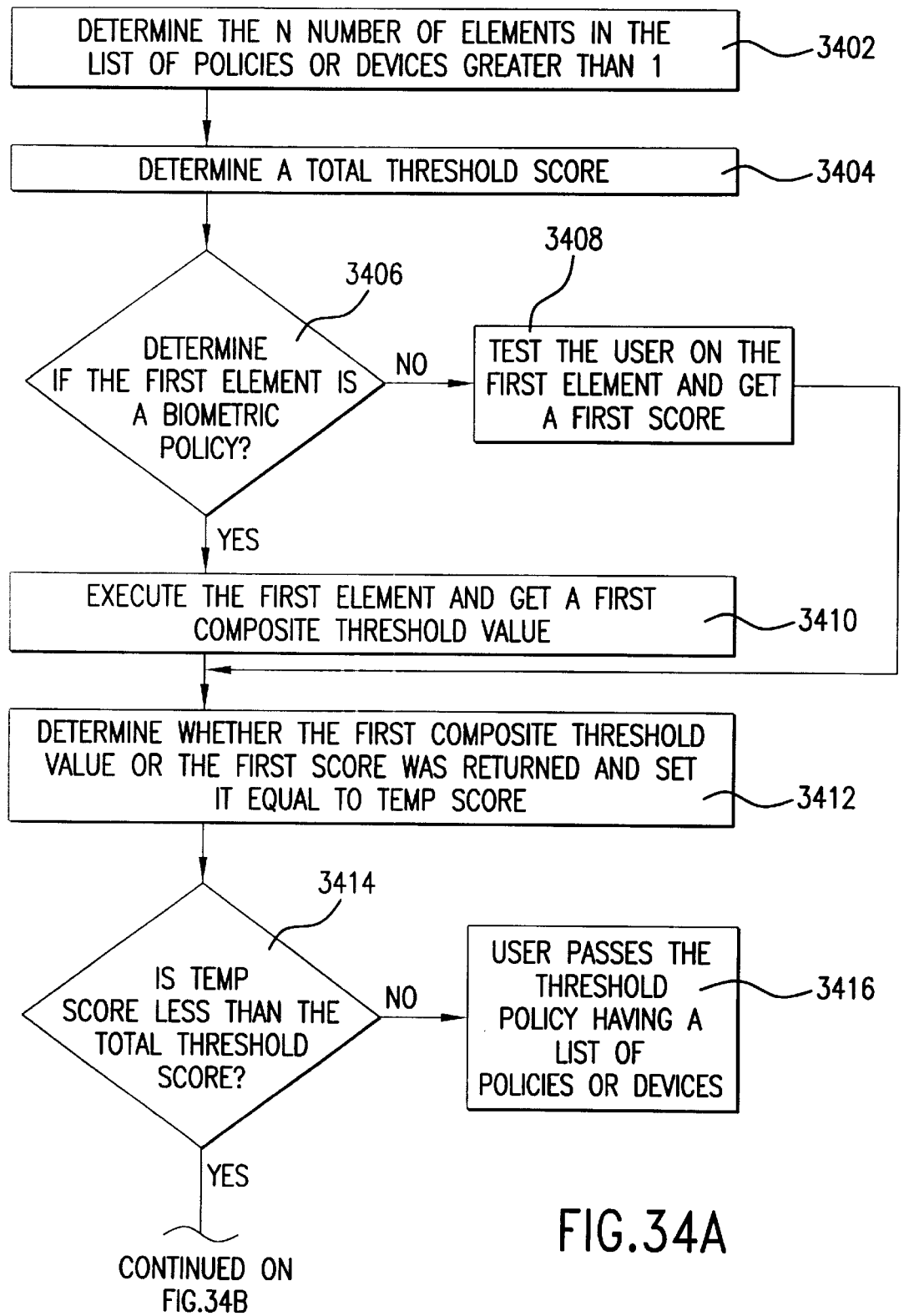
FIG. 34 is a flowchart illustrating the steps involved in executing a THRESHOLD policy having a list of policies or devices of the present invention.
Figure 34B:
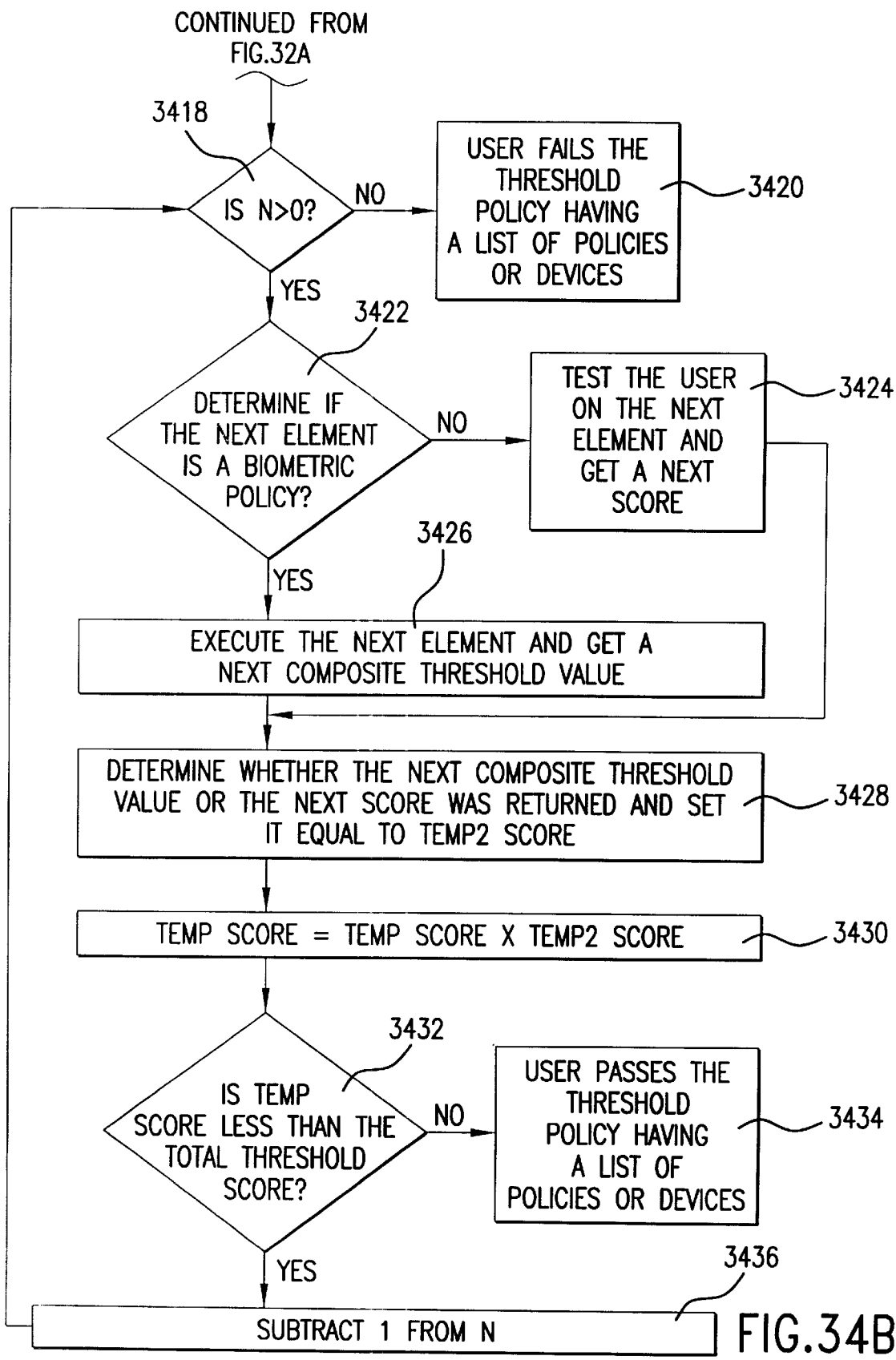

The user passes a THRESHOLD policy having a list of policies or devices of the present invention if the user exceeds a total threshold (i.e., total threshold score) while being tested on one or more elements in the list of policies or devices. FIG. 34 is a flowchart illustrating the steps involved in executing a THRESHOLD policy having a policy list of policies or devices of the present invention. In step 3402, the n number of elements in the list of policies or devices greater than one is determined. An element can be one of the biometric polices described herein, a biometric device or a non-biometric device. This type of THRESHOLD policy will have one or more elements in its list of polices or devices. In step 3404, a total threshold score is determined. In step 3406, it is determined whether the first element in the list of policies or devices is a biometric policy. If the first element is not a biometric policy, then control transfers to step 3408.

In step 3408, the first element is either a biometric or a non-biometric device. Instep 3408, the user is tested on the first element (i.e., either a biometric or a non-biometric device) and the result indicates whether the user passed or failed the first element (i.e., the device) and a first score.

Alternatively, in step 3406, if the first element is a biometric policy, then control transfers to step 3410. In step 3410, the first element (i.e., the biometric policy) is executed and the result indicates whether the user passed or failed the first element (i.e., the biometric policy) and a first composite threshold value. Whether the first element is a biometric policy or a device, control transfers to step 3412.

In step 3412, it is determined whether the first composite threshold value or the first score was returned and it is set equal to temp score. In step 3414, if temp score is less than the total threshold score, then control transfers to step 3416. In step 3416, the user has passed the THRESHOLD policy and the flowchart in FIG. 34 ends. At this point the user has been authenticated by biometric system 102 (FIG. 1). Alternatively, if in step 3414 the temp score is greater than or equal to the total threshold score, then control transfers to step 3418.

In step 3418, if n is not greater than zero, then control transfers to step 3420. If control transfers to step 3420 it means that the list of policies or devices has only one element. In step 3420, the user has failed the THRESHOLD policy and the flowchart in FIG. 34 ends. At this point the user has not been authenticated by biometric system 102. Alternatively, if in step 3418 n is greater than zero, then control transfers to step 3422. In this situation the list of policies or devices has more than one element in it.

In step 3422, it is determined whether the next element in the list of policies or devices is a biometric policy. If the next element is not a biometric policy, then control transfers to step 3424. In step 3424, the next element is either a biometric or a non-biometric device. The user is tested on the next element and the result indicates whether the user passed or failed the next element (i.e, the device) and a next score.

Alternatively, in step 3422, if the next element is a biometric policy, then control transfer to step 3426. In step 3426, the next element is executed to determine whether the user passes or fails the next element (i.e., the biometric policy) and to get a next composite threshold value. In step 3428, it is determined whether the next composite threshold value or the next score was returned and it is set equal to temp2 score. In step 3430, temp score is multiplied temp2 score and the product is stored back in temp score.

In step 3432, if temp score is less than the total threshold score, then control transfers to step 3434. In step 3434, the user has passed the THRESHOLD policy and the flowchart in FIG. 34 ends. At this point the user has been authenticated by biometric system 102. Alternatively, if in step 3432 the temp score is greater than the total threshold value, then control transfers to step 3436.

In step 3436, one is subtracted from n and control returns to step 3418. In step 3418, if n is not greater than zero then all the elements in the list of biometric policies have been executed. Here, control transfers to step 3420. In step 3420, the user has failed the THRESHOLD policy and the flowchart in FIG. 34 ends. At this point the user has not been authenticated by biometric system 102. Alternatively, if in step 3418 n is greater than zero, this means there are still more elements in the list of policies or devices that have not been executed. The flowchart in FIG. 34 continues until all the elements in the list of policies or devices have been executed or temp score is greater than or equal to the total threshold score.

8. Multi-User Biometric Policy

As described above, biometric groups 506 (FIG. 5) are a logical way of combining users that need access to the same set of resources. Some biometric groups 506 are important enough that the biometric policies 504 attached to them require one or more users to be authenticated by biometric system 102 (FIG. 1) to pass the biometric policy 504. This type of biometric policy 504 is called a multi-user biometric policy. The multi-user biometric policy has a list of users. Examples of where the multi-user biometric policy is useful are described next.

The first example involves the various duties that exist within biometric system 102. These duties can be delegated between different positions within biometric system 102. The different positions may include an administrator, a biometric policy manager, a device hardware and software manage and an enrollment manager. Each position must be given the proper authority within biometric system 102 to be able to perform the duties required of that particular position. One way that the proper authority can be given is to create a biometric group 506 for each of the positions. It is very important that only authorized users get put in these biometric groups 506. If an unauthorized user gets put in one or more of these biometric groups 506, then the security of biometric system 102 is compromised. The multi-user biometric policy of the present invention provides the flexibility required for biometric system 102 to ensure that only authorized users get put into one of these biometric groups 506.

The second example involves resources (e.g., computers, applications, data, etc.) within network system 202 (FIG. 2) that need to be protected with the highest security. This type of situation also occurs in non-networked environments. Historically, a bank protects its vault by requiring at least two people to know different parts of the combination in order to open the vault. The multi-user biometric policy of the present invention provides the flexibility required for both networked and non-networked environments in the protection of the types of resources that require the highest security. This is accomplished by defining the required biometric groups 506 and then attaching a multi-user biometric policy to them.

As described above, the multi-user biometric policy has a list of users. Each user in the list of users is represented by the unique user ID 510 that was assigned to that user when he or she enrolled in biometric system 102. The multi-user biometric policy can be implemented as any one of the biometric policies 504 described herein. When biometric server 104 executes the multi-user biometric policy, biometric server 104 first must determine which user IDs 510 are in the list of users. For each user ID 510, biometric server 104 must then determine the biometric policy 504 that particular user must pass in order to be authenticated by biometric system 102. Since the multi-user biometric policy has a list of users, more than one user may have to be authenticated prior to any one user being authenticated by biometric system 102.

An example of how a multi-user biometric policy may be used to protect merger information that no user may gain access to without the president of the enterprise first authorizing it is as follows. The biometric policy 504 attached to the merger information can be defined as an AND multi-user biometric policy with the enterprise president's user ID 510 in the list of users. Here, only users who are also in the list of users may even attempt to gain access to the merger information. No user, even if that user is authenticated by biometric system 102, will gain access to the merger information unless the president also is authenticated by biometric system 102.

All of the above described biometric policies 504 of the present invention provides the flexibility to apply the appropriate level of protection to each network resource without decreasing network productivity. As discussed above, it is the biometric policies 504 that determines the method or way in which a user is to be authenticated by biometric server 104. Although impossible to describe every possible logical variation of biometric policies 504, it should be obvious to one skilled in the art that the logical variations are limitless.

F. Biometric System Security Infrastructure

In general, system security refers to techniques for ensuring that both data stored in a computer and data transported within a system cannot be read or compromised. Inventors of the present invention recognized the importance of securing data within biometric system 102 (FIG. 1). They also recognized the importance of biometric system 102 to integrate easily into existing enterprise security infrastructures.

For example, many network systems today incorporate a firewall. As described above, a firewall is a system designed to prevent unauthorized access and transfer to or from a network. Firewalls can be implemented in both hardware and software, or a combination of both. Firewalls are frequently used to prevent unauthorized Internet users from accessing private networks connected to the Internet, especially intranets. All data entering or leaving the intranet pass through the firewall, which examines each transmission and blocks those that do not meet the specified security criteria. A firewall is considered a first line of defense in protecting private information. A second line of defense is data encryption. Because many enterprise networks today incorporate one or more firewalls to protect their data, the present invention has been designed in such a way that it integrates easily with existing firewalls.

For greater security, data can be encrypted. Data encryption is the translation of data into a form that is unintelligible without a deciphering mechanism. Encryption is one of the most effective ways to achieve data security. To read an encrypted file, you must have access to a secret key or password that enables you to decrypt it. Unencrypted data is called plain text and encrypted data is referred to as cipher text. There are two main types of encryption: asymmetric key encryption (also called public-key encryption) and symmetric key encryption. As discussed below, the present invention uses encryption to protect data within biometric system 102.

The inventors of the present invention recognized that there are three main areas in network system 202 (FIG. 2) where the security of data must be maintained. These include persistent data stored in biometric server 104 (FIG. 1), data transported across network 114 (FIG. 1) and biometric device software stored in network system 202.

1. Persistent Data Stored in Biometric Server

FIG. 5 illustrates the various collections of persistent data that are stored in biometric server 104 (FIG. 1). Biometric server 104 stores collections of biometric templates 502, biometric policies 504, biometric groups 506, biometric device IDs 508, user IDs 510, computer IDs 512 and application IDs 514. Of these collections of data, biometric templates 502 are especially important to secure. Each biometric template 502 stores a user's unique biometric measurement that is used to match against the user's "live" biometric measurement when the biometric device is attempting to identify the user. Accordingly, the present invention utilizes well-known encryption techniques to protect data stored in biometric server 104.

2. Data Transported Across the Network System

All data within biometric system 102 and all data that gets transported to and from biometric system 102, via network 114, must be secure. As mentioned above, biometric templates 502 are especially important to secure because they store user biometric data. As described in reference to the flowchart of FIGS. 8A and 8B above, a preferred process of authenticating a user by biometric system 102 shows biometric template 502 being matched on the client side (i.e., at computer 208 from FIG. 2). In order for biometric template 502 to be matched on the client side, biometric template 502 must be transported over network 114 from biometric server 104 to computer 208. To further ensure the security of biometric templates 502, the present invention transports biometric templates 502 in an encrypted format over network 114 at all times using session keys.

3. Biometric System Software

A limitation with all networks is the impossibility for an administrator to know if an unauthorized person is tampering with software loaded on a computer located at a different location from the administrator within the enterprise. Although it is important for a resource protection administrator to be alarmed when biometric system software has been tampered with, it is equally important for the network administrator to be alarmed when other types of software have been tampered with on computers in the network. Therefore, the inventors of the present invention recognized that what is needed is a way of alarming an administrator of a networked system when software has been tampered with on computers in the network.

To protect biometric system software, the present invention incorporates a software integrity object located at each location in network system 202 (e.g., computer 208, enrollment station 106, remote/web computer 210, satellite enrollment station 112, etc.) that biometric devices are attached to.

The software integrity object of the present invention is always active and its job is to repeatedly check to ensure all biometric system software (i.e., a data file) loaded at the same location as the software integrity object has not been tampered with. This can be done in many ways. One way is for the software integrity object to calculate, for each biometric system software file, a file date, a file size and a byte-wise sum of the file. Also utilized is a mask value and a starting mask value. The software integrity object then executes the following equation (or a similar equation/formula for assuring software integrity):

$$\sum_{i=0}^{Number\ of\ Files} \left[ (File\ Date)_i + (File\ Size)_i + \left( \sum_{j=0}^{File\ Size} (File\ Byte)_j \right)_i + Item\ Mask \right] + Starting\ Mask$$

This equation is first executed when the file that is to be protected is first loaded at a location. The first outcome of the equation is stored in a secured environment. The same equation is then repeatedly calculated with the same software. The outcome is then compared to the first outcome stored in the secured environment. If the two do not match, the software integrity object realizes the file containing the software may have been tampered with and sends an alarm to the administrator. The software integrity object is not limited to protecting biometric system software. The software integrity object can be used to protect all software (e.g., files) in network system 202 (FIG. 2).

G. Biometric Devices and Mobility within a Networked Environment

The inventors of the present invention recognized a limitation that is encountered when biometric devices are used in a networked environment without biometric system 102 (FIG. 1). As discussed above, for a biometric device to authenticate a user it must have access to the user's biometric template. The present invention provides a scheme for easy access to all user biometric templates 502 such that a user can access network system 202 from any location (e.g., computer 208, enrollment station 106, remote/web computer 210, satellite enrollment station 112, etc.). The scheme involves storing all biometric templates 502 in a central location. The central location is biometric server 104 (FIG. 1) as described above. Now, via network 114, a user can access his or her biometric template 502 from any location in network system 202. Also, each location in network system 202 knows precisely where to go to locate all biometric templates 502.

Storing all biometric templates 502 in one central location is efficient when network 114 is a LAN. Efficiency problems may arise when network 114 is a WAN. As described above, a WAN connects computers that are farther apart and are connected by data transmission lines or radio waves (e.g., in multiple offices and distant geographies). For example, if an enterprise has multiple offices around the country and all users are accessing one biometric server 104 to gain access to biometric templates 502 for authentication, this is likely to slow down authentication to enterprise resources. To avoid the efficiency problems that will occur if all biometric templates 502 were stored in one biometric server 104, multiple biometric systems 102 can be placed in various locations in network system 202. But here again the problem of a location (e.g., computer 208, enrollment station 106, remote/web computer 210, satellite enrollment station 112, etc.) in network system 202 not knowing precisely where to go to locate needed biometric templates 502 reoccurs.

The inventors of the present invention solved this problem by two different methods. The first method involves the storing of biometric templates 502 within network system 202 in a hierarchical structure. The second method involves the accessing of a hierarchical directory to locate biometric templates 502 within network system 202.

1. Hierarchical Storage of Biometric Templates

Figure 28:
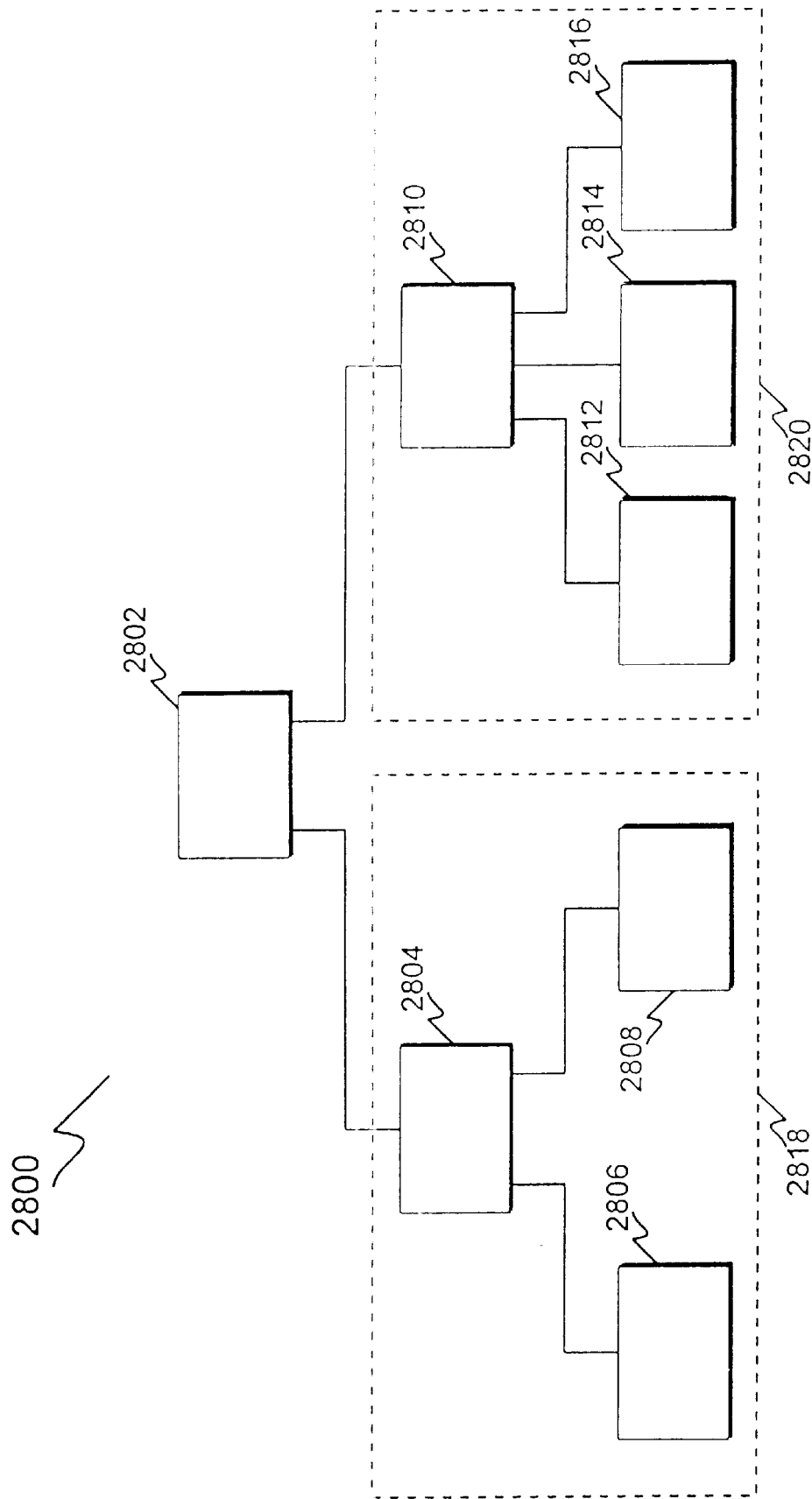
FIG. 28 illustrates an enterprise connected by a WAN incorporating multiple biometric systems of the present invention.

FIG. 28 illustrates an enterprise 2800 connected by a WAN incorporating multiple biometric systems 102. Each square in FIG. 28 represents a different office (i.e., location) in enterprise 2800. Each office (i.e., square) has its own LAN and its own biometric system 102. The offices in enterprise 2800 are connected by a WAN.

FIG. 28 shows enterprise 2800 logically organized in a hierarchical structure. Office 2802 is the corporate office and is located at the top of the hierarchical structure. Block 2818 and block 2820 represent logical grouping of offices within enterprise 2800. As shown in FIG. 28, block 2818 includes office 2804, office 2806 and office 2808. Block 2820 includes office 2810, office 2812, office 2814 and office 2816.

The means for determining the logical groupings of offices can involve a number of factors. Several factors can include offices frequently traveled between, grouping offices that do not employ an administrator with offices that do, the adequacy of the WAN connections between various offices, etc.

Because each office has its own biometric system 102, this presents a question of how individual users can avoid having to register at each biometric system 102 and still travel anywhere in enterprise 2800 and be authenticated. One solution is to have a backup copy of all user biometric templates 502 in enterprise 2800 stored in the biometric server at each office. This solution is undesirable for several reasons. As explained in reference to FIG. 1, alternate biometric server 110 is a backup server to biometric server 104 and stores the exact same data. Therefore, it is likely to be expensive to maintain a complete copy of all biometric templates 502 in enterprise 2800 in both biometric server 104 and alternate biometric server 110 at each office. Another reason why this solution is undesirable is the management of various copies of the same biometric template 502 at various locations. When a user refreshes a biometric template 502 (as discussed above) each copy of the old biometric template 502 in enterprise 2800 must be replaced. This increases the possibility that the same biometric template 502 may have different versions in enterprise 2800.

The inventors of the present invention came up with a scheme for hierarchically storing biometric templates within enterprise 2800. In enterprise 2800, all biometric templates 502 are stored at corporate office 2802. Then the additional storage of biometric templates 502 at individual offices depends on the logical block (e.g. either block 2818 or block 2820) the office is in.

The procedure is as follows. First, each office in enterprise 2800 stores the biometric templates 502 for every user enrolled in biometric system 102 at that office. Then, in each logical block, start with the offices at the bottom of the hierarchical structure. For example, in block 2818 start with office 2806 and office 2808. Office 2806 and office 2808 only store the biometric templates 502 for users that were enrolled in biometric systems 102 at those offices. Then, following the hierarchical structure up to office 2804, office 2804 stores the biometric templates 502 for users that were enrolled at office 2804, and also copies of all the biometric templates 502 stored at office 2806 and office 2808. This procedure is repeated until the top of the hierarchical structure is reached (i.e., corporate office 2802).

Thus, with the above hierarchical structure, the farthest any office will have to go to get a user's biometric template is corporate office 2802. For example, say User A was enrolled at office 2812. This means that User A's biometric templates 502 are stored at office 2812, office 2810 and corporate office 2802. If User A travels to office 2806, office 2806 will have to follow the hierarchical structure up to corporate office 2802 to retrieve a copy of User A's biometric templates 502. This scheme allows the biometric templates 502 within enterprise 2800 to be stored at the minimum number of locations, while still providing each user the flexibility to be authenticated by biometric system 102 from any office within the enterprise.

Not only does the hierarchical structure of enterprise 2800 provide ease of access, but also a means of backing up biometric templates 502 within enterprise 2800.

2. Hierarchical Directory for Locating Biometric Templates

The second method involves the accessing of a hierarchical directory to locate biometric templates 502 within enterprise 2800 (FIG. 28). As described above, one example of a hierarchical directory is a X.500 directory. X.500 directories are hierarchical with different levels for each category of information, such as country, state, and city. Therefore, the same scheme as discussed above for storing biometric templates 502 can be used for storing a X.500 directory. The X.500 directory will include pointers to the offices that user biometric templates 502 are stored.

H. Other Applications

A computer, as described in reference to FIG. 3, is more than the typical desktop computer. For example, both cars and ATM machines incorporate computers, home and office physical security systems incorporate computers, etc. Thus, the present invention is not limited to the protection of resources in a networked environment as described above. Following are just some of the various applications where the present invention can be applied.

1. Digital Certificates

The inventors of the present invention recognized a limitation that is encountered when digital certificates are used in a networked environment without biometric system 102 (FIG. 1). Generally, a digital certificate defines user privileges. More specifically, a digital certificate attaches to an electronic message and is used for security purposes. The most common use of a digital certificate is to verify that a user sending a message is who he or she claims to be, and to provide the receiver with the means to encode a reply.

An individual wishing to send an encrypted message applies for a digital certificate from a Certificate Authority (CA). The CA issues an encrypted digital certificate containing the applicant's public keys, private keys and a variety of other identification information. The applicant's public key is signed by the CA. The CA makes its own public key readily available through print publicity or perhaps on the Internet.

The recipient of an encrypted message uses the CA's public key to decode the digital certificate attached to the message, verifies it as issued by the CA and then obtains the sender's public key and identification information held within the certificate. With this information, the recipient can send an encrypted reply. Today, a user must pass a password device, or use a token or smart card, or any combination thereof, to gain access to a digital certificate. Because each user's digital certificate is stored on one computer within the network, the digital certificate is bound to a single computer. This limits the user from going to a different computer to gain access to the network.

The inventors of the present invention recognized that a way of adequately authenticating a user prior to gaining access to his or her digital certificate is needed that avoids the weakest link in authentication caused by the human factor, as discussed above. In addition, the inventors of the present invention recognized that a scheme is needed for easy access to all user digital certificates such that a user can gain access to required resources from any location within the enterprise. Thus, the present invention requires a user to be authenticated by biometric devices to gain access to digital certificates avoids the weakest link in authentication caused by the human factor.

The scheme for easy access to all user digital certificates, such that a user can gain access to his or her digital certificate from any location within the enterprise, is the same scheme as described above in reference to FIG. 28 and the storing of biometric templates 502. In enterprise 2800, all digital certificates are stored at corporate office 2802. Then the additional storage of digital certificates at individual offices depends on the logical block (e.g. either block 2818 or block 2820) the office is in.

The procedure is as follows. First, each office in enterprise 2800 stores the digital certificates for every user that was issued a digital certificate at that office. Then, in each logical block, start with the offices at the bottom of the hierarchical structure. For example, in block 2818 start with office 2806 and office 2808. Office 2806 and office 2808 only store the digital certificates for users that were issued digital certificates at those offices. Then, following the hierarchical structure up to office 2804, office 2804 stores the digital certificates for users that were issued digital certificates at office 2804, and also copies of all the digital certificates stored at office 2806 and office 2808. This procedure is repeated until the top of the hierarchical structure is reached (i.e., corporate office 2802).

Thus, with the above hierarchical structure, the farthest any office will have to go to get a user's digital certificate is corporate office 2802. For example, say User A was issued a certificate at office 2812. This means that User A's digital certificate is stored at office 2812, office 2810 and corporate office 2802. If User A travels to office 2806, office 2806 will have to follow the hierarchical structure up to corporate office 2802 to retrieve a copy of User A's digital certificate. Once it is determined that the user is finished with his or her digital certificate, the digital certificate must be re-retrieved the next time the user requests access to his or her digital certificate.

Not only does the hierarchical structure of enterprise 2800 provide ease of access, but also a means of backing up digital certificates within enterprise 2800.

The use of a hierarchical directory to locate biometric templates 502 within enterprise 2800 (FIG. 28) as described above works equally as well for digital certificates. The X.500 directory will include pointers to the offices that user digital certificates are stored.

2. Roaming Profile Server

The concept of using a public key to decode a digital certificate attached to a message was introduced above. Some cryptographic systems use two keys, a public key known to everyone and a private or secret key known only to the recipient of the message. For example, when User A wants to send a secure message to User B, User A uses User B's public key to encrypt the message. User B then uses his or her private key to decrypt the message.

An important element to the public key system is that the public and private keys are related in such a way that only the public key can be used to encrypt messages and only the corresponding private key can be used to decrypt them. Moreover, it is virtually impossible to deduce the private key if you know the public key. But it is imperative to ensure that users' private keys are kept secret. A user's private keys, among other things, are contained in a unique encrypted user profile. Therefore, a user needs to be adequately authenticated prior to allowing the user access to the user's private keys (i.e., decrypt the user's profile).

There exist public key systems that provide a public key infrastructure. One example of such public key systems is Entrust/PKI™. A public key infrastructure is a comprehensive system that provides public key encryption and digital signature services. The purpose of a public key infrastructure is to manage public keys and digital certificates. By managing keys and digital certificates through a public key infrastructure, an enterprise establishes and maintains a trustworthy networking environment. A public key infrastructure enables the use of encryption and digital signature services across a wide variety of applications.

Public key systems must also manage user profiles. Each profile contains a user's private keys. As mentioned above, the authentication of users prior to allowing them access to their profiles is imperative. Public key systems allow for the authentication of users in one of two ways. The first way is through a password device supplied by the public key system itself. As discussed above, a password device is an inadequate identification mechanism because it can not avoid the weakest link in authentication caused by the human factor.

The second way that public key systems allow for the authentication of users is through an identification device interface. The identification device interface allows third-party vendors of identification devices to create an identity device module that interfaces with it. This way third-party vendors provide the authentication of users prior to allowing them access to their profiles within the public key system.

Various third-party vendors of both biometric and non-biometric devices have created identity device modules for their devices to facilitate user authentication within public key systems. The non-biometric devices (e.g, password, smart cards and tokens) are inadequate identification mechanisms because they can not avoid the weakest link in authentication caused by the human factor. Alternatively, biometric devices do conclusively authenticate a user by avoiding the weakest link in authentication caused by the human factor. Although a single biometric device can conclusively authenticate a user, the inventors of the present invention recognized that biometric system 102 (FIG. 1) can be used to provide flexibility and additional security in the authentication of users prior to allowing them access to profiles within the public key system. This flexibility and additional security provided by biometric system 102 is the ability to use multiple biometric devices for the authentication of individual users. In addition, the inventors of the present invention recognized that a scheme is needed for easy access to all profiles such that a user can gain access to the user's profile from any location within the enterprise.

Figure 29:
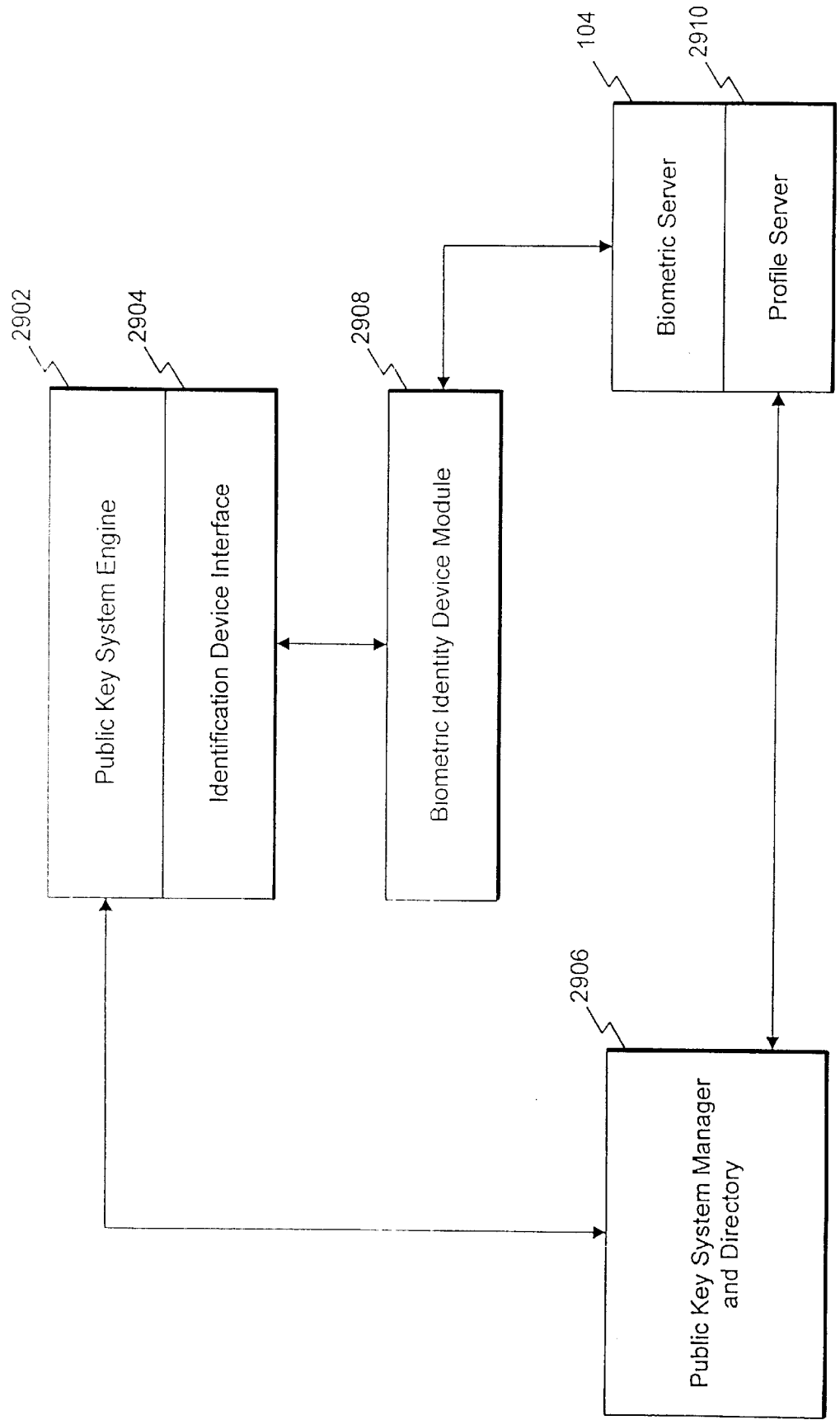
FIG. 29 is a block diagram illustrating how the present invention can be integrated with a public key system.

FIG. 29 is a block diagram illustrating how biometric system 102 of the present invention can be integrated with a public key system. FIG. 29 includes public key system engine 2902, identification device interface 2904, public key system manager and directory 2906, biometric identity device module 2908, biometric server 104 (FIG. 1) and profile server 2910. Public key system engine 2902, identification device interface 2904 and public key system manager and directory 2906 are not part of the present invention. They are part of a generic public key system. Biometric identity device module 2908, biometric server 104 (FIG. 1) and profile server 2910 are part of the present invention.

Public key system engine 2902 performs the various functions of the public key system. Public key system engine 2902 interacts with the various applications (e.g., e-mail, browsers, etc.) that it provides the use of encryption and digital signatures for. Identification device interface 2904 allows third-party vendors of identification devices to create an identity device module that interfaces with it. Biometric identity device module 2908 is one of these identity device modules that interfaces with identification device interface 2904. Biometric identity device module 2908 acts similar to the open interface of the present invention as described above.

Public key system manager and directory 2906 stores and manages public keys. Biometric server 104 operates exactly as described above. Finally, profile server 2910 stores all of the users' profiles in the public key system. Profile server 2910 is attached to biometric server 104 and acts as a roaming profile server for the public key system.

Biometric identity device module 2908 works with identification device interface 2904 to provide the desired profile from profile server 2910. But prior to providing the desired profile, biometric identity device module 2908 and biometric server 104 work together to authenticate the user. All data transported between biometric identity device module 2908 and biometric server 104 is encrypted. This data includes the profiles and biometric templates 502 (FIG. 5).

Incorporating biometric system 102 (FIG. 1) into a public key system helps to avoid the limitations discussed above.

Biometric system 102 provides the flexibility to use the right biometric measurement for the environment in which the user is trying to get access to his or her profile, increase user mobility within the enterprise, remotely enroll and re-enroll users into biometric system 102 and to ensure the integrity of software loaded on remote computers.

3. Phone Authentication and Clearance Verification

Phones can be implemented as a voice recognition device. Thus, biometric system 102 (FIG. 1) can be used to authenticate employees for access to various phones within the enterprise. Biometric system 102 can also be used to apply clearance verification for each employee to make certain calls. For phone authentication and clearance verification, biometric groups 506 (FIG. 5) can be defined in such a way that employees in certain biometric groups 506 are only allowed to make certain types of phone calls (e.g., local calls, long-distance calls, 800 calls, 900 calls, etc.) and/or have access to certain phones within the enterprise.

Incorporating biometric system 102 (FIG. 1) into phone authentication and clearance verification helps to avoid some of the limitations discussed above. Biometric system 102 provides the flexibility to use a phone as a voice recognition device, increase employee mobility within the enterprise, apply the needed degree of authentication required to protect each type of phone call and remotely enroll and re-enroll customers into biometric system 102.

4. Access/Facility Control

Current physical access/facility control systems require the user to enter a password to activate and/or deactivate the system. As described above, biometric devices for identification mechanisms eliminate the weakest link caused by the human factor. Biometric devices can be attached to the entry of each physical location in an enterprise that authentication is required for entry. Then, biometric system 102 (FIG. 1) can be used to provide flexibility in protection and efficient administration as described above.

Biometric groups 506 (FIG. 5) can be defined in such a way that users in certain biometric groups 506 are only allowed access to certain physical locations within an enterprise. One problem that any enterprise has with physical access to locations is that one authenticated person may allow one or more unauthenticated people in the location. Here, a facial image device may be utilized to continuously scan a location to determine if any unauthenticated people are present. If the facial image device determines that an unauthenticated person is present, biometric system 102 can alarm the administrator.

Incorporating biometric system 102 (FIG. 1) into a physical access/facility control system helps to avoid limitations discussed above. Biometric system 102 provides the flexibility to use the right biometric measurement for the environment in which the entry is located, increase user mobility within the enterprise, apply the needed degree of authentication required to protect each type of physical location, remotely enroll and re-enroll users into biometric system 102 and to ensure the integrity of software loaded at remote entries.

5. Banking and Financial

Today, more than ever, adequate authentication mechanisms are needed in the banking and financial industries. Transactions that once required interaction between two people, now are encouraged to be done via ATM machines or automated phone systems. Currently, transactions are approved by a customer entering a correct pin. As the types of human-to-machine transactions increase, so does the number of different pins each user is required to remember. The result is that either customers write their pins down and/or they use the same pin for many different types of transactions. If a pin is written down, this increases the chance that another person will see the pin and use it to gain unauthorized access to transactions.

Incorporating biometric system 102 (FIG. 1) into current banking and financial transaction systems (e.g., ATM machines), avoids all of the limitations discussed above. Biometric system 102 provides the flexibility to use the right biometric measurement for an environment in which the ATM machine is located, increase customer mobility, apply the needed degree of authentication required to protect each transaction, remotely enroll and re-enroll customers into biometric system 102 and to ensure the integrity of software loaded on remote ATM machines.

6. Silent Signal

Silent signal is away of silently signaling for assistance through the use of biometric devices. Silent signal is particularly applicable to access/facility control and the banking and financial industries. This feature of the present invention allows a user to enter a normal (i.e., expected) biometric measurement under normal conditions or an alarm biometric measurement under emergency conditions. One example of silent signal incorporates a fingerprint device. Say a fingerprint device is used for authentication at an ATM machine. Biometric policies 504 (FIG. 5) of biometric system 102 (FIG. 1) can be configured to silently signal police if, for example, the left index finger is used for authentication to the ATM machine during a robbery. Otherwise, the right index finger is used for a normal transaction without the need to signal the police. A similar scenario applies to access/facility control.

Another example of silent signal incorporates a voice recognition device. Here, when a certain phrase is used for authentication to either a physical location or at an ATM machine, the police are silently signaled. In addition, it should be apparent to one skilled in the art that any of the biometric devices mentioned above can be used to implement the silent signal of the present invention.

I. Conclusion

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A method for providing user authentication to enterprise resources, comprising the steps of:

(a) setting up a biometric server including placing the user within a biometric group, wherein said biometric group defines one or more users having a specified characteristic, said biometric server having stored therein at least two biometric policies that each define different authentication levels, each said authentication level defining a probability that the user is authorized to access the enterprise resources;

(b) assigning one of said biometric policies to the user;

(c) determining whether the user is authenticated by executing said assigned biometric policy; and (d) indicating that the user may access the enterprise resources if the user passes said assigned biometric policy, otherwise indicating that the user may not access the enterprise resources, wherein said assigned biometric policy is an OR policy having a list of devices, wherein said list of devices includes at least two different biometric devices, and wherein the user passes said OR policy if the user passes one of said biometric devices in said list of devices.

2. A method for providing user authentication to enterprise resources, comprising the steps of:

(a) setting up a biometric server including placing the user within a biometric group, wherein said biometric group defines one or more users having a specified characteristic, said biometric server having stored therein at least two biometric policies that each define different authentication levels, each said authentication level defining a probability that the user is authorized to access the enterprise resources;

(b) assigning one of said biometric policies to the user;

(c) determining whether the user is authenticated by executing said assigned biometric policy; and (d) indicating that the user may access the enterprise resources if the user passes said assigned biometric policy, otherwise indicating that the user may not access the enterprise resources, wherein said assigned biometric policy is an OR policy having a list of devices, wherein said list of devices includes only one biometric device, and wherein the user passes said OR policy if the user passes said biometric device while being tested with at least two biometric measurements.

3. A method for proving user authentication to enterprise resources, comprising the steps of:

(a) setting up a biometric server including placing the user within a biometric group, wherein said biometric group defines one or more users having a specified characteristic, said biometric server having stored therein at least two biometric policies that each define different authentication levels, each said authentication level defining a probability that the user is authorized to access the enterprise resources;

(b) assigning one of said biometric policies to the user;

(c) determining whether the user is authenticated by executing said assigned biometric policy; and (d) indicating that the user may access the enterprise resources if the user passes said assigned biometric policy, otherwise indicating that the user may not access the enterprise resources, wherein said assigned biometric policy is an AND policy having a list of devices, wherein said list of devices includes at least two different biometric devices, and wherein the user passes said AND policy if the user passes all of said biometric devices in said list of devices.

4. A method for providing user authentication to enterprise resources, comprising the steps of:

(a) setting up a biometric server including placing the user within a biometric group, wherein said biometric group defines one or more users having a specified characteristic, said biometric server having stored therein at least two biometric policies that each define different authentication levels, each said authentication level defining a probability that the user is authorized to access the enterprise resources;

(b) assigning one of said biometric policies to the user;

(c) determining whether the user is authenticated by executing said assigned biometric policy; and (d) indicating that the user may access the enterprise resources if the user passes said assigned biometric policy, otherwise indicating that the user may not access the enterprise resources, wherein said assigned biometric policy is an AND policy having a list of devices, wherein said list of devices includes only one biometric device, and wherein the user passes said AND policy if the user passes said biometric device while being tested with at least two biometric measurements.

5. A method for providing user authentication to enterprise resources, comprising the steps of:

(a) setting up a biometric server including placing the user within a biometric group, wherein said biometric group defines one or more users having a specified characteristic, said biometric server having stored therein at least two biometric policies that each define different authentication levels, each said authentication level defining a probability that the user is authorized to access the enterprise resources;

(b) assigning one of said biometric policies to the user;

(c) determining whether the user is authenticated by executing said assigned biometric policy; and (d) indicating that the user may access the enterprise resources if the user passes said assigned biometric policy, otherwise indicating that the user may not access the enterprise resources, wherein said assigned biometric policy is a CONTINGENT policy having a list of devices, wherein said list of devices includes at least two different biometric devices, and wherein the user passes said CONTINGENT policy if either the user exceeds a minimum threshold associated with a first biometric device or if the user exceeds a contingent threshold associated with said first biometric device and the user exceeds a minimum threshold associated with a second biometric device.

6. A method for providing user authentication to enterprise resources, comprising the steps of:

(a) setting up a biometric server including placing the user within a biometric group, wherein said biometric group defines one or more users having a specified characteristic, said biometric server having stored therein at least two biometric policies that each define different authentication levels, each said authentication level defining a probability that the user is authorized to access the enterprise resources;

(b) assigning one of said biometric policies to the user;

(c) determining whether the user is authenticated by executing said assigned biometric policy; and (d) indicating that the user may access the enterprise resources if the user passes said assigned biometric policy, otherwise indicating that the user may not access the enterprise resources, wherein said assigned biometric policy is a CONTINGENT policy having a list of devices, wherein said list of devices includes only one biometric device, wherein a first biometric measurement and a second biometric measurement are associated with said biometric device, and wherein the user passes said CONTINGENT policy if either the user exceeds a minimum threshold associated with said biometric device and said first biometric measurement or if the user exceeds a contingent threshold associated with said biometric device and said first biometric measurement and the user exceeds a minimum threshold associated with said biometric device and said second biometric measurement.

7. A method for providing user authentication to enterprise resources, comprising the steps of:
   (a) setting up a biometric server including placing the user within a biometric group, wherein said biometric group defines one or more users having a specified characteristic, said biometric server having stored therein at least two biometric policies that each define different authentication levels, each said authentication level defining a probability that the user is authorized to access the enterprise resources;
   (b) assigning one of said biometric policies to the user;
   (c) determining whether the user is authenticated by executing said assigned biometric policy; and
   (d) indicating that the user may access the enterprise resources if the user passes said assigned biometric policy, otherwise indicating that the user may not access the enterprise resources, wherein said assigned biometric policy is a RANDOM policy having a list of devices, wherein said list of devices includes at least two different biometric devices, wherein a random biometric device is determined from said list of devices, and wherein the user passes said RANDOM policy if the user passes said random biometric device.

8. A method for providing user authentication to enterprise resources, comprising the steps of:
   (a) setting up a biometric server including placing the user within a biometric group, wherein said biometric group defines one or more users having a specified characteristic, said biometric server having stored therein at least two biometric policies that each define different authentication levels, each said authentication level defining a probability that the user is authorized to access the enterprise resources;
   (b) assigning one of said biometric policies to the user;
   (c) determining whether the user is authenticated by executing said assigned biometric policy; and
   (d) indicating that the user may access the enterprise resources if the user passes said assigned biometric policy, otherwise indicating that the user may not access the enterprise resources, wherein said assigned biometric policy is a RANDOM policy having a list of devices, wherein said list of devices includes only one biometric device, wherein a random biometric measurement is determined from one or more biometric measurements, and wherein the user passes said RANDOM policy if the user passes said biometric device while being tested with said random biometric measurement.

9. A method for providing user authentication to enterprise resources, comprising the steps of:
   (a) setting up a biometric server including placing the user within a biometric group, wherein said biometric group defines one or more users having a specified characteristic, said biometric server having stored therein at least two biometric policies that each define different authentication levels, each said authentication level defining a probability that the user is authorized to access the enterprise resources;
   (b) assigning one of said biometric policies to the user;
   (c) determining whether the user is authenticated by executing said assigned biometric policy; and
   (d) indicating that the user may access the enterprise resources if the user passes said assigned biometric policy, otherwise indicating that the user may not access the enterprise resources, wherein said assigned biometric policy is a THRESHOLD policy having a list of devices, wherein said list of devices includes at least two different biometric devices, and wherein the user passes said THRESHOLD policy if the user exceeds a total threshold while being tested on one or more of said biometric devices in said list of devices.

10. A method for providing user authentication to enterprise resources, comprising the steps of:
    (a) setting up a biometric server including placing the user within a biometric group, wherein said biometric group defines one or more users having a specified characteristic, said biometric server having stored therein at least two biometric policies that each define different authentication levels, each said authentication level defining a probability that the user is authorized to access the enterprise resources;
    (b) assigning one of said biometric policies to the user;
    (c) determining whether the user is authenticated by executing said assigned biometric policy; and
    (d) indicating that the user may access the enterprise resources if the user passes said assigned biometric policy, otherwise indicating that the user may not access the enterprise resources, wherein said assigned biometric policy is a THRESHOLD policy having a list of devices, wherein said list of devices includes only one biometric device, and wherein the user passes said THRESHOLD policy if the user exceeds a total threshold while being tested with one or more biometric measurements on said biometric device in said list of devices.

11. A method for providing user authentication to enterprise resources, comprising the steps of:
    (a) setting up a biometric server including placing the user within a biometric group, wherein said biometric group defines one or more users having a specified characteristic, said biometric server having stored therein at least two biometric policies that each define different authentication levels, each said authentication level defining a probability that the user is authorized to access the enterprise resources;
    (b) assigning one of said biometric policies to the user;
    (c) determining whether the user is authenticated by executing said assigned biometric policy; and
    (d) indicating that the user may access the enterprise resources if the user passes said assigned biometric policy, otherwise indicating that the user may not access the enterprise resources, wherein said assigned biometric policy is an OR policy having a list of biometric policies, wherein said list of biometric policies includes at least two biometric policies, and wherein the user passes said OR policy if the user passes one of said biometric policies in said list of biometric policies.

12. A method for providing user authentication to enterprise resources, comprising the steps of:
    (a) setting up a biometric server including placing the user within a biometric group, wherein said biometric group defines one or more users having a specified characteristic, said biometric server having stored therein at least two biometric policies that each define different authentication levels, each said authentication level defining a probability that the user is authorized to access the enterprise resources;
    (b) assigning one of said biometric policies to the user;
    (c) determining whether the user is authenticated by executing said assigned biometric policy; and (d) indicating that the user may access the enterprise resources if the user passes said assigned biometric policy, otherwise indicating that the user may not access the enterprise resources, wherein said assigned biometric policy is an AND policy having a list of biometric policies, wherein said list of biometric policies includes at least two biometric policies, and wherein the user passes said AND policy if the user passes all of said biometric policies in said list of biometric policies.

13. A method for providing user authentication to enterprise resources, comprising the steps of:
   (a) setting up a biometric server including placing the user within a biometric group, wherein said biometric group defines one or more users having a specified characteristic, said biometric server having stored therein at least two biometric policies that each define different authentication levels, each said authentication level defining a probability that the user is authorized to access the enterprise resources;
   (b) assigning one of said biometric policies to the user;
   (c) determining whether the user is authenticated by executing said assigned biometric policy; and
   (d) indicating that the user may access the enterprise resources if the user passes said assigned biometric policy, otherwise indicating that the user may not access the enterprise resources, wherein said assigned biometric policy is a CONTINGENT policy having a list of biometric policies, wherein said list of biometric policies includes at least two biometric policies, and wherein the user passes said CONTINGENT policy if either the user exceeds a minimum threshold associated with a first biometric policy or if the user exceeds a contingent threshold associated with said first biometric policy and the user exceeds a minimum threshold associated with a second biometric policy.

14. A method for providing user authentication to enterprise resources, comprising the steps of:
   (a) setting up a biometric server including placing the user within a biometric group, wherein said biometric group defines one or more users having a specified characteristic, said biometric server having stored therein at least two biometric policies that each define different authentication levels, each said authentication level defining a probability that the user is authorized to access the enterprise resources;
   (b) assigning one of said biometric policies to the user;
   (c) determining whether the user is authenticated by executing said assigned biometric policy; and
   (d) indicating that the user may access the enterprise resources if the user passes said assigned biometric policy, otherwise indicating that the user may not access the enterprise resources, wherein said assigned biometric policy is a RANDOM policy having a list of biometric policies, wherein said list of biometric policies includes at least two biometric policies, wherein a random biometric policy is determined from said list of biometric policies, and wherein the user passes said RANDOM policy if the user passes said random biometric policy.

15. A method for providing user authentication to enterprise resources, comprising the steps of:
   (a) setting up a biometric server including placing the user within a biometric group, wherein said biometric group defines one or more users having a specified characteristic, said biometric server having stored therein at least two biometric policies that each define different authentication levels, each said authentication level defining a probability that the user is authorized to access the enterprise resources;
   (b) assigning one of said biometric policies to the user;
   (c) determining whether the user is authenticated by executing said assigned biometric policy; and
   (d) indicating that the user may access the enterprise resources if the user passes said assigned biometric policy, otherwise indicating that the user may not access the enterprise resources, wherein said assigned biometric policy is a THRESHOLD policy having a list of biometric policies, wherein said list of biometric policies includes at least two biometric policies, and wherein the user passes said THRESHOLD policy if the user exceeds a total threshold while being tested on one or more of said biometric policies in said list of biometric policies.

16. A method for providing user authentication to enterprise resources, comprising the steps of:
   (a) setting up a biometric server including placing the user within a biometric group, wherein said biometric group defines one or more users having a specified characteristic, said biometric server having stored therein at least two biometric policies that each define different authentication levels, each said authentication level defining a probability that the user is authorized to access the enterprise resources;
   (b) assigning one of said biometric policies to the user;
   (c) determining whether the user is authenticated by executing said assigned biometric policy; and
   (d) indicating that the user may access the enterprise resources if the user passes said assigned biometric policy, otherwise indicating that the user may not access the enterprise resources, wherein said assigned biometric policy is an OR policy having a list of policies or devices, wherein said list of policies or devices includes at least two elements, and wherein the user passes said OR policy if the user passes one of said elements in said list of policies or devices.

17. A method for providing user authentication to enterprise resources, comprising the steps of:
   (a) setting up a biometric server including placing the user within a biometric group, wherein said biometric group defines one or more users having a specified characteristic, said biometric server having stored therein at least two biometric policies that each define different authentication levels, each said authentication level defining a probability that the user is authorized to access the enterprise resources;
   (b) assigning one of said biometric policies to the user;
   (c) determining whether the user is authenticated by executing said assigned biometric policy; and
   (d) indicating that the user may access the enterprise resources if the user passes said assigned biometric policy, otherwise indicating that the user may not access the enterprise resources, wherein said assigned biometric policy is an AND policy having a list of policies or devices, wherein said list of policies or devices includes at least two elements, and wherein the user passes said AND policy if the user passes all of said elements in said list of policies or devices.

18. A method for providing user authentication to enterprise resources, comprising the steps of:
   (a) setting up a biometric server including placing the user within a biometric group, wherein said biometric group defines one or more users having a specified characteristic, said biometric server having stored therein at least two biometric policies that each define different authentication levels, each said authentication level defining a probability that the user is authorized to access the enterprise resources;

(b) assigning one of said biometric policies to the user;

(c) determining whether the user is authenticated by executing said assigned biometric policy; and (d) indicating that the user may access the enterprise resources if the user passes said assigned biometric policy, otherwise indicating that the user may not access the enterprise resources, wherein said assigned biometric policy is a CONTINGENT policy having a list of policies or devices, wherein said list of policies or devices includes at least two elements, and wherein the user passes said CONTINGENT policy if either the user exceeds a minimum threshold associated with a first element or if the user exceeds a contingent threshold associated with said first element and the user exceeds a minimum threshold associated with a second element.

19. A method for providing user authentication to enterprise resources, comprising the steps of:

(a) setting up a biometric server including placing the user within a biometric group, wherein said biometric group defines one or more users having a specified characteristic, said biometric server having stored therein at least two biometric policies that each define different authentication levels, each said authentication level defining a probability that the user is authorized to access the enterprise resources;

(b) assigning one of said biometric policies to the user;

(c) determining whether the user is authenticated by executing said assigned biometric policy; and (d) indicating that the user may access the enterprise resources if the user passes said assigned biometric policy, otherwise indicating that the user may not access the enterprise resources, wherein said assigned biometric policy is a RANDOM policy having a list of policies or devices, wherein said list of policies or devices includes at least two elements, wherein a random element is determined from said elements in said list of policies or devices, and wherein the user passes said RANDOM policy if the user passes said random element.

20. A method of storing biometric templates in a hierarchical structure throughout an enterprise, the enterprise having multiple locations, comprising the steps of:

determining a corporate location;

storing all of the biometric templates associated with a group of users at said corporate location;

dividing all of the remaining locations into multiple logical groupings, wherein each logical grouping is associated with a subset of said group of users;

selecting a top level location in each of said logical groupings;

storing at said top level location for each logical grouping all of the biometric templates associated with said subset of users; and storing at a bottom level location for each of said logical groupings all of said biometric templates associated with a further subset of said subset of users.

21. A method of storing digital certificates in a hierarchical structure throughout an enterprise, the enterprise having multiple locations, comprising the steps of:

determining a corporate location;

storing all of the digital certificates associated with a group of users at said corporate location;

dividing all of the remaining locations into multiple logical groupings, wherein each logical grouping is associated with a subset of said group of users;

selecting a top level location in each of said logical groupings;

storing at said top level location for each logical grouping all of the digital certificates associated with said subset of users; and storing at a bottom level location for each of said logical groupings all of said digital certificates associated with a further subset of said subset of users.

22. A system for controlling access to enterprise resources, comprising:

a biometric server having stored therein biometric data related to a plurality of users, at least one biometric group that the user is associated with and at least two biometric policies that each define different authentication levels, each said authentication level defining a probability that the user is authorized to access the enterprise resources;

at least one computer connected to said biometric server;

a plurality of biometric devices, wherein said biometric policy has associated therewith at least one of said plurality of biometric devices; and wherein said biometric server includes means for indicating whether the user can access said enterprise resources, wherein said user may gain access to the enterprise resources by passing one of said biometric policies that has been assigned to the user, wherein said biometric policy is an OR policy having a list of devices, wherein said list of devices includes at least two different biometric devices, and wherein the user passes said OR policy if the user passes one of said biometric devices in said list of devices.

23. A system for controlling access to enterprise resources, comprising:

a biometric server having stored therein biometric data related to a plurality of users, at least one biometric group that the user is associated with and at least two biometric policies that each define different authentication levels, each said authentication level defining a probability that the user is authorized to access the enterprise resources;

at least one computer connected to said biometric server;

a plurality of biometric devices, wherein said biometric policy has associated therewith at least one of said plurality of biometric devices; and wherein said biometric server includes means for indicating whether the user can access said enterprise resources, wherein said user may gain access to the enterprise resources by passing one of said biometric policies that has been assigned to the user, wherein said biometric policy is an OR policy having a list of devices, wherein said list of devices includes only one biometric device, and wherein the user passes said OR policy if the user passes said biometric device while being tested with at least two biometric measurements.

24. A system for controlling access to enterprise resources, comprising:

a biometric server having stored therein biometric data related to a plurality of users, at least one biometric group that the user is associated with and at least two biometric policies that each define different authentication levels, each said authentication level defining a probability that the user is authorized to access the enterprise resources;

at least one computer connected to said biometric server;

a plurality of biometric devices, wherein said biometric policy has associated therewith at least one of said plurality of biometric devices; and wherein said biometric server includes means for indicating whether the user can access said enterprise resources, wherein said user may gain access to the enterprise resources by passing one of said biometric policies that has been assigned to the user, wherein said biometric policy is an AND policy having a list of devices, wherein said list of devices includes at least two different biometric devices, and wherein the user passes said AND policy if the user passes all of said biometric devices in said list of devices.

25. A system for controlling access to enterprise resources, comprising:

a biometric server having stored therein biometric data related to a plurality of users, at least one biometric group that the user is associated with and at least two biometric policies that each define different authentication levels, each said authentication level defining a probability that the user is authorized to access the enterprise resources;

at least one computer connected to said biometric server;

a plurality of biometric devices, wherein said biometric policy has associated therewith at least one of said plurality of biometric devices; and wherein said biometric server includes means for indicating whether the user can access said enterprise resources, wherein said user may gain access to the enterprise resources by passing one of said biometric policies that has been assigned to the user, wherein said biometric policy is an AND policy having a list of devices, wherein said list of devices includes only one biometric device, and wherein the user passes said AND policy if the user passes said biometric device while being tested with at least two biometric measurements.

26. A system for controlling access to enterprise resources, comprising:

a biometric server having stored therein biometric data related to a plurality of users, at least one biometric group that the user is associated with and at least two biometric policies that each define different authentication levels, each said authentication level defining a probability that the user is authorized to access the enterprise resources;

at least one computer connected to said biometric server;

a plurality of biometric devices, wherein said biometric policy has associated therewith at least one of said plurality of biometric devices; and wherein said biometric server includes means for indicating whether the user can access said enterprise resources, wherein said user may gain access to the enterprise resources by passing one of said biometric policies that has been assigned to the user, wherein said biometric policy is a CONTINGENT policy having a list of devices, wherein said list of devices includes at least two different biometric devices, and wherein the user passes said CONTINGENT policy if either the user exceeds a minimum threshold associated with a first biometric device or if the user exceeds a contingent threshold associated with said first biometric device and the user exceeds a minimum threshold associated with a second biometric device.

27. The system of claim 26, wherein said minimum thresholds and said contingent threshold is set by an administrator.

28. The system of claim 26, wherein said second biometric device is selected based on environmental conditions.

29. A system for controlling access to enterprise resources, comprising:

a biometric server having stored therein biometric data related to a plurality of users, at least one biometric group that the user is associated with and at least two biometric policies that each define different authentication levels, each said authentication level defining a probability that the user is authorized to access the enterprise resources;

at least one computer connected to said biometric server;

a plurality of biometric devices, wherein said biometric policy has associated therewith at least one of said plurality of biometric devices; and wherein said biometric server includes means for indicating whether the user can access said enterprise resources, wherein said user may gain access to the enterprise resources by passing one of said biometric policies that has been assigned to the user, wherein said biometric policy is a CONTINGENT policy having a list of devices, wherein said list of devices includes only one biometric device, wherein a first biometric measurement and a second biometric measurement are associated with said biometric device, and wherein the user passes said CONTINGENT policy if either the user exceeds a minimum threshold associated with said biometric device and said first biometric measurement or if the user exceeds a contingent threshold associated with said biometric device and said first biometric measurement and the user exceeds a minimum threshold associated with said biometric device and said second biometric measurement.

30. A system for controlling access to enterprise resources, comprising:

a biometric server having stored therein biometric data related to a plurality of users, at least one biometric group that the user is associated with and at least two biometric policies that each define different authentication levels, each said authentication level defining a probability that the user is authorized to access the enterprise resources;

at least one computer connected to said biometric server;

a plurality of biometric devices, wherein said biometric policy has associated therewith at least one of said plurality of biometric devices; and wherein said biometric server includes means for indicating whether the user can access said enterprise resources, wherein said user may gain access to the enterprise resources by passing one of said biometric policies that has been assigned to the user, wherein said biometric policy is a RANDOM policy having a list of devices, wherein said list of devices includes at least two different biometric devices, wherein a random biometric device is determined from said list of devices, and wherein the user passes said RANDOM policy if the user passes said random biometric device.

31. A system for controlling access to enterprise resources, comprising:

a biometric server having stored therein biometric data related to a plurality of users, at least one biometric group that the user is associated with and at least two biometric policies that each define different authentication levels, each said authentication level defining a probability that the user is authorized to access the enterprise resources;

at least one computer connected to said biometric server;

a plurality of biometric devices, wherein said biometric policy has associated therewith at least one of said plurality of biometric devices; and wherein said biometric server includes means for indicating whether the user can access said enterprise resources, wherein said user may gain access to the enterprise resources by passing one of said biometric policies that has been assigned to the user, wherein said biometric policy is a RANDOM policy having a list of devices, wherein said list of devices includes only one biometric device, wherein a random biometric measurement is determined from one or more biometric measurements, and wherein the user passes said RANDOM policy if the user passes said biometric device while being tested with said random biometric measurement.

32. A system for controlling access to enterprise resources, comprising:

a biometric server having stored therein biometric data related to a plurality of users, at least one biometric group that the user is associated with and at least two biometric policies that each define different authentication levels, each said authentication level defining a probability that the user is authorized to access the enterprise resources;

at least one computer connected to said biometric server;

a plurality of biometric devices, wherein said biometric policy has associated therewith at least one of said plurality of biometric devices; and wherein said biometric server includes means for indicating whether the user can access said enterprise resources, wherein said user may gain access to the enterprise resources by passing one of said biometric policies that has been assigned to the user, wherein said biometric policy is a THRESHOLD policy having a list of devices, wherein said list of devices includes at least two different biometric devices, and wherein the user passes said THRESHOLD policy if the user exceeds a total threshold while being tested on one or more of said biometric devices in said list of devices.

33. A system for controlling access to enterprise resources, comprising:

a biometric server having stored therein biometric data related to a plurality of users, at least one biometric group that the user is associated with and at least two biometric policies that each define different authentication levels, each said authentication level defining a probability that the user is authorized to access the enterprise resources;

at least one computer connected to said biometric server;

a plurality of biometric devices, wherein said biometric policy has associated therewith at least one of said plurality of biometric devices; and wherein said biometric server includes means for indicating whether the user can access said enterprise resources, wherein said user may gain access to the enterprise resources by passing one of said biometric policies that has been assigned to the user, wherein said biometric policy is a THRESHOLD policy having a list of devices, wherein said list of devices includes only one biometric device, and wherein the user passes said THRESHOLD policy if the user exceeds a total threshold while being tested with one or more biometric measurements on said biometric device in said list of devices.

34. A system for controlling access to enterprise resources, comprising:

a biometric server having stored therein biometric data related to a plurality of users, at least one biometric group that the user is associated with and at least two biometric policies that each define different authentication levels, each said authentication level defining a probability that the user is authorized to access the enterprise resources;

at least one computer connected to said biometric server;

a plurality of biometric devices, wherein said biometric policy has associated therewith at least one of said plurality of biometric devices; and wherein said biometric server includes means for indicating whether the user can access said enterprise resources, wherein said user may gain access to the enterprise resources by passing one of said biometric policies that has been assigned to the user, wherein said biometric policy is an OR policy having a list of biometric policies, wherein said list of biometric policies includes at least two biometric policies, and wherein the user passes said OR policy if the user passes one of said biometric policies in said list of biometric policies.

35. A system for controlling access to enterprise resources, comprising:

a biometric server having stored therein biometric data related to a plurality of users, at least one biometric group that the user is associated with and at least two biometric policies that each define different authentication levels, each said authentication level defining a probability that the user is authorized to access the enterprise resources;

at least one computer connected to said biometric server;

a plurality of biometric devices, wherein said biometric policy has associated therewith at least one of said plurality of biometric devices; and wherein said biometric server includes means for indicating whether the user can access said enterprise resources, wherein said user may gain access to the enterprise resources by passing one of said biometric policies that has been assigned to the user, wherein said biometric policy is an AND policy having a list of biometric policies, wherein said list of biometric policies includes at least two biometric policies, and wherein the user passes said AND policy if the user passes all of said biometric policies in said list of biometric policies.

36. A system for controlling access to enterprise resources, comprising:

a biometric server having stored therein biometric data related to a plurality of users, at least one biometric group that the user is associated with and at least two biometric policies that each define different authentication levels, each said authentication level defining a probability that the user is authorized to access the enterprise resources;

at least one computer connected to said biometric server;

a plurality of biometric devices, wherein said biometric policy has associated therewith at least one of said plurality of biometric devices; and wherein said biometric server includes means for indicating whether the user can access said enterprise resources, wherein said user may gain access to the enterprise resources by passing one of said biometric policies that has been assigned to the user, wherein said biometric policy is a CONTINGENT policy having a list of biometric policies, wherein said list of biometric policies includes at least two biometric policies, and wherein the user passes said CONTINGENT policy if either the user exceeds a minimum threshold associated with a first biometric policy or if the user exceeds a contingent threshold associated with said first biometric policy and the user exceeds a minimum threshold associated with a second biometric policy.

37. A system for controlling access to enterprise resources, comprising:

a biometric server having stored therein biometric data related to a plurality of users, at least one biometric group that the user is associated with and at least two biometric policies that each define different authentication levels, each said authentication level defining a probability that the user is authorized to access the enterprise resources;

at least one computer connected to said biometric server;

a plurality of biometric devices, wherein said biometric policy has associated therewith at least one of said plurality of biometric devices; and wherein said biometric server includes means for indicating whether the user can access said enterprise resources, wherein said user may gain access to the enterprise resources by passing one of said biometric policies that has been assigned to the user, wherein said biometric policy is a RANDOM policy having a list of biometric policies, wherein said list of biometric policies includes at least two biometric policies, wherein a random biometric policy is determined from said list of biometric policies, and wherein the user passes said RANDOM policy if the user passes said random biometric policy.

38. A system for controlling access to enterprise resources, comprising:

a biometric server having stored therein biometric data related to a plurality of users, at least one biometric group that the user is associated with and at least two biometric policies that each define different authentication levels, each said authentication level defining a probability that the user is authorized to access the enterprise resources;

at least one computer connected to said biometric server;

a plurality of biometric devices, wherein said biometric policy has associated therewith at least one of said plurality of biometric devices; and wherein said biometric server includes means for indicating whether the user can access said enterprise resources wherein said user may gain access to the enterprise resources by passing one of said biometric policies that has been assigned to the user; wherein said biometric policy is a THRESHOLD policy having a list of biometric policies, wherein said list of biometric policies includes at least two biometric policies, and wherein the user passes said THRESHOLD policy if the user exceeds a total threshold while being tested on one or more of said biometric policies in said list of biometric policies.

39. A system for controlling access to enterprise resources, comprising:

a biometric server having stored therein biometric data related to a plurality of users, at least one biometric group that the user is associated with and at least two biometric policies that each define different authentication levels, each said authentication level defining a probability that the user is authorized to access the enterprise resources;

at least one computer connected to said biometric server;

a plurality of biometric devices, wherein said biometric policy has associated therewith at least one of said plurality of biometric devices; and wherein said biometric server includes means for indicating whether the user can access said enterprise resources, wherein said user may gain access to the enterprise resources by passing one of said biometric policies that has been assigned to the user, wherein said biometric policy is an OR policy having a list of policies or devices, wherein said list of policies or devices includes at least two elements, and wherein the user passes said OR policy if the user passes one of said elements in said list of policies or devices.

40. A system for controlling access to enterprise resources, comprising:

a biometric server having stored therein biometric data related to a plurality of users, at least one biometric group that the user is associated with and at least two biometric policies that each define different authentication levels, each said authentication level defining a probability that the user is authorized to access the enterprise resources;

at least one computer connected to said biometric server;

a plurality of biometric devices, wherein said biometric policy has associated therewith at least one of said plurality of biometric devices; and wherein said biometric server includes means for indicating whether the user can access said enterprise resources, wherein said user may gain access to the enterprise resources by passing one of said biometric policies that has been assigned to the user, wherein said biometric policy is an AND policy having a list of policies or devices, wherein said list of policies or devices includes at least two elements, and wherein the user passes said AND policy if the user passes all of said elements in said list of policies or devices.

41. A system for controlling access to enterprise resources, comprising:

a biometric server having stored therein biometric data related to a plurality of users, at least one biometric group that the user is associated with and at least two biometric policies that each define different authentication levels, each said authentication level defining a probability that the user is authorized to access the enterprise resources;

at least one computer connected to said biometric server;

a plurality of biometric devices, wherein said biometric policy has associated therewith at least one of said plurality of biometric devices; and wherein said biometric server includes means for indicating whether the user can access said enterprise resources, wherein said user may gain access to the enterprise resources by passing one of said biometric policies that has been assigned to the user, wherein said biometric policy is a CONTINGENT policy having a list of policies or devices, wherein said list of policies or devices includes at least two elements, and wherein the user passes said CONTINGENT policy if either the user exceeds a minimum threshold associated with a first element or if the user exceeds a contingent threshold associated with said first element and the user exceeds a minimum threshold associated with a second element.

42. A system for controlling access to enterprise resources, comprising:

a biometric server having stored therein biometric data related to a plurality of users, at least one biometric group that the user is associated with and at least two biometric policies that each define different authentication levels, each said authentication level defining a probability that the user is authorized to access the enterprise resources;

at least one computer connected to said biometric server;

a plurality of biometric devices, wherein said biometric policy has associated therewith at least one of said plurality of biometric devices; and wherein said biometric server includes means for indicating whether the user can access said enterprise resources, wherein said user may gain access to the enterprise resources by passing one of said biometric policies that has been assigned to the user, wherein said biometric policy is a RANDOM policy having a list of policies or devices, wherein said list of policies or devices includes at least two elements, wherein a random element is determined from said elements in said list of policies or devices, and wherein the user passes said RANDOM policy if the user passes said random element.

43. A method for providing user authentication to enterprise resources, comprising the steps of:

(a) setting up a biometric server, said biometric server having stored therein at least one biometric policy that determines whether the user can gain access to the enterprise resources, wherein said biometric policy has associated therewith at least one biometric device;

(b) determining whether the user is authenticated by executing said biometric policy; and (c) allowing the user access to the enterprise resources if the user passes said biometric policy, otherwise denying access to the user to the enterprise resources, wherein said biometric policy is specified as one of the following:

i. an OR policy having a list of devices;
ii. an AND policy having a list of devices;
iii. a CONTINGENT policy having a list of devices;
iv. a RANDOM policy having a list of devices; or
v. a THRESHOLD policy having a list of devices.

44. The method according to claim 43, wherein said biometric policy is further specified as one of the following:

vi. an OR policy having a list of biometric policies;
vii. an AND policy having a list of biometric policies;
viii. a CONTINGENT policy having a list of biometric policies;
ix. a RANDOM policy having a list of biometric policies; or
x. a THRESHOLD policy having a list of biometric policies.

45. The method claim 44, further comprising the step of enrolling the user for authentication by having the user create a biometric template for each said biometric device, wherein said biometric template includes biometric data unique to the user.

46. The method according to claim 43, wherein said biometric policy is further specified as one of the following:

vi. an OR policy having a list of policies or devices;
vii. an AND policy having a list of policies or devices;
viii. a CONTINGENT policy having a list of policies or devices;
ix. a RANDOM policy having a list of policies or devices; or
x. a THRESHOLD policy having a list of policies or devices.

47. The method claim 46, further comprising the step of enrolling the user for authentication by having the user create a biometric template for each said biometric device, wherein said biometric template includes biometric data unique to the user.

48. The method claim 43, further comprising the step of enrolling the user for authentication by having the user create a biometric template for each said biometric device, wherein said biometric template includes biometric data unique to the user.

49. A method for providing user authentication to enterprise resources, comprising the steps of:

(a) setting up a biometric server, said biometric server having stored therein at least one biometric policy that determines whether the user can gain access to the enterprise resources, wherein said biometric policy has associated therewith at least one biometric device;

(b) determining whether the user is authenticated by executing said biometric policy; and (c) allowing the user access to the enterprise resources if the user passes said biometric policy, otherwise denying access to the user to the enterprise resources, wherein said biometric policy is an OR policy having a list of devices, wherein said list of devices includes at least two different biometric devices, and wherein the user passes said OR policy if the user passes one of said biometric devices in said list of devices.

50. The method according to claim 49, wherein said biometric server has stored therein at least two biometric policies that each define different authentication levels, each said authentication level defining a probability that the user is authorized to access the enterprise resources.

51. The method claim 49, further comprising the step of enrolling the user for authentication by having the user create a biometric template for each said biometric device, wherein said biometric template includes biometric data unique to the user.

52. A method for providing user authentication to enterprise resources, comprising the steps of:

(a) setting up a biometric server, said biometric server having stored therein at least one biometric policy that determines whether the user can gain access to the enterprise resources, wherein said biometric policy has associated therewith at least one biometric device;

(b) determining whether the user is authenticated by executing said biometric policy; and (c) allowing the user access to the enterprise resources if the user passes said biometric policy, otherwise denying access to the user to the enterprise resources, wherein said biometric policy is an OR policy having a list of devices, wherein said biometric policy is an OR policy having a list of devices, wherein said list of devices includes only one biometric device, and wherein the user passes said OR policy if the user passes said biometric device while being tested with at least two biometric measurements.

53. The method according to claim 52, wherein said biometric server has stored therein at least two biometric policies that each define different authentication levels, each said authentication level defining a probability that the user is authorized to access the enterprise resources.

54. The method claim 52, further comprising the step of enrolling the user for authentication by having the user create a biometric template for each said biometric device, wherein said biometric template includes biometric data unique to the user.

55. A method for providing user authentication to enterprise resources, comprising the steps of:
   (a) setting up a biometric server, said biometric server having stored therein at least one biometric policy that determines whether the user can gain access to the enterprise resources, wherein said biometric policy has associated therewith at least one biometric device;
   (b) determining whether the user is authenticated by executing said biometric policy; and
   (c) allowing the user access to the enterprise resources if the user passes said biometric policy, otherwise denying access to the user to the enterprise resources, wherein said biometric policy is an AND policy having a list of devices, wherein said list of devices includes at least two different biometric devices, and wherein the user passes said AND policy if the user passes all of said biometric devices in said list of devices.

56. The method according to claim 55, wherein said biometric server has stored therein at least two biometric policies that each define different authentication levels, each said authentication level defining a probability that the user is authorized to access the enterprise resources.

57. The method claim 55, further comprising the step of enrolling the user for authentication by having the user create a biometric template for each said biometric device, wherein said biometric template includes biometric data unique to the user.

58. A method for providing user authentication to enterprise resources, comprising the steps of:
   (a) setting up a biometric server, said biometric server having stored therein at least one biometric policy that determines whether the user can gain access to the enterprise resources, wherein said biometric policy has associated therewith at least one biometric device;
   (b) determining whether the user is authenticated by executing said biometric policy; and
   (c) allowing the user access to the enterprise resources if the user passes said biometric policy, otherwise denying access to the user to the enterprise resources, wherein said biometric policy is an AND policy having a list of devices, wherein said list of devices includes only one biometric device, and wherein the user passes said AND policy if the user passes said biometric device while being tested with at least two biometric measurements.

59. The method according to claim 58, wherein said biometric server has stored therein at least two biometric policies that each define different authentication levels, each said authentication level defining a probability that the user is authorized to access the enterprise resources.

60. The method claim 58, further comprising the step of enrolling the user for authentication by having the user create a biometric template for each said biometric device, wherein said biometric template includes biometric data unique to the user.

61. A method for providing user authentication to enterprise resources, comprising the steps of:
   (a) setting up a biometric server, said biometric server having stored therein at least one biometric policy that determines whether the user can gain access to the enterprise resources, wherein said biometric policy has associated therewith at least one biometric device;
   (b) determining whether the user is authenticated by executing said biometric policy; and
   (c) allowing the user access to the enterprise resources if the user passes said biometric policy, otherwise denying access to the user to the enterprise resources, wherein said biometric policy is a CONTINGENT policy having a list of devices, wherein said list of devices includes at least two different biometric devices, and wherein the user passes said CONTINGENT policy if either the user exceeds a minimum threshold associated with a first biometric device or if the user exceeds a contingent threshold associated with said first biometric device and the user exceeds a minimum threshold associated with a second biometric device.

62. The method according to claim 61, wherein said biometric server has stored therein at least two biometric policies that each define different authentication levels, each said authentication level defining a probability that the user is authorized to access the enterprise resources.

63. The method claim 61, further comprising the step of enrolling the user for authentication by having the user create a biometric template for each said biometric device, wherein said biometric template includes biometric data unique to the user.

64. A method for providing user authentication to enterprise resources, comprising the steps of:
   (a) setting up a biometric server, said biometric server having stored therein at least one biometric policy that determines whether the user can gain access to the enterprise resources, wherein said biometric policy has associated therewith at least one biometric device;
   (b) determining whether the user is authenticated by executing said biometric policy; and
   (c) allowing the user access to the enterprise resources if the user passes said biometric policy, otherwise denying access to the user to the enterprise resources, wherein said biometric policy is a CONTINGENT policy having a list of devices, wherein said list of devices includes only one biometric device, wherein a first biometric measurement and a second biometric measurement are associated with said biometric device, and wherein the user passes said CONTINGENT policy if either the user exceeds a minimum threshold associated with said biometric device and said first biometric measurement or if the user exceeds a contingent threshold associated with said biometric device and said first biometric measurement and the user exceeds a minimum threshold associated with said biometric device and said second biometric measurement.

65. The method according to claim 64, wherein said biometric server has stored therein at least two biometric policies that each define different authentication levels, each said authentication level defining a probability that the user is authorized to access the enterprise resources.

66. The method claim 64, further comprising the step of enrolling the user for authentication by having the user create a biometric template for each said biometric device, wherein said biometric template includes biometric data unique to the user.

67. A method for providing user authentication to enterprise resources, comprising the steps of:
  (a) setting up a biometric server, said biometric server having stored therein at least one biometric policy that determines whether the user can gain access to the enterprise resources, wherein said biometric policy has associated therewith at least one biometric device;
  (b) determining whether the user is authenticated by executing said biometric policy; and
  (c) allowing the user access to the enterprise resources if the user passes said biometric policy, otherwise denying access to the user to the enterprise resources, wherein said biometric policy is a RANDOM policy having a list of devices, wherein said list of devices includes at least two different biometric devices, wherein a random biometric device is determined from said list of devices, and wherein the user passes said RANDOM policy if the user passes said random biometric device.

68. The method according to claim 67, wherein said biometric server has stored therein at least two biometric policies that each define different authentication levels, each said authentication level defining a probability that the user is authorized to access the enterprise resources.

69. The method claim 67, further comprising the step of enrolling the user for authentication by having the user create a biometric template for each said biometric device, wherein said biometric template includes biometric data unique to the user.

70. A method for providing user authentication to enterprise resources, comprising the steps of:
  (a) setting up a biometric server, said biometric server having stored therein at least one biometric policy that determines whether the user can gain access to the enterprise resources, wherein said biometric policy has associated therewith at least one biometric device;
  (b) determining whether the user is authenticated by executing said biometric policy; and
  (c) allowing the user access to the enterprise resources if the user passes said biometric policy, otherwise denying access to the user to the enterprise resources, wherein said biometric policy is a RANDOM policy having a list of devices, wherein said list of devices includes only one biometric device, wherein a random biometric measurement is determined from one or more biometric measurements, and wherein the user passes said RANDOM policy if the user passes said biometric device while being tested with said random biometric measurement.

71. The method according to claim 70, wherein said biometric server has stored therein at least two biometric policies that each define different authentication levels, each said authentication level defining a probability that the user is authorized to access the enterprise resources.

72. The method claim 70, further comprising the step of enrolling the user for authentication by having the user create a biometric template for each said biometric device, wherein said biometric template includes biometric data unique to the user.

73. A method for providing user authentication to enterprise resources, comprising the steps of:
  (a) setting up a biometric server, said biometric server having stored therein at least one biometric policy that determines whether the user can gain access to the enterprise resources, wherein said biometric policy has associated therewith at least one biometric device;
  (b) determining whether the user is authenticated by executing said biometric policy; and
  (c) allowing the user access to the enterprise resources if the user passes said biometric policy, otherwise denying access to the user to the enterprise resources, wherein said biometric policy is a THRESHOLD policy having a list of devices, wherein said list of devices includes at least two different biometric devices, and wherein the user passes said THRESHOLD policy if the user exceeds a total threshold while being tested on one or more of said biometric devices in said list of devices.

74. The method according to claim 73, wherein said biometric server has stored therein at least two biometric policies that each define different authentication levels, each said authentication level defining a probability that the user is authorized to access the enterprise resources.

75. The method claim 73, further comprising the step of enrolling the user for authentication by having the user create a biometric template for each said biometric device, wherein said biometric template includes biometric data unique to the user.

76. A method for providing user authentication to enterprise resources, comprising the steps of:
  (a) setting up a biometric server, said biometric server having stored therein at least one biometric policy that determines whether the user can gain access to the enterprise resources, wherein said biometric policy has associated therewith at least one biometric device;
  (b) determining whether the user is authenticated by executing said biometric policy; and
  (c) allowing the user access to the enterprise resources if the user passes said biometric policy, otherwise denying access to the user to the enterprise resources, wherein said biometric policy is a THRESHOLD policy having a list of devices, wherein said list of devices includes only one biometric device, and wherein the user passes said THRESHOLD policy if the user exceeds a total threshold while being tested with one or more biometric measurements on said biometric device in said list of devices.

77. The method according to claim 76, wherein said biometric server has stored therein at least two biometric policies that each define different authentication levels, each said authentication level defining a probability that the user is authorized to access the enterprise resources.

78. The method claim 76, further comprising the step of enrolling the user for authentication by having the user create a biometric template for each said biometric device, wherein said biometric template includes biometric data unique to the user.

79. A method for providing user authentication to enterprise resources, comprising the steps of:
  (a) setting up a biometric server, said biometric server having stored therein at least one biometric policy that determines whether the user can gain access to the enterprise resources, wherein said biometric policy has associated therewith at least one biometric device;
  (b) determining whether the user is authenticated by executing said biometric policy; and
  (c) allowing the user access to the enterprise resources if the user passes said biometric policy, otherwise denying access to the user to the enterprise resources, wherein said biometric policy is an OR policy having a list of biometric policies, wherein said list of biometric policies includes at least two biometric policies, and wherein the user passes said OR policy if the user passes one of said biometric policies in said list of biometric policies.

80. The method according to claim 79, wherein said biometric server has stored therein at least two biometric policies that each define different authentication levels, each said authentication level defining a probability that the user is authorized to access the enterprise resources.

81. The method claim 79, further comprising the step of enrolling the user for authentication by having the user create a biometric template for each said biometric device, wherein said biometric template includes biometric data unique to the user.

82. A method for providing user authentication to enterprise resources, comprising the steps of:
  (a) setting up a biometric server, said biometric server having stored therein at least one biometric policy that determines whether the user can gain access to the enterprise resources, wherein said biometric policy has associated therewith at least one biometric device;
  (b) determining whether the user is authenticated by executing said biometric policy; and
  (c) allowing the user access to the enterprise resources if the user passes said biometric policy, otherwise denying access to the user to the enterprise resources, wherein said biometric policy is an AND policy having a list of biometric policies, wherein said list of biometric policies includes at least two biometric policies, and wherein the user passes said AND policy if the user passes all of said biometric policies in said list of biometric policies.

83. The method according to claim 82, wherein said biometric server has stored therein at least two biometric policies that each define different authentication levels, each said authentication level defining a probability that the user is authorized to access the enterprise resources.

84. The method claim 82, further comprising the step of enrolling the user for authentication by having the user create a biometric template for each said biometric device, wherein said biometric template includes biometric data unique to the user.

85. A method for providing user authentication to enterprise resources, comprising the steps of:
  (a) setting up a biometric server, said biometric server having stored therein at least one biometric policy that determines whether the user can gain access to the enterprise resources, wherein said biometric policy has associated therewith at least one biometric device;
  (b) determining whether the user is authenticated by executing said biometric policy; and
  (c) allowing the user access to the enterprise resources if the user passes said biometric policy, otherwise denying access to the user to the enterprise resources, wherein said biometric policy is a CONTINGENT policy having a list of biometric policies, wherein said list of biometric policies includes at least two biometric policies, and wherein the user passes said CONTINGENT policy if either the user exceeds a minimum threshold associated with a first biometric policy or if the user exceeds a contingent threshold associated with said first biometric policy and the user exceeds a minimum threshold associated with a second biometric policy.

86. The method according to claim 85, wherein said biometric server has stored therein at least two biometric policies that each define different authentication levels, each said authentication level defining a probability that the user is authorized to access the enterprise resources.

87. The method claim 85, further comprising the step of enrolling the user for authentication by having the user create a biometric template for each said biometric device, wherein said biometric template includes biometric data unique to the user.

88. A method for providing user authentication to enterprise resources, comprising the steps of:
  (a) setting up a biometric server, said biometric server having stored therein at least one biometric policy that determines whether the user can gain access to the enterprise resources, wherein said biometric policy has associated therewith at least one biometric device;
  (b) determining whether the user is authenticated by executing said biometric policy; and
  (c) allowing the user access to the enterprise resources if the user passes said biometric policy, otherwise denying access to the user to the enterprise resources, wherein said biometric policy is a RANDOM policy having a list of biometric policies, wherein said list of biometric policies includes at least two biometric policies, wherein a random biometric policy is determined from said list of biometric policies, and wherein the user passes said RANDOM policy if the user passes said random biometric policy.

89. The method according to claim 88, wherein said biometric server has stored therein at least two biometric policies that each define different authentication levels, each said authentication level defining a probability that the user is authorized to access the enterprise resources.

90. The method claim 88, further comprising the step of enrolling the user for authentication by having the user create a biometric template for each said biometric device, wherein said biometric template includes biometric data unique to the user.

91. A method for providing user authentication to enterprise resources, comprising the steps of:
  (a) setting up a biometric server, said biometric server having stored therein at least one biometric policy that determines whether the user can gain access to the enterprise resources, wherein said biometric policy has associated therewith at least one biometric device;
  (b) determining whether the user is authenticated by executing said biometric policy; and
  (c) allowing the user access to the enterprise resources if the user passes said biometric policy, otherwise denying access to the user to the enterprise resources, wherein said biometric policy is a THRESHOLD policy having a list of biometric policies, wherein said list of biometric policies includes at least two biometric policies, and wherein the user passes said THRESHOLD policy if the user exceeds a total threshold while being tested on one or more of said biometric policies in said list of biometric policies.

92. The method according to claim 91, wherein said biometric server has stored therein at least two biometric policies that each define different authentication levels, each said authentication level defining a probability that the user is authorized to access the enterprise resources.

93. The method claim 91, further comprising the step of enrolling the user for authentication by having the user create a biometric template for each said biometric device, wherein said biometric template includes biometric data unique to the user.

94. A method for providing user authentication to enterprise resources, comprising the steps of:
   (a) setting up a biometric server, said biometric server having stored therein at least one biometric policy that determines whether the user can gain access to the enterprise resources, wherein said biometric policy has associated therewith at least one biometric device;
   (b) determining whether the user is authenticated by executing said biometric policy; and
   (c) allowing the user access to the enterprise resources if the user passes said biometric policy, otherwise denying access to the user to the enterprise resources, wherein said biometric policy is an OR policy having a list of policies or devices, wherein said list of policies or devices includes at least two elements, and wherein the user passes said OR policy if the user passes one of said elements in said list of policies or devices.

95. The method according to claim 94, wherein said biometric server has stored therein at least two biometric policies that each define different authentication levels, each said authentication level defining a probability that the user is authorized to access the enterprise resources.

96. The method claim 94, further comprising the step of enrolling the user for authentication by having the user create a biometric template for each said biometric device, wherein said biometric template includes biometric data unique to the user.

97. A method for providing user authentication to enterprise resources, comprising the steps of:
   (a) setting up a biometric server, said biometric server having stored therein at least one biometric policy that determines whether the user can gain access to the enterprise resources, wherein said biometric policy has associated therewith at least one biometric device;
   (b) determining whether the user is authenticated by executing said biometric policy; and
   (c) allowing the user access to the enterprise resources if the user passes said biometric policy, otherwise denying access to the user to the enterprise resources, wherein said biometric policy is an AND policy having a list of policies or devices, wherein said list of policies or devices includes at least two elements, and wherein the user passes said AND policy if the user passes all of said elements in said list of policies or devices.

98. The method according to claim 97, wherein said biometric server has stored therein at least two biometric policies that each define different authentication levels, each said authentication level defining a probability that the user is authorized to access the enterprise resources.

99. The method claim 97, further comprising the step of enrolling the user for authentication by having the user create a biometric template for each said biometric device, wherein said biometric template includes biometric data unique to the user.

100. A method for providing user authentication to enterprise resources, comprising the steps of:
   (a) setting up a biometric server, said biometric server having stored therein at least one biometric policy that determines whether the user can gain access to the enterprise resources, wherein said biometric policy has associated therewith at least one biometric device;
   (b) determining whether the user is authenticated by executing said biometric policy; and
   (c) allowing the user access to the enterprise resources if the user passes said biometric policy, otherwise denying access to the user to the enterprise resources, wherein said biometric policy is a CONTINGENT policy having a list of policies or devices, wherein said list of policies or devices includes at least two elements, and wherein the user passes said CONTINGENT policy if either the user exceeds a minimum threshold associated with a first element or if the user exceeds a contingent threshold associated with said first element and the user exceeds a minimum threshold associated with a second element.

101. The method according to claim 100, wherein said biometric server has stored therein at least two biometric policies that each define different authentication levels, each said authentication level defining a probability that the user is authorized to access the enterprise resources.

102. The method claim 100, further comprising the step of enrolling the user for authentication by having the user create a biometric template for each said biometric device, wherein said biometric template includes biometric data unique to the user.

103. A method for providing user authentication to enterprise resources, comprising the steps of:
   (a) setting up a biometric server, said biometric server having stored therein at least one biometric policy that determines whether the user can gain access to the enterprise resources, wherein said biometric policy has associated therewith at least one biometric device;
   (b) determining whether the user is authenticated by executing said biometric policy; and
   (c) allowing the user access to the enterprise resources if the user passes said biometric policy, otherwise denying access to the user to the enterprise resources, wherein said biometric policy is a RANDOM policy having a list of policies or devices, wherein said list of policies or devices includes at least two elements, wherein a random element is determined from said elements in said list of policies or devices, and wherein the user passes said RANDOM policy if the user passes said random element.

104. The method according to claim 103, wherein said biometric server has stored therein at least two biometric policies that each define different authentication levels, each said authentication level defining a probability that the user is authorized to access the enterprise resources.

105. The method claim 103, further comprising the step of enrolling the user for authentication by having the user create a biometric template for each said biometric device, wherein said biometric template includes biometric data unique to the user.

* * * * *